US012804058B2

(12) United States Patent
Mahara et al.

(10) Patent No.: US 12,804,058 B2
(45) Date of Patent: Nov. 17, 2026

(54) TRANSMISSION APPARATUS, TRANSMISSION METHOD, RECEPTION APPARATUS, RECEPTION METHOD, PROGRAM, AND TRANSMISSION SYSTEM

(71) Applicant: Sony Semiconductor Solutions Corporation, Kanagawa (JP)

(72) Inventors: Kumiko Mahara, Kanagawa (JP); Miho Ozawa, Kanagawa (JP); Daisuke Okazawa, Kanagawa (JP); Akihiko Nagao, Kanagawa (JP); Kenichi Okuno, Kanagawa (JP); Tsuyoshi Nagao, Tokyo (JP); Masaru Fujii, Tokyo (JP); Takashi Tsuchiya, Kanagawa (JP); Koji Yamamoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 106 days.

(21) Appl. No.: 18/853,295

(22) PCT Filed: Apr. 10, 2023

(86) PCT No.: PCT/JP2023/014556
§ 371 (c)(1),
(2) Date: Oct. 1, 2024

(87) PCT Pub. No.: WO2023/210325
PCT Pub. Date: Nov. 2, 2023

(65) Prior Publication Data
US 2025/0227167 A1 Jul. 10, 2025

(30) Foreign Application Priority Data
Apr. 28, 2022 (JP) ................................ 2022-074122

(51) Int. Cl.
*H04L 69/22* (2022.01)

(52) U.S. Cl.
CPC .................................. *H04L 69/22* (2013.01)

(58) Field of Classification Search
CPC ....... H04L 69/22; H04L 63/123; H04L 63/14; H04L 63/1408; H04L 47/43;
(Continued)

(56) References Cited

U.S. PATENT DOCUMENTS

2010/0052947 A1* 3/2010 Lin .................... G07C 9/00174 340/932.2
2018/0027174 A1* 1/2018 Sengoku ................ H04N 23/73 348/207.11
(Continued)

FOREIGN PATENT DOCUMENTS

EP 3780629 A1 * 2/2021 ............ H04N 23/60
JP H11220495 A 8/1999
(Continued)

OTHER PUBLICATIONS

Machine Translation of WO-2022075081-A1 (Year: 2022).*
(Continued)

*Primary Examiner* — Brian Whipple
(74) *Attorney, Agent, or Firm* — Michael Best & Friedrich LLP

(57) ABSTRACT

Packet transmission methods, apparatus and programs are disclosed. In one example, a transmission apparatus includes a controller that is configured to generate frame data corresponding to output data generated by a sensor. The frame data is generated according to a frame format that includes at least one of first security information or first functional safety information. The controller generates packets based on the frame data, with individual packets respectively including individual lines of image data in the frame data.

20 Claims, 43 Drawing Sheets

(58) Field of Classification Search
CPC ... G06F 21/554; G06F 11/1004; H04N 23/73; H04N 23/743
See application file for complete search history.

(56) References Cited

U.S. PATENT DOCUMENTS

| | | | | |
|---|---|---|---|---|
| 2019/0394424 | A1* | 12/2019 | Müller | H04L 1/0041 |
| 2021/0090202 | A1 | 3/2021 | Hall | |

FOREIGN PATENT DOCUMENTS

| | | | | |
|---|---|---|---|---|
| JP | 2000068985 A | | 3/2000 | |
| JP | 2020533924 A | | 11/2020 | |
| JP | 2023089317 A | | 6/2023 | |
| WO | WO-2020129685 A1 | | 6/2020 | |
| WO | WO-2020261814 A1 | | 12/2020 | |
| WO | WO-2021147049 A1 | * | 7/2021 | G06F 13/4295 |
| WO | WO-2022075081 A1 | * | 4/2022 | H04N 21/23892 |

OTHER PUBLICATIONS

International Search Report (PCT/ISA/210), International Application No. PCT/JP2023/014556, dated Jul. 12, 2023.

Goel James et al., "How MASS Simplifies the Integration of Camera and Displays in Automotive Architectures", Nov. 17, 2021 (Nov. 17, 2021), XP093060335, Retrieved from the Internet: URL:https://2384176.fs1.hubspotusercontent-nal.net/hubfs/2384176/How-MASS-Simplifies-the-Integration-of-Cameras-and-Displays-in-Automotive-Architectures.pdf[retrieved on Jul. 3, 2023] the whole document.

Mipi Alliance: "An Introductory Guide to MIPI Automotive SerDes Solutions (MASS)An overview of MIPI's standardized in-vehicle connectivity framework for high-performance sensors and displays", Aug. 31, 2021 (Aug. 31, 2021), XP093060331.

Wietfeldt Rick et al., "How the MIPI Security Framework Protects Automotive SerDes Applications from Security Risks," Dec. 31, 2021 (Dec. 31, 2021), XP093060302, Retrieved from the Internet: URL:https://www.mipi.org/sites/default/files/How-the-MIPI-Security-Framework-Protects-Automotive-SerDes-Applications-from-Security-Risks.pdf [retrieved on Jul. 3, 2023] the whole document.

* cited by examiner

FIG. 6

| INFORMATION NAME | CONTENT |
|---|---|
| SECURITY-RELATED INFORMATION | · SECURITY ERROR/WARNING OF REGISTER COMMUNICATION<br>· DETECTION OF ATTACK ON INSIDE OF SENSOR<br>· INFORMATION FOR ANALYSIS OF SECURITY ERROR/WARNING (NUMBER OF TIMES OF OCCURRENCE OR THE LIKE)<br>· INTERNAL STATE INFORMATION<br>· OPERATION-MODE-RELATED INFORMATION<br>· INFORMATION FOR MAKING NOTIFICATION THAT REGISTER COMMUNICATION HAS OCCURRED (COMMUNICATION COUNTER)<br>· FRAME COUNTER<br>· INFORMATION OF DATA SIZE OF ONE FRAME<br>COMMON INFORMATION |
| FUNCTIONAL-SAFETY-RELATED INFORMATION | · FUNCTIONAL SAFETY ERROR/WARNING OF REGISTER COMMUNICATION<br>· FAILURE INSIDE SENSOR<br>· DETECTION OF IRREGULAR OPERATION OF SENSOR<br>· INFORMATION FOR ANALYSIS OF FUNCTIONAL SAFETY ERROR/WARNING (NUMBER OF TIMES OF OCCURRENCE OR THE LIKE)<br>· INTERNAL STATE INFORMATION<br>· OPERATION-MODE-RELATED INFORMATION<br>· INFORMATION FOR MAKING NOTIFICATION THAT REGISTER COMMUNICATION HAS OCCURRED (COMMUNICATION COUNTER)<br>· FRAME COUNTER<br>· INFORMATION OF DATA SIZE OF ONE FRAME<br>COMMON INFORMATION |
| OUTPUT DATA FUNCTIONAL SAFETY INFORMATION | · CRC VALUE |
| OUTPUT DATA SECURITY INFORMATION | · IV INFORMATION<br>· MAC VALUE |

FIG. 12

| Bit | CONTENT |
|---|---|
| [63] | Frame Start |
| [62] | Frame End |
| [61] | Line Valid |
| [60] | Line Number[12] |
| [59] | Line Number[11] |
| [58] | Line Number[10] |
| [57] | Line Number[9] |
| [56] | Line Number[8] |
| [55] | Line Number[7] |
| [54] | Line Number[6] |
| [53] | Line Number[5] |
| [52] | Line Number[4] |
| [51] | Line Number[3] |
| [50] | Line Number[2] |
| [49] | Line Number[1] |
| [48] | Line Number[0] |

| Bit | CONTENT |
|---|---|
| [47] | EBD |
| [46] | Data ID[3] |
| [45] | Data ID[2] |
| [44] | Data ID[1] |
| [43] | Data ID[0] |
| [42] | Header Info Type[2] |
| [41] | Header Info Type[1] |
| [40] | Header Info Type[0] |
| [39] | Reserved |
| [38] | Reserved |
| [37] | Reserved |
| [36] | Reserved |
| [35] | Reserved |
| [34] | Reserved |
| [33] | Reserved |
| [32] | Reserved |

FIG. 13

A

Header Info Type[42:40]=000

| | |
|---|---|
| [31] | Reserved |
| [30] | Reserved |
| [29] | Reserved |
| [28] | Reserved |
| [27] | Reserved |
| [26] | Reserved |
| [25] | Reserved |
| [24] | Reserved |
| [23] | Reserved |
| [22] | Reserved |
| [21] | Reserved |
| [20] | Reserved |
| [19] | Reserved |
| [18] | Reserved |
| [17] | Safety Info |
| [16] | Security Info |

B

Header Info Type[42:40]=001

| Bit | CONTENT |
|---|---|
| [31] | Line Length[15] |
| [30] | Line Length[14] |
| [29] | Line Length[13] |
| [28] | Line Length[12] |
| [27] | Line Length[11] |
| [26] | Line Length[10] |
| [25] | Line Length[9] |
| [24] | Line Length[8] |
| [23] | Line Length[7] |
| [22] | Line Length[6] |
| [21] | Line Length[5] |
| [20] | Line Length[4] |
| [19] | Line Length[3] |
| [18] | Line Length[2] |
| [17] | Safety Info |
| [16] | Security Info |

FIG. 14

| | MEANING |
|---|---|
| Safety Info | 1 : FUNCTIONAL SAFETY INFORMATION EXISTS<br>0 : NO FUNCTIONAL SAFETY INFORMATION EXISTS |
| Security Info | 1 : SECURITY INFORMATION EXISTS<br>0 : NO SECURITY INFORMATION EXISTS |

FIG. 31

| PHY CONTROL CODE | USE | 8B10B SYMBOL CONFIGURATION | | | |
|---|---|---|---|---|---|
| Idle Code | SYMBOL GROUP (MARGIN PERIOD OR THE LIKE) FOR CONTINUOUSLY TOGGLING OUTPUT SIGNAL IN PERIOD OTHER THAN TIME OF PACKET TRANSMISSION | D00. 0 | | | |
| Start Code | INDICATES START OF PACKET (LINE/H) | K28. 5 | K27. 7 | K28. 2 | K27. 7 |
| End Code | INDICATES END OF PACKET (LINE/H) | K28. 5 | K29. 7 | K30. 7 | K29. 7 |
| Pad Code | Padding SYMBOL GROUP INSERTED TO FILL GAP BETWEEN PIXEL DATA (PAYLOAD DATA) BAND AND PHY TRANSMISSION BAND | K23. 7 | K28. 4 | K28. 6 | K28. 7 |
| Sync Code | SYMBOL GROUP FOR I/F BIT SYNCHRONIZATION AND 8B10B SYMBOL SYNCHRONIZATION | K28. 5 | Any** | ← | ← |
| Deskew Code | SYMBOL GROUP USED AS MARKING TO MATCH Data Skew BETWEEN LANES | K28. 5 | Any** | ← | ← |
| Standby Code | SYMBOL GROUP FOR NOTIFYING RX SIDE THAT TX OUTPUT IS High-Z | K28. 5 | Any** | ← | ← |

<VARIATION 2>

| [47]EBD Line | [17]Safety Info | [16]Security Info | VALUE OF MIPI DT |
|---|---|---|---|
| [47]:1 | [17]:0 | [16]:1 | DT 0x35 |
| [47]:1 | [17]:1 | [16]:0 | DT 0x36 |
| [47]:1 | [17]:1 | [16]:1 | DT 0x37 |
| [47]:1 | [17]:0 | [16]:0 | DT 0x12 |
| [47]:0 | [17]:1 | [16]:0 | DT 0x32 |
| [47]:0 | [17]:0 | [16]:1 | DT 0x31 |

TRANSMISSION APPARATUS, TRANSMISSION METHOD, RECEPTION APPARATUS, RECEPTION METHOD, PROGRAM, AND TRANSMISSION SYSTEM

CROSS REFERENCE TO RELATED APPLICATIONS

This application claims the benefit of Japanese Priority Patent Application JP 2022-074122 filed on Apr. 28, 2022, the entire contents of which are incorporated herein by reference.

TECHNICAL FIELD

The present technology particularly relates to a transmission apparatus, a transmission method, a reception apparatus, a reception method, a program, and a transmission system capable of adding and outputting information used for implementing functional safety and security for each piece of data in units of frames.

BACKGROUND ART

As a standard of a communication interface (IF) of an image sensor, there is scalable low voltage signaling-embedded clock (SLVS-EC). An SLVS-EC transmission method is a method in which data is transmitted in a form in which a clock is superimposed on a transmission side, and the clock is reproduced on a reception side to demodulate/decrypt the data.

SLVS-EC data transmission is used, for example, for data transmission between an image sensor and a digital signal processor (DSP) serving as a host.

CITATION LIST

Patent Literature

PTL 1: JP 2020-533924 A

SUMMARY OF INVENTION

Technical Problem

Also in data transmission between the image sensor and the host, countermeasures regarding functional safety and security are required similarly to normal data transmission between devices and the like.

The present technology has been made in view of such a situation, and enables addition and output of information used for implementing functional safety and security for each data in units of frames.

Solution to Problem

Packet transmission methods, apparatus and programs according to a first aspect of the present technology are disclosed. In one example, a transmission apparatus includes a controller that is configured to generate frame data corresponding to output data generated by a sensor. The frame data is generated according to a frame format that includes at least one of first security information or first functional safety information. The controller generates packets based on the frame data, with individual packets respectively including individual lines of image data in the frame data. Embodiments can be applicable, for example, to SLVS-EC standard communication.

A reception apparatus according to a second aspect of the present technology includes: a signal processing unit that receives a packet that stores data of each line included in frame data in which at least one of security information or functional safety information is added to output data in units of frames output by a sensor, the security information being information used for implementing security, and the functional safety information being information used for implementing functional safety; and an information processing unit that performs processing of implementing security on the basis of the security information and performs processing of implementing functional safety on the basis of the functional safety information.

In the first aspect of the present technology, frame data is generated by adding at least one of security information or functional safety information to output data in units of frames output by a sensor, the security information being information used for implementing security, and the functional safety information being information used for implementing functional safety, and data of each line included in the frame data is stored in each packet and the packet is transmitted.

In the second aspect of the present technology, a packet that stores data of each line included in frame data in which at least one of security information or functional safety information is added to output data in units of frames output by a sensor is received, the security information being information used for implementing security, and the functional safety information being information used for implementing functional safety, and processing of implementing security is performed on the basis of the security information and processing of implementing functional safety is performed on the basis of the functional safety information.

BRIEF DESCRIPTION OF DRAWINGS

FIG. 6 is a diagram illustrating an example of a content of each piece of information.

FIG. 12 is a diagram illustrating an example of allocation of each bit included in header information.

FIG. 13 is a diagram illustrating the example of the allocation of each bit included in the header information.

FIG. 14 is a diagram illustrating an example of values of Safety Info and Security Info.

FIG. 31 is a diagram illustrating an example of a control code.

DESCRIPTION OF EMBODIMENTS

Hereinafter, modes for carrying out the present technology will be described. Descriptions will be provided in the following order.

1. SLVS-EC Transmission System
2. Transmission of Functional Safety Information/Security Information
3. Example of Variations of Frame format
4. SLVS-EC
5. Application Example <<SLVS-EC Transmission System>>

<Configuration of Transmission System>

Figure 1:
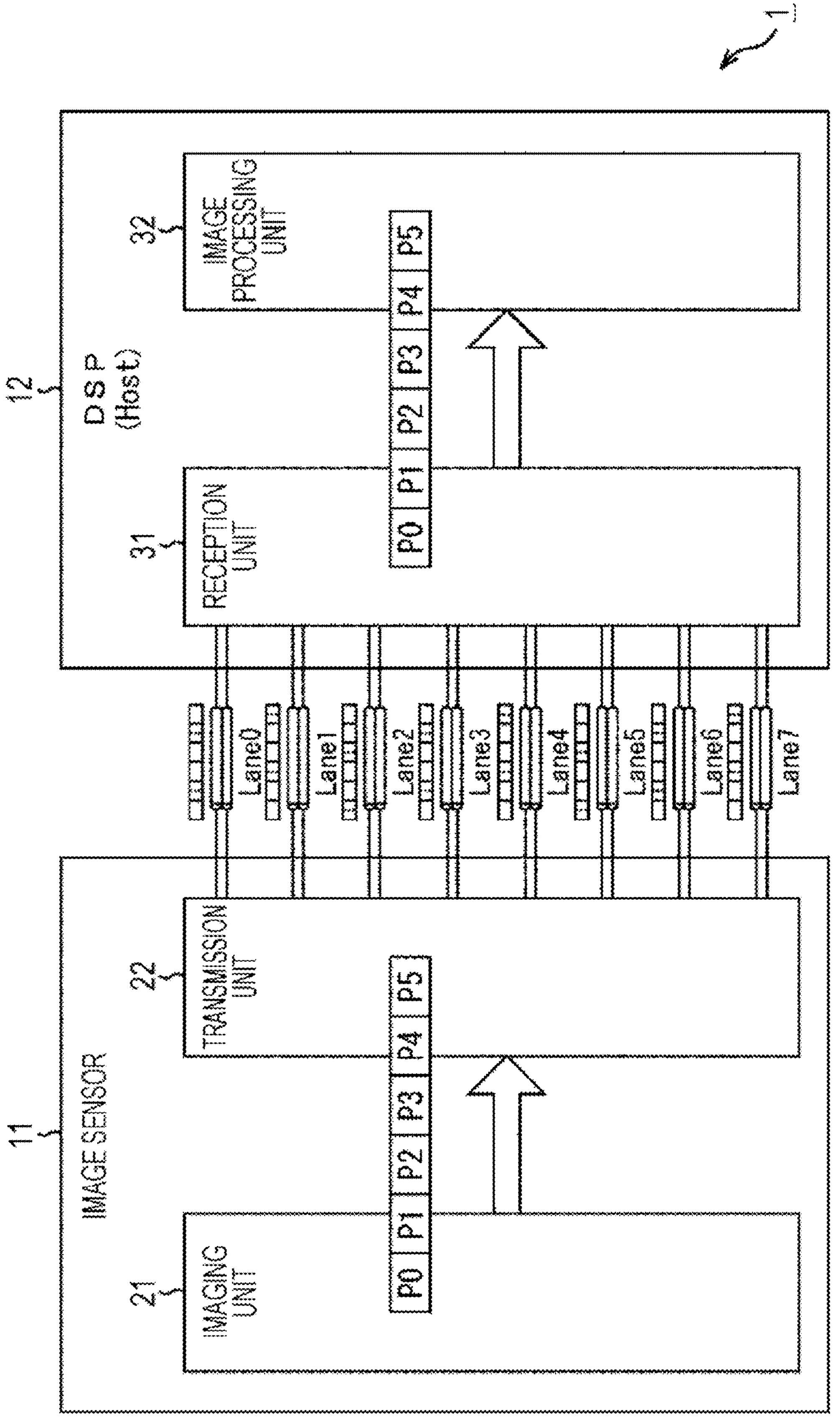
FIG. 1 is a diagram illustrating an example of a configuration of a transmission system according to an embodiment of the present technology.

FIG. 1 is a diagram illustrating an example of a configuration of a transmission system according to an embodiment of the present technology.

A transmission system 1 of FIG. 1 includes an image sensor 11 and a digital signal processor (DSP) 12. The image sensor 11 and the DSP 12 are provided in the same apparatus having an imaging function, such as a camera or a smartphone. The image sensor 11 includes an imaging unit 21 and a transmission unit 22, and the DSP 12 includes a reception unit 31 and an image processing unit 32.

The imaging unit 21 of the image sensor 11 includes an imaging element such as a complementary metal oxide semiconductor (CMOS) image sensor, and performs photoelectric conversion of light received via a lens. The imaging unit 21 performs A/D conversion or the like of a signal obtained by photoelectric conversion, and sequentially outputs pixel data included in an image of one frame to the transmission unit 22, for example, data of one pixel at a time.

The transmission unit 22 allocates the data of each pixel supplied from the imaging unit 21 to a plurality of transmission paths, and transmits the pieces of data to the DSP 12 in parallel via the plurality of transmission paths. In the example of FIG. 1, the pixel data is transmitted using eight transmission paths. The transmission path between the image sensor 11 and the DSP 12 may be a wired transmission path or a wireless transmission path. Hereinafter, the transmission path between the image sensor 11 and the DSP 12 is appropriately referred to as a lane.

The reception unit 31 of the DSP 12 receives the pixel data transmitted from the transmission unit 22 via the eight lanes, and sequentially outputs the data of each pixel to the image processing unit 32.

The image processing unit 32 generates an image of one frame on the basis of the pixel data supplied from the reception unit 31, and performs various types of image processing using the generated image.

The image data transmitted from the image sensor 11 to the DSP 12 is, for example, raw data. In the image processing unit 32, various types of processing such as compression of image data, display of an image, and recording of image data on a recording medium are performed. Instead of the raw data, JPEG data and additional data other than the pixel data may be transmitted from the image sensor 11 to the DSP 12.

As described above, transmission and reception of data using a plurality of lanes are performed between the transmission unit 22 provided in the image sensor 11 of the transmission system 1 and the reception unit 31 provided in the DSP 12 serving as an information processing unit on a host side.

It is also possible to provide a plurality of sets of the transmission units 22 and the reception units 31. In this case, the transmission and reception of data using the plurality of lanes are performed between each set of the transmission unit 22 and the reception unit 31.

The transmission and reception of data between the transmission unit 22 and the reception unit 31 are performed, for example, according to scalable low voltage signaling-embedded clock (SLVS-EC) which is a standard of a communication interface (IF).

In the SLVS-EC, an application layer, a link layer, and a physical (PHY) layer are defined according to a content of signal processing. Signal processing of each layer is performed in each of the transmission unit 22 on a transmission side (Tx) and the reception unit 31 on a reception side (Rx).

Although details will be described later, signal processing for implementing the following functions is basically performed in the link layer.

1. Pixel Data-Byte Data Conversion
2. Error Correction of Payload Data
3. Transmission of Packet Data and Auxiliary Data
4. Error Correction of Payload Data Using Packet Footer
5. Lane Management
6. Protocol Management for Packet Generation Meanwhile, basically, signal processing for implementing the following functions is performed in the physical layer.

1. Generation and Extraction of Control Code
2. Control of Bandwidth
3. Control of Skew Between Lanes
4. Arrangement of Symbols
5. Symbol Coding for Bit Synchronization
6. Serializer/Deserializer (SERDES)
7. Generation and Reproduction of Clock
8. Transmission of Scalable Low Voltage Signaling (SLVS) Signal FIG. 2 is a block diagram illustrating an example of configurations of the transmission unit 22 and the reception unit 31.

Figure 2:
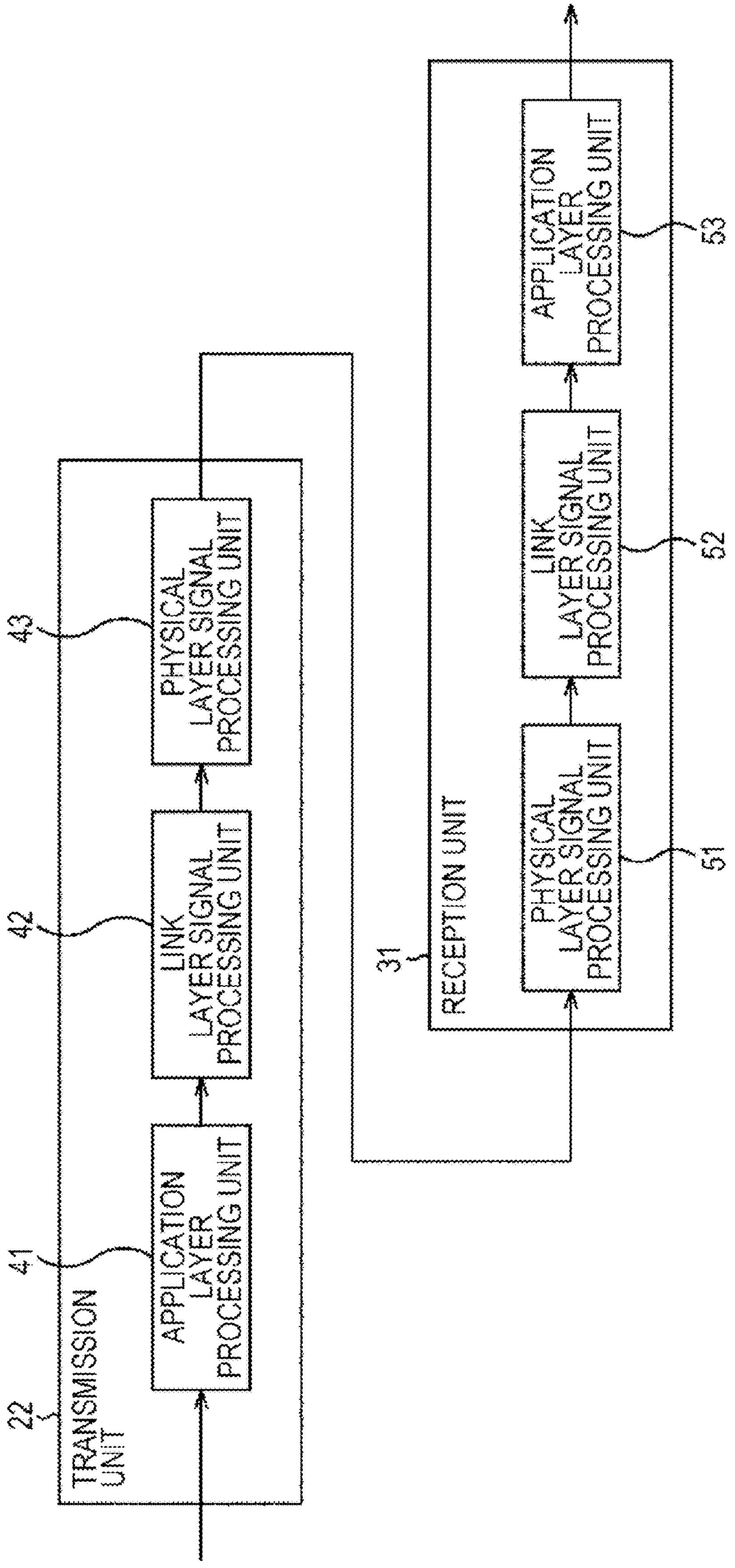
FIG. 2 is a block diagram illustrating an example of configurations of a transmission unit and a reception unit.

As illustrated in FIG. 2, the transmission unit 22 includes an application layer processing unit 41, a link layer signal processing unit 42, and a physical layer signal processing unit 43. The transmission unit 22 includes a signal processing unit that performs signal processing in the link layer on the transmission side and a signal processing unit that performs signal processing in the physical layer on the transmission side.

The application layer processing unit 41 acquires the pixel data output from the image sensor 11 and performs application layer processing on output data as a transmission target. In the application layer processing unit 41, the application layer processing is performed using the image data of each frame as the output data. Frame data having a predetermined format is generated by the application layer processing. The application layer processing unit 41 outputs data included in the frame data to the link layer signal processing unit 42.

The link layer signal processing unit 42 performs link layer signal processing on the data supplied from the application layer processing unit 41. In the link layer signal processing unit 42, at least generation of a packet that stores the frame data and processing of distributing packet data to the plurality of lanes are performed in addition to the above-described processing. A packet that stores data included in the frame data is output from the link layer signal processing unit 42.

The physical layer signal processing unit 43 performs physical layer signal processing on the packet supplied from the link layer signal processing unit 42. In the physical layer signal processing unit 43, processing including processing of inserting a control code into the packet distributed to each lane is performed in parallel for each lane. A data stream of each lane is output from the physical layer signal processing unit 43 and transmitted to the reception unit 31. Note that, the application layer processing unit 41, the link layer signal processing unit 42 and the physical layer signal processing unit 43 are examples of a controller in the present disclosure.

Meanwhile, the reception unit 31 includes a physical layer signal processing unit 51, a link layer signal processing unit 52, and an application layer processing unit 53. The reception unit 31 includes a signal processing unit that performs signal processing in the physical layer on the reception side and a signal processing unit that performs signal processing in the link layer on the reception side.

The physical layer signal processing unit 51 receives the data stream transmitted from the physical layer signal processing unit 43 of the transmission unit 22, and performs the physical layer signal processing on the received data stream. In the physical layer signal processing unit 51, processing including symbol synchronization processing and control code removal is performed in parallel for each lane in addition to the above-described processing. A data stream including the packet that stores the data included in the frame data is output from the physical layer signal processing unit 51 by using the plurality of lanes.

The link layer signal processing unit 52 performs link layer signal processing on the data stream of each lane supplied from the physical layer signal processing unit 51. In the link layer signal processing unit 52, at least processing of integrating the data streams of the plurality of lanes into single system data and processing of acquiring a packet included in the data stream are performed. Data extracted from the packet is output from the link layer signal processing unit 52.

The application layer processing unit 53 performs application layer processing on the frame data including the data supplied from the link layer signal processing unit 52. As the application layer processing, processing for implementing functional safety and implementing security is performed. The application layer processing unit 53 outputs output data after the application layer processing to the image processing unit 32 in the subsequent stage. The application layer processing performed on the transmission side in order to perform the application layer processing on the reception side is also processing for implementing functional safety and implementing security.

<SLVS-EC Frame Format>

Figure 3:
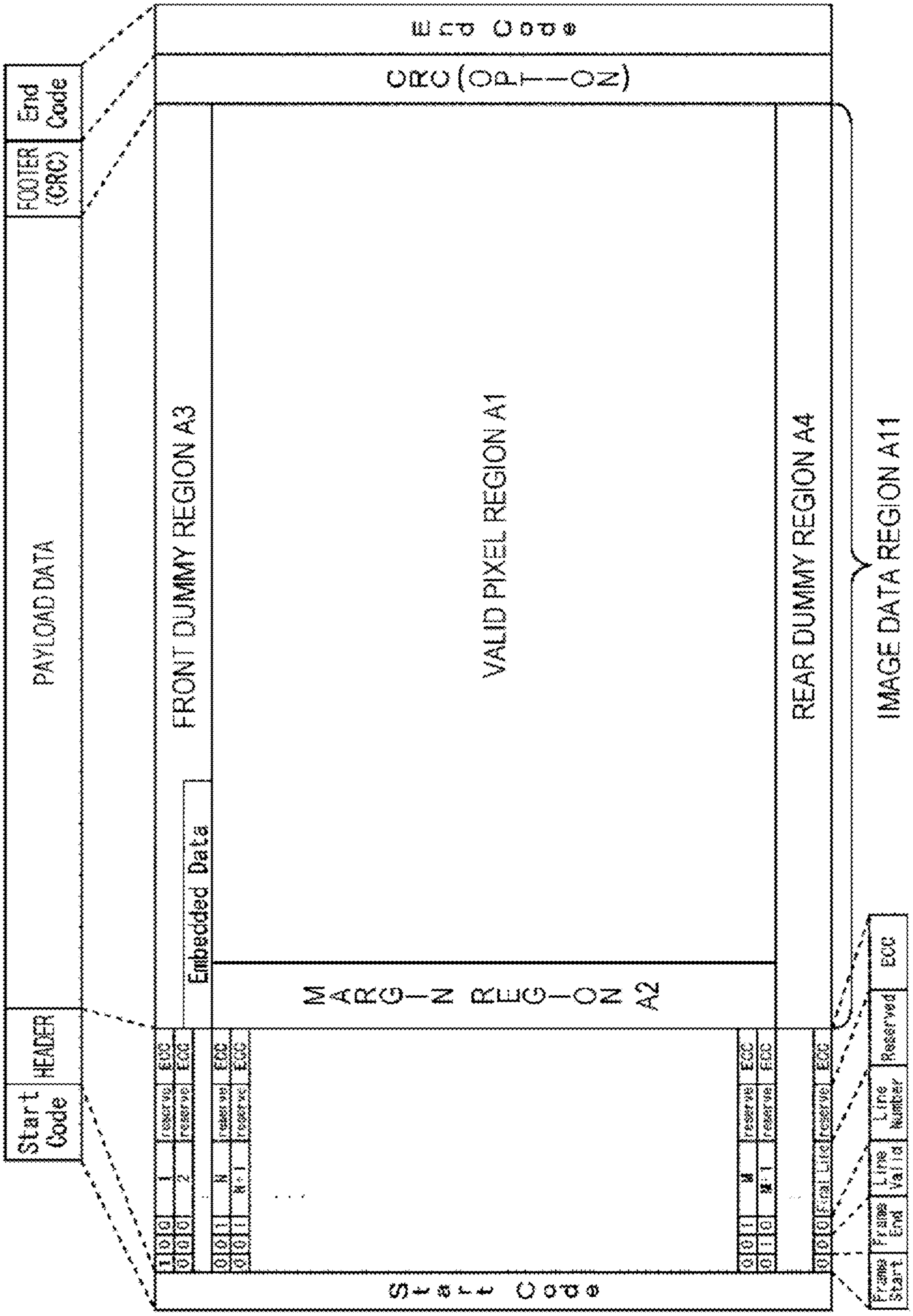
FIG. 3 is a diagram illustrating an example of a format used for transmission of image data of each frame.

FIG. 3 is a diagram illustrating an example of a format used for transmission of the image data of each frame.

A valid pixel region A1 is a region of valid pixels of an image of one frame captured by the imaging unit 21. A margin region A2 is set on the left side of the valid pixel region A1.

A front dummy region A3 is set above the valid pixel region A1. In the example of FIG. 3, embedded data is inserted to the front dummy region A3. The embedded data includes information of a set value related to imaging by the imaging unit 21, such as a shutter speed, an aperture value, and a gain. The embedded data may also include contents, a format, a data size, and the like.

A rear dummy region A4 is set below the valid pixel region A1. The embedded data may also be inserted to the rear dummy region A4.

The valid pixel region A1, the margin region A2, the front dummy region A3, and the rear dummy region A4 constitute an image data region A11.

A header is added ahead of each line included in the image data region A11, and Start Code is added ahead of the header. Furthermore, a footer is optionally added behind each line included in the image data region A11, and a control code such as End Code is added behind the footer. In a case where the footer is not added, the control code such as End Code is added behind each line included in the image data region A11.

Data transmission is performed using frame data in the format illustrated in FIG. 3 for each image of one frame captured by the imaging unit 21.

The upper band in FIG. 3 illustrates a structure of a packet used for transmission of the frame data illustrated on the lower side. Assuming that arrangement of data in a horizontal direction is a line, data constituting one line of the image data region A11 is stored in a payload of the packet. The entire frame data of one frame is transmitted using packets whose number is equal to or larger than the number of pixels of the image data region A11 in a vertical direction. Furthermore, transmission of the entire frame data of one frame is performed, for example, by transmitting a packet that stores data in units of lines in order from data arranged in the upper line.

One packet is configured by adding the header and the footer to the payload in which data for one line is stored. At least Start Code and End Code which are the control codes are added to each packet.

Figure 4:
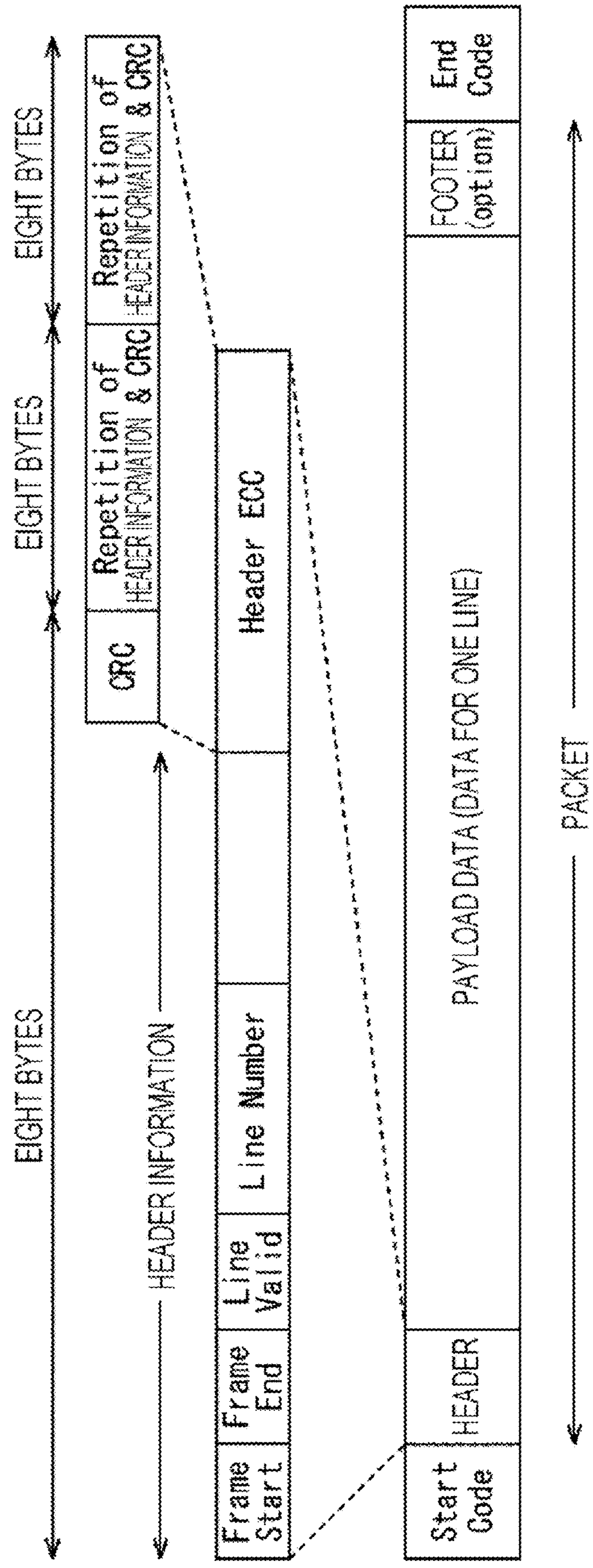
FIG. 4 is a diagram illustrating a data structure of a packet.

FIG. 4 is an enlarged view illustrating a data structure of the packet.

The entire one packet includes the header and payload data that is data for one line included in the frame data.

The header includes additional information of data stored in the payload, such as Frame Start, Frame End, Line Valid, Line Number, and ECC. In the example of FIG. 4, Frame Start, Frame End, Line Valid, and Line Number are illustrated as the header information.

Frame Start is 1-bit information indicating a head of a frame. A value of 1 is set for Frame Start of the header of the packet used for transmission of data of the first line of the frame data, and a value of 0 is set for Frame Start of the header of the packet used for transmission of data of another line.

Frame End is 1-bit information indicating an end of the frame. A value of 1 is set for Frame End of the header of the packet including data of an end line of the frame data, and a value of 0 is set for Frame End of the header of the packet used for transmission of data of another line.

Frame Start and Frame End are pieces of frame information that are information regarding the frame.

Line Valid is 1-bit information indicating whether or not a line of data stored in the packet is a line of valid pixels. A value of 1 is set for Line Valid of the header of the packet used for transmission of pixel data of the line in the valid pixel region A1, and a value of 0 is set for Line Valid of the header of the packet used for transmission of data of another line.

Line Number is 13-bit information indicating a line number of a line in which the data stored in the packet is arranged.

Line Valid and Line Number are line information that is information regarding the line.

As will be described later, the header information also includes information such as functional safety information and a flag indicating whether or not security information is included in the packet.

Header ECC arranged following the header information includes a cyclic redundancy check (CRC) code which is a 2-byte error detection code calculated on the basis of 6-byte header information. Furthermore, Header ECC includes two pieces of information that are the same as 8-byte information that is a set of the header information and the CRC code, subsequent to the CRC code.

<<Transmission of Functional Safety Information and Security Information>>

<Frame Format>

Figure 5:
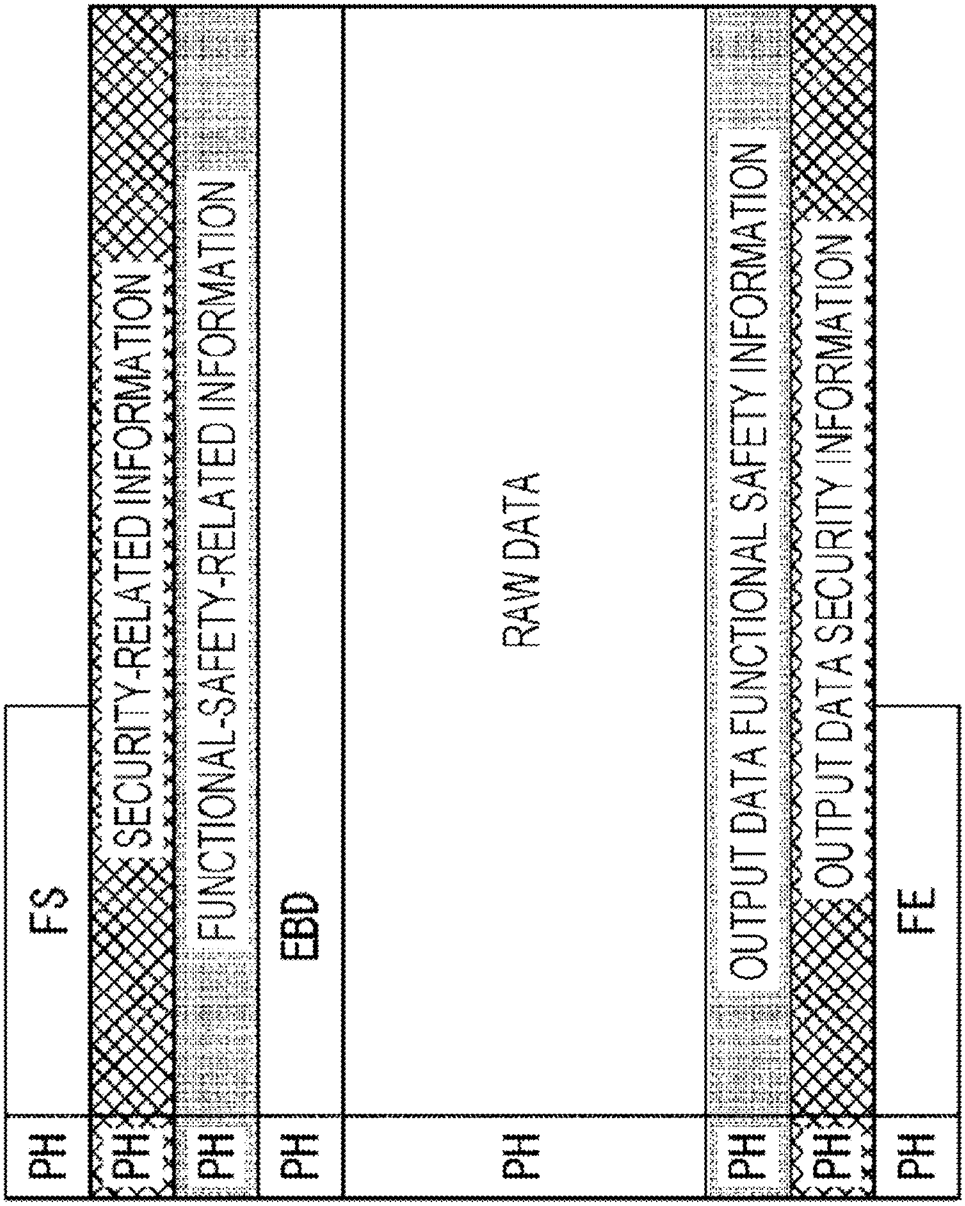
FIG. 5 is a diagram illustrating an example of a frame format according to an embodiment of the present technology.

FIG. 5 is a diagram illustrating an example of a frame format according to an embodiment of the present technology.

The frame format illustrated in FIG. 5 is configured by arranging security-related information, functional-safety-related information, and the embedded data (EBD) in each line ahead of the image data (raw data) of one frame. The functional-safety-related information is arranged in a line next to the line in which the security-related information is arranged, and the EBD is arranged in a line next to the line in which the functional-safety-related information is arranged. The image data for one frame, which is data of the plurality of lines, is arranged behind the line in which the BBD is arranged.

In addition, the frame format illustrated in FIG. 5 is configured by arranging output data functional safety information and output data security information in each line behind the image data for one frame. The output data security information is arranged in a line next to the line in which the output data functional safety information is arranged.

A line of Frame Start (FS) and a line of Frame End (FE) are arranged at the head and the end of the frame format, respectively. The line of Frame Start is a line of data in which a value of 1 is set for Frame Start of a packet header. Furthermore, the line of Frame End is a line of data in which a value of 1 is set for Frame End of the packet header.

One or more lines may be set as a line in which each of the security-related information, the functional-safety-related information, the EBD, the output data security information, and the output data functional safety information is arranged.

The packet header (PH) added to data of each line is illustrated at a left end of each line in FIG. 5. Note that, in FIG. 5, illustration of the margin region and the like described with reference to FIG. 3 is omitted.

The security-related information is information used for implementing security of the image sensor 11. Information used for implementing security of communication between the image sensor 11 and the DSP 12 is also included in the security-related information. Information regarding a malicious action such as an attack on the image sensor 11 is included in the security-related information.

As illustrated in FIG. 6, the security-related information includes the following information.

- Information of security error/warning of register communication
- Information indicating detection of attack on inside of sensor
- Information for analysis of security error/warning
- Internal state information
- Operation-mode-related information Information for making notification that register communication has occurred Frame counter Information of data size of one frame In a case where the image sensor 11 has detected a failure (error/warning) in security of register communication performed between the image sensor 11 and the DSP 12, the information of the security error/warning of the register communication is used as information for notifying the DSP 12 of the detection. In addition to data transmission via the lane, the register communication via a predetermined signal line is performed between the image sensor 11 and the DSP 12.

In a case where the image sensor 11 has detected an attack on the image sensor 11, the information indicating the detection of the attack on the inside of the sensor is used as information for notifying the DSP 12 of the detection.

The information for analysis of the security error/warning is information such as the number of times of occurrence of the failure. The DSP 12 performs the analysis of the security error and warning on the basis of the information such as the number of times of occurrence of the failure.

The internal state information is information indicating the state of the image sensor 11. On/off of a security operation or the like is indicated by the internal state information.

In a case where the security operation is turned on, the security-related information and the output data security information are included in the frame data transmitted by the image sensor 11 by processing performed by the application layer processing unit 41 of the image sensor 11. Further, in a case where the security operation is turned on, the application layer processing unit 53 of the DSP 12 performs processing for implementing security by using the security-related information and the output data security information.

The operation-mode-related information is information indicating an operation mode of the image sensor 11, such as how to read the pixel data and an angle of view.

The information for making a notification that the register communication has occurred is a counter value of the number of times of occurrence of communication.

The frame counter is a counter value of the number of frames.

The information of the data size of one frame is information of the data size of one frame data.

Returning to the description of FIG. 5, the functional-safety-related information is information used for implementing functional safety of the image sensor 11. The functional safety means achieving a state in which there is no unacceptable risk as a function of the image sensor 11. The information used for implementing functional safety of communication between the image sensor 11 and the DSP 12 is also included in the functional-safety-related information.

As illustrated in FIG. 6, the functional-safety-related information includes the following information.

Information of functional safety error/warning of register communication

Information of failure inside sensor

Information indicating detection of irregular operation of sensor

Information for analysis of functional safety error/warning

Internal state information

Operation-mode-related information

Information for making notification that register communication has occurred

Frame counter

Information of data size of one frame

As indicated by a broken line, the internal state information, the operationmode-related information, the information for making a notification that the register communication has occurred, the frame counter, and the information of the data size of one frame are information commonly included in the security-related information and the functional-safety-related information. An overlapping description will be omitted as appropriate.

In a case where the image sensor 11 has detected a functional safety failure of register communication performed between the image sensor 11 and the DSP 12, the information regarding the functional safety error/warning of the register communication is used as information for notifying the DSP 12 of the detection. In a case where the register communication is difficult to be normally performed due to noise or the like, a functional safety failure is detected.

The information of the failure inside the sensor is information indicating that a failure of the image sensor 11 has occurred.

The information indicating the detection of the irregular operation of the sensor is information indicating that the irregular operation has been performed in the image sensor 11.

The information for analysis of the functional safety error/warning is information such as the number of times of occurrence of the failure and the irregular operation. The DSP 12 performs the analysis of the functional safety error and warning on the basis of the information such as the number of times of occurrence of the failure.

On/off of the functional safety operation is indicated by the internal state information of the functional-safety-related information.

In a case where the functional safety operation is turned on, the frame data transmitted by the image sensor 11 includes the functional-safety-related information and the output data functional safety information by processing performed by the application layer processing unit 41 of the image sensor 11. In addition, in a case where the functional safety operation is turned on, the application layer processing unit 53 of the DSP 12 performs processing for implementing functional safety by using the functional-safety-related information and the output data functional safety information.

The output data functional safety information is information used for implementing functional safety of the output data (the image data as the transmission target) itself. For example, a CRC value that is an error detection code obtained by computation using the output data is included in the output data functional safety information. Other information such as information indicating a computation mode of CRC computation may be included in the output data functional safety information.

The output data security information is information used for implementing security of the output data itself. For example, a message authentication code (MAC) value that is an authentication code obtained by computation using the output data and initialization vector (IV) information are included in the output data security information. Other information such as the information indicating the computation mode of the MAC computation may be included in the output data security information.

Figure 7:
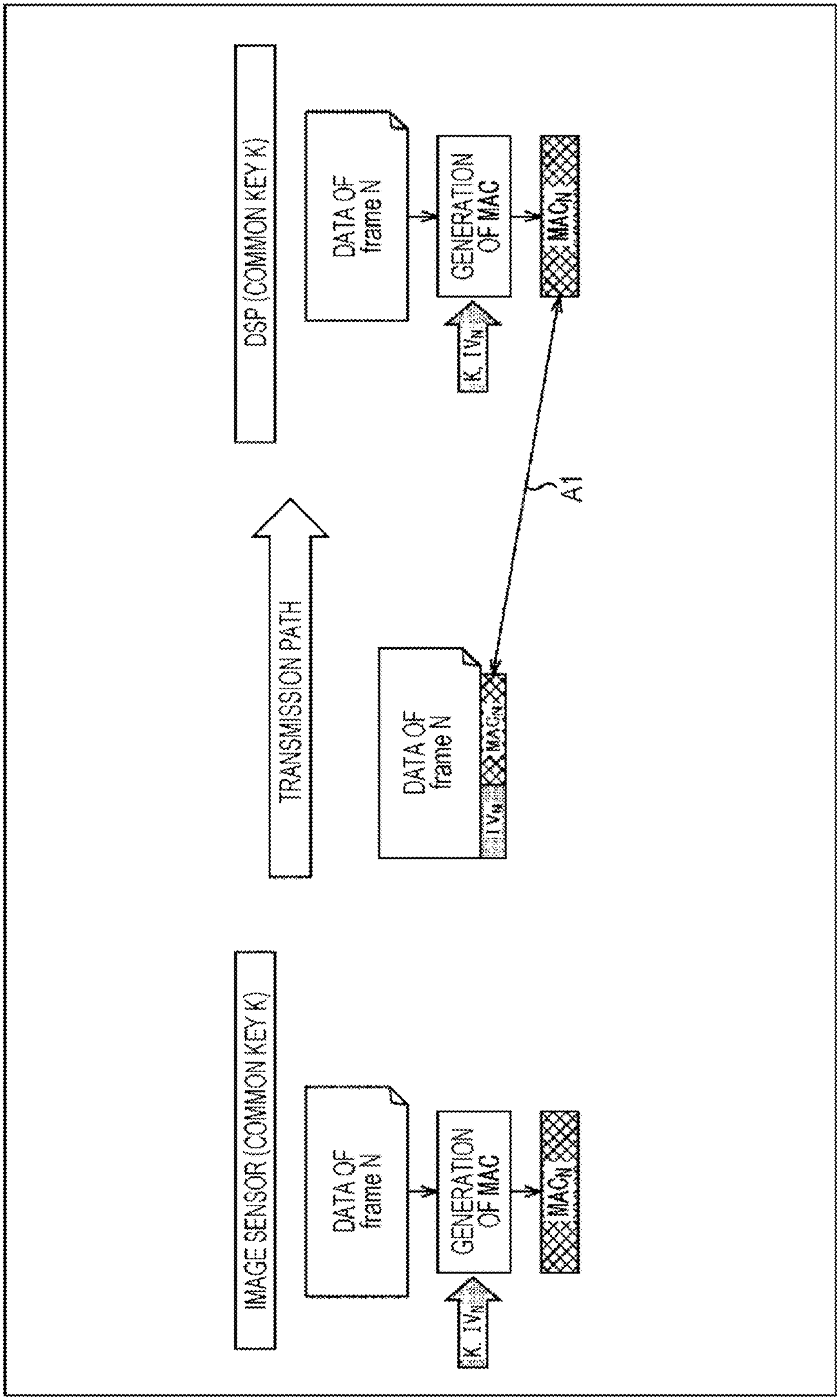
FIG. 7 is a diagram illustrating an example of authentication using a message authentication code (MAC) value.

FIG. 7 is a diagram illustrating an example of processing using the output data security information.

The left side of FIG. 7 illustrates processing performed in the application layer processing unit 41 of the image sensor 11, and the right side of FIG. 7 illustrates processing performed in the application layer processing unit 53 of the DSP 12. A common key K is prepared for the application layer processing unit 41 and the application layer processing unit 53.

As illustrated on the left side of FIG. 7, in the application layer processing unit 41, the MAC computation using the common key K and $IV_N$ information is performed on image data of a frame N as the output data, and an $MAC_N$ value is generated. The $IV_N$ information and the $MAC_N$ value are added to the image data of the frame N as the output data security information, and are transmitted to the DSP 12.

Meanwhile, as illustrated on the right side of FIG. 7, in the application layer processing unit 53, the MAC computation using the common key K and the $IV_N$ information added to the image data is performed on the image data of the frame N, and an $MAC_N$ value is generated. As indicated by an arrow A1, processing of comparing the $MAC_N$ value generated in the application layer processing unit 53 with the $MAC_N$ value added to the image data is performed as processing for implementing security of the image data of the frame N.

In the processing for implementing security, in a case where the MAC values coincide with each other, it is determined that security is secured (data is not falsified), and in a case where the $MAC_N$ values are different from each other, it is determined that security is not secured. By adding the MAC value to the image data of each frame, it is possible to guarantee integrity of the image data.

Error detection processing using the CRC value that is the output data functional safety information is performed in a similar manner. In the computation of the CRC value, the IV information is unnecessary. Note that the IV information is unnecessary also for the processing using the MAC value depending on the algorithm. In a case where Galois message authentication code (GMAC) is used as the MAC method, the IV information is necessary.

Figure 8:
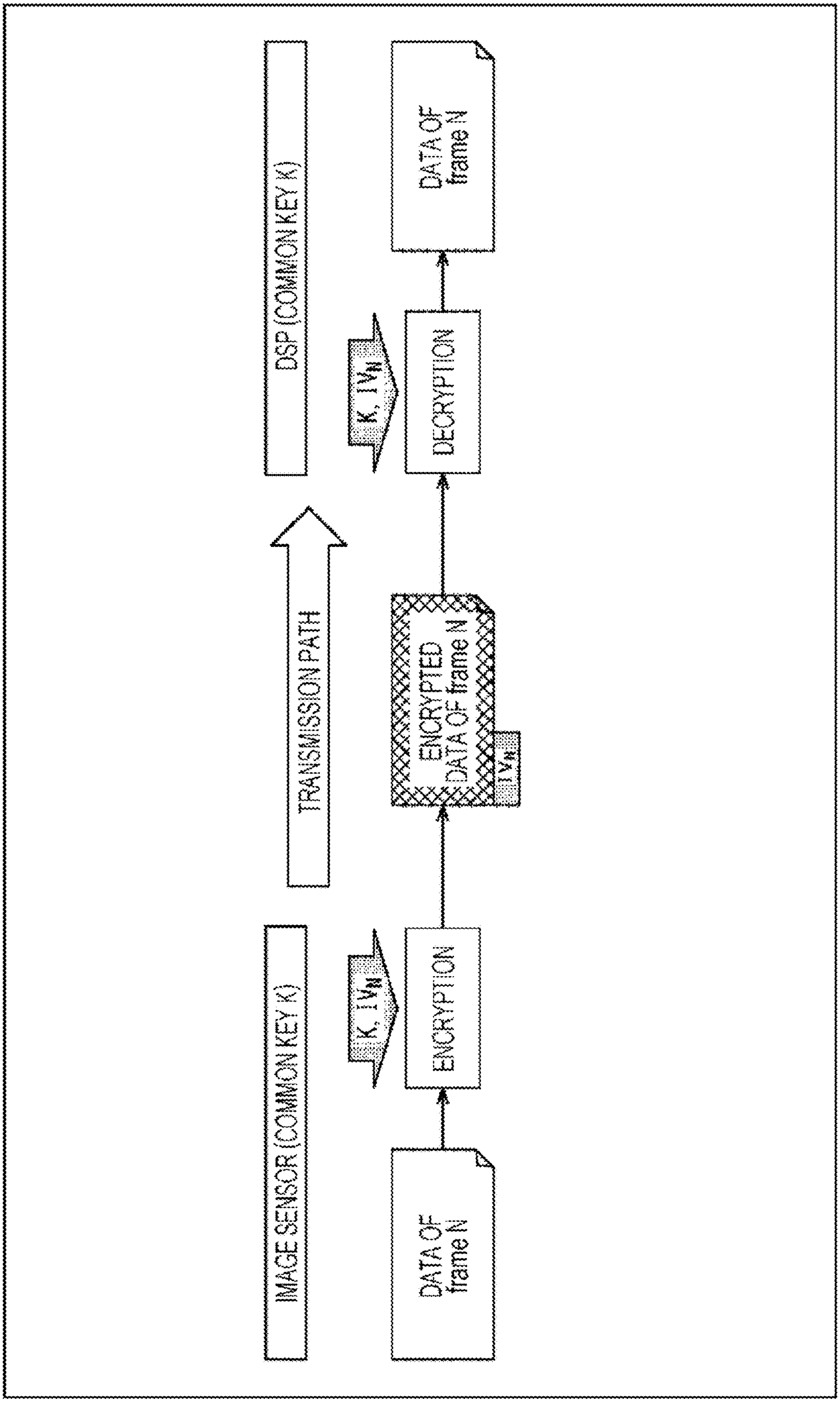
FIG. 8 is a diagram illustrating an example of encryption and decryption of image data.

FIG. 8 is a diagram illustrating an example of encryption and decryption of the output data.

The left side of FIG. 8 illustrates processing performed in the application layer processing unit 41 of the image sensor 11, and the right side of FIG. 8 illustrates processing performed in the application layer processing unit 53 of the DSP 12. A common key K is prepared for the application layer processing unit 41 and the application layer processing unit 53.

As illustrated on the left side of FIG. 8, in the application layer processing unit 41, encryption processing using the common key K and the $IV_N$ information is applied to the image data of the frame N as the output data. The $IV_N$ information used for the encryption processing is added to encrypted data of the frame N obtained by the encryption processing and transmitted to the DSP 12.

Meanwhile, as illustrated on the right side of FIG. 8, in the application layer processing unit 53, decryption processing using the common key K held by the application layer processing unit 53 and the $IV_N$ information added to the encrypted data is applied to the encrypted data of the frame N, and the image data of the frame N is decrypted.

By encrypting the image data itself of each frame, it is possible to guarantee confidentiality of the output data. In order to prevent falsification of the encrypted data, the MAC computation may be further performed. In this case, the encrypted data to which the MAC value is added is transmitted to the DSP 12. In other words, the MAC value can be generated in the application layer processing unit 41 as shown in FIG. 7, and the image data can be encrypted as shown in FIG. 8, and the INv information and the MAC value can be sent to the DSP 12 together with the encrypted image data.

Hereinafter, in a case where it is not necessary to distinguish the security-related information and the functional-safety-related information from each other, the security-related information and the functional-safety-related information are collectively referred to as related information. In addition, in a case where it is not necessary to distinguish the output data functional safety information and the output data security information from each other, the output data functional safety information and the output data security information are collectively referred to as output data additional information in the sense of information added to the output data.

Further, a set of the security-related information and the output data security information is referred to as security information, and a set of the functional-safety-related information and the output data functional safety information is referred to as functional safety information.

Figure 9:
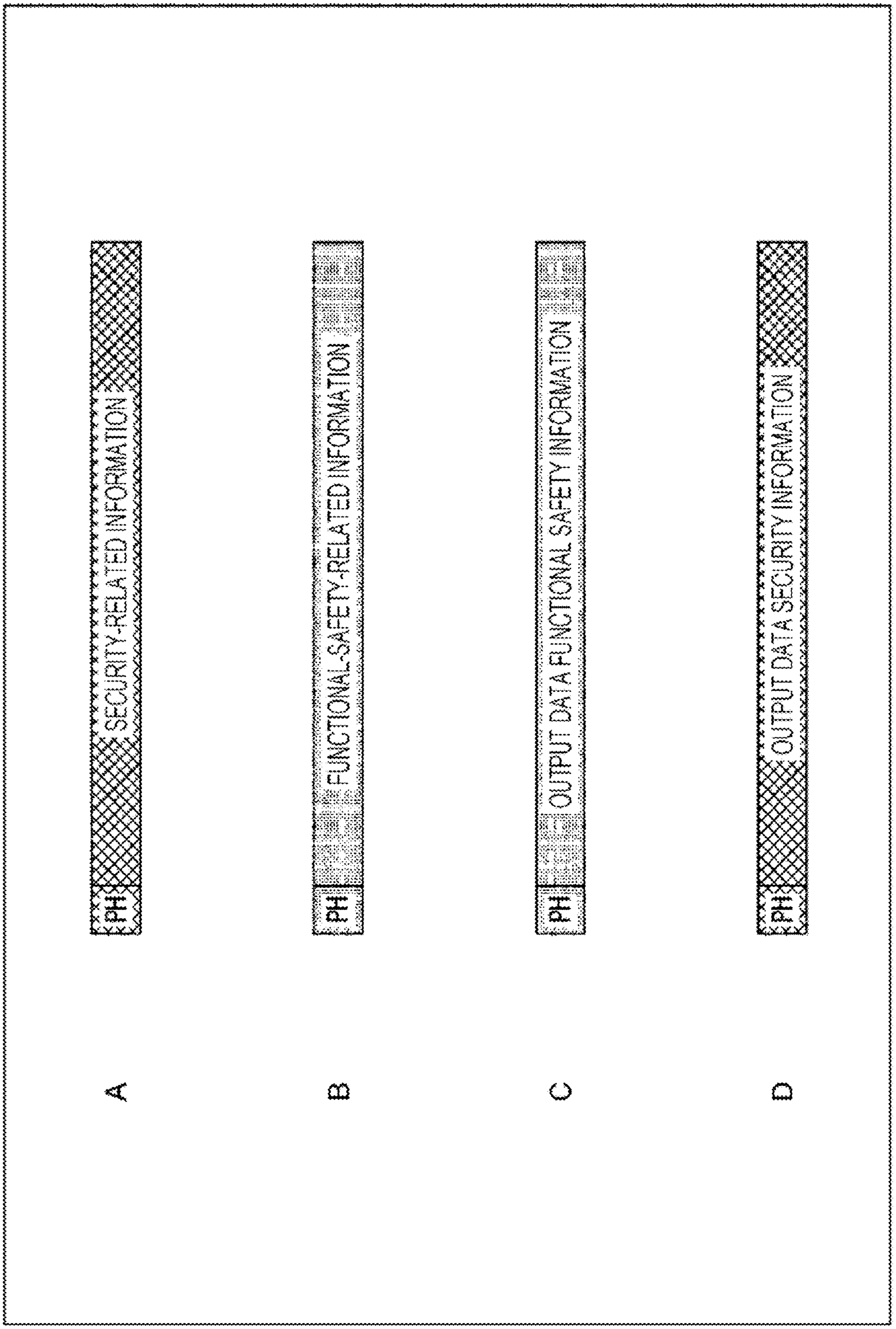
FIG. 9 is a diagram illustrating an example of a packet used for transmitting each piece of information.

Each piece of information is stored in one packet in units of lines as illustrated in A to D of FIG. 9 and transmitted from the image sensor 11 to the DSP 12. In the packet header of each packet, a flag used to identify information stored in each packet is set.

As described above, in the transmission system 1 of FIG. 1, information such as the CRC value and the MAC value is added to the image data of each frame as the output data. The DSP 12 that has received the frame data transmitted from the image sensor 11 can implement security and functional safety in units of frames.

In addition, the related information and the output data additional information transmitted together with the image data of each frame are supplied to the application layer processing unit 53 of the DSP 12 by the physical layer processing and the link layer processing on the reception side of the SLVS-EC. The DSP 12 can implement security and functional safety in units of frames as the application layer processing.

Figure 10:
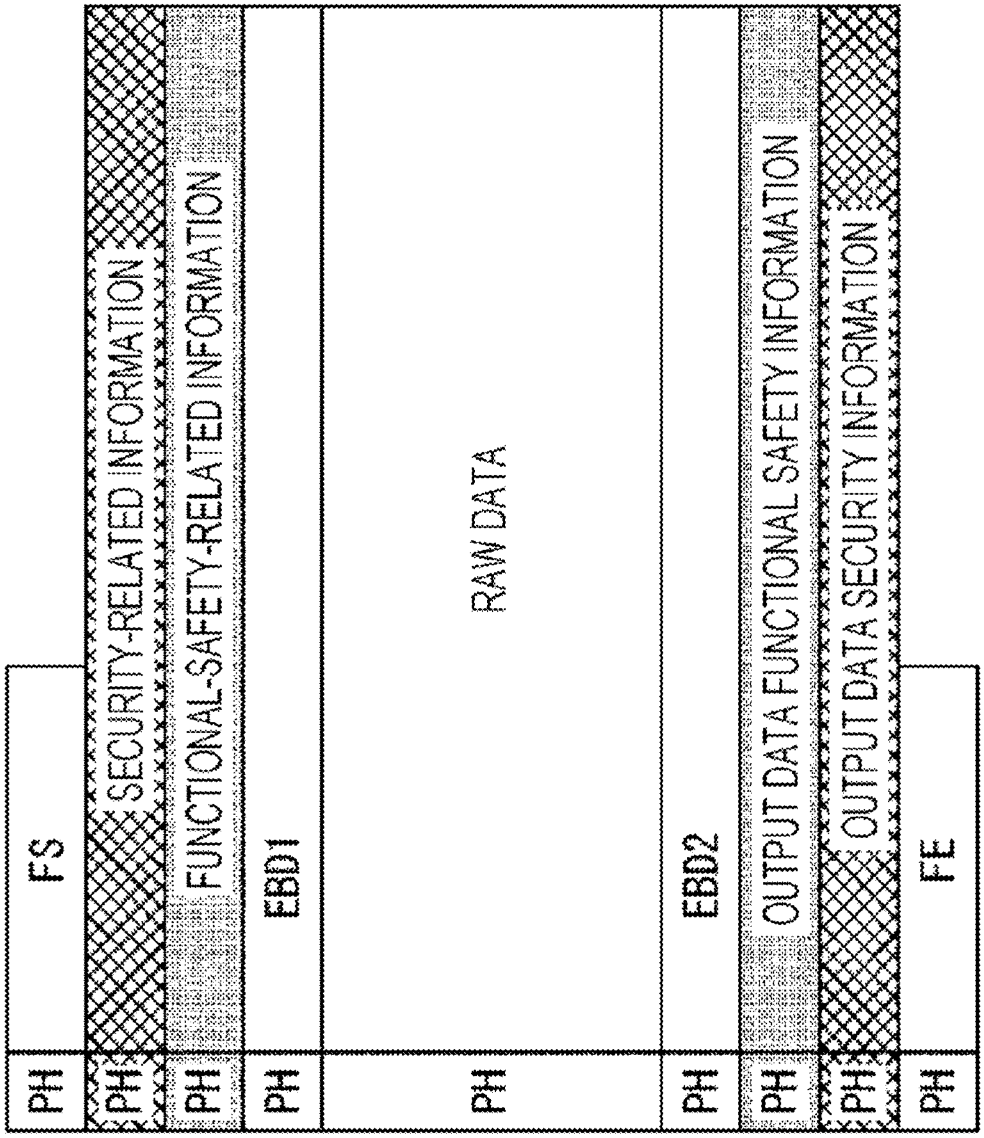
FIG. 10 is a diagram illustrating an example of another frame format.

FIG. 10 is a diagram illustrating an example of another frame format.

As illustrated in FIG. 10, the EBD may be arranged in a line behind the image data of one frame. In FIG. 10, the EBD arranged in a line ahead of the image data of one frame is EBD 1, and the EBD arranged in a line behind the image data of one frame is EBD 2.

<Configuration of Application Layer Processing Unit>

Figure 11:
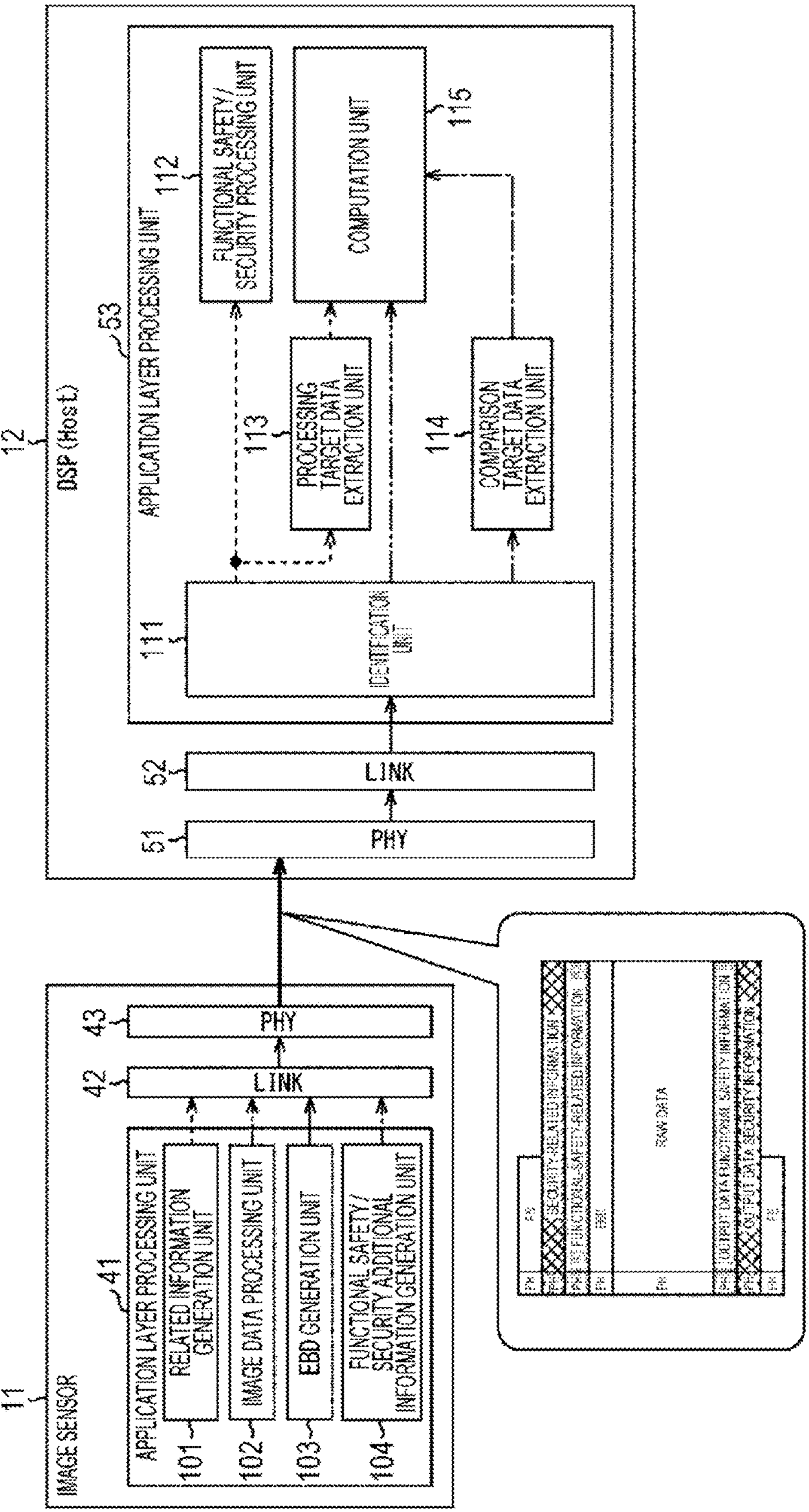
FIG. 11 is a block diagram illustrating an example of a functional configuration of an application layer processing unit.

FIG. 11 is a block diagram illustrating an example of a functional configuration of the application layer processing unit. FIG. 11 mainly illustrates configurations of the application layer processing unit 41 included in the transmission unit 22 of the image sensor 11 and the application layer processing unit 53 included in the reception unit 31 of the DSP 12.

Configuration of Application Layer Processing Unit on Image Sensor Side

The application layer processing unit 41 of the image sensor 11 includes a related information generation unit 101, an image data processing unit 102, an EBD generation unit 103, and a functional safety/security additional information generation unit 104.

The related information generation unit 101 generates the related information. That is, the related information generation unit 101 generates the security-related information in a case where the security operation is turned on, and generates the functional-safety-related information in a case where the functional safety operation is turned on. On/off of the security operation and on/off of the functional safety operation are set by a control unit (not illustrated). The related information generated by the related information generation unit 101 is supplied to the link layer signal processing unit 42.

The image data processing unit 102 acquires the image data as the output data on the basis of the pixel data output from the imaging unit 21. The image data processing unit 102 encrypts the output data using the common key or the like and outputs the encrypted data to the link layer signal processing unit 42.

The EBD generation unit 103 acquires information of the set value related to imaging and generates the EBD. Information other than the set value related to imaging may be included in the EBD. The EBD generated by the EBD generation unit 103 is supplied to the link layer signal processing unit 42.

The functional safety/security additional information generation unit 104 generates the output data additional information. That is, the functional safety/security additional information generation unit 104 generates the output data security information in a case where the security operation is turned on, and generates the output data functional safety information in a case where the functional safety operation is turned on. As described above with reference to FIG. 7, the output data security information and the output data functional safety information are generated by performing computation using the common key or the like on the output data. The output data additional information generated by the functional safety/security additional information generation unit 104 is supplied to the link layer signal processing unit 42.

As described above, the application layer processing unit 41 of the image sensor 11 including the related information generation unit 101, the image data processing unit 102, the EBD generation unit 103, and the functional safety/security additional information generation unit 104 functions as a generation unit that generates the frame data having the format as described with reference to FIG. 5.

The link layer processing is performed on the frame data generated by the application layer processing unit 41 in the link layer signal processing unit 42, and the physical layer processing is performed on the frame data in the physical layer signal processing unit 43. The data stream obtained by the physical layer processing is transmitted to the DSP 12 as illustrated in a balloon.

Details of Header Information

Here, details of the header information included in the packet header will be described. As described above with reference to FIG. 4, the packet header includes the header information and the CRC value of the header. One set of the header information and the CRC value of the header is 8-byte information.

FIGS. 12 and 13 are diagrams illustrating an example of allocation of each bit included in the header information.

FIG. 12 illustrates 32 bits ([63:32]) from bit that is the most significant bit to bit among 64 bits included in one set of the header information and the CRC value of the header.

Main information will be described. Frame Start is allocated to one bit [63], and Frame End is allocated to one bit [62]. Line Valid is allocated to one bit [61], and Line Number is allocated to 13 bits [60:48]. EBD Line is allocated to one bit [47], and Header Info Type is allocated to three bits [42:40].

EBD Line is a flag indicating whether or not the data stored in the packet is the data of the line in which the EBD is arranged. For example, the value of EBD Line being 1 indicates that the EBD is stored in the packet to which the packet header including EBD Line is added. Further, the value of EBD Line being 0 indicates that the EBD is not stored in the packet to which the packet header including EBD Line is added.

Header Info Type of bits [42:40] is information designating a content of bits [31:16].

For example, in a case where the value of Header Info Type is “000” or “001”, the meaning of bit [17]/bit may be changed by the value of Header Info Type. For example, as illustrated in FIG. 13, Safety Info is allocated to one bit [17], and Security Info is allocated to one bit [16]. A of FIG. 13 illustrates allocation in a case where the value of Header Info Type is “000”, and B of FIG. 13 illustrates allocation in a case where the value of Header Info Type is “001”.

Safety Info is a flag indicating whether or not the data stored in the packet is the data of the line in which the functional safety information is arranged.

Security Info is a flag indicating whether or not the data stored in the packet is the data of the line in which the security information is arranged.

FIG. 14 is a diagram illustrating an example of the values of Safety Info and Security Info.

As illustrated on the upper side of FIG. 14, the value of Safety Info being 1 indicates that at least one of the functional-safety-related information or the output data functional safety information is stored in the packet to which the packet header including Safety Info is added. The fact that the value of Safety Info being 0 indicates that the functional safety related information and the output data functional safety information are not stored in the packet to which the packet header including Safety Info is added.

Meanwhile, as illustrated on the lower side of FIG. 14, the value of Security Info being 1 indicates that at least one of the security-related information or the output data security information is stored in the packet to which the packet header including Security Info is added. The value of Security Info being 0 indicates that the security-related information and the output data security information are not stored in the packet to which the packet header including Security Info is added.

Figure 15:
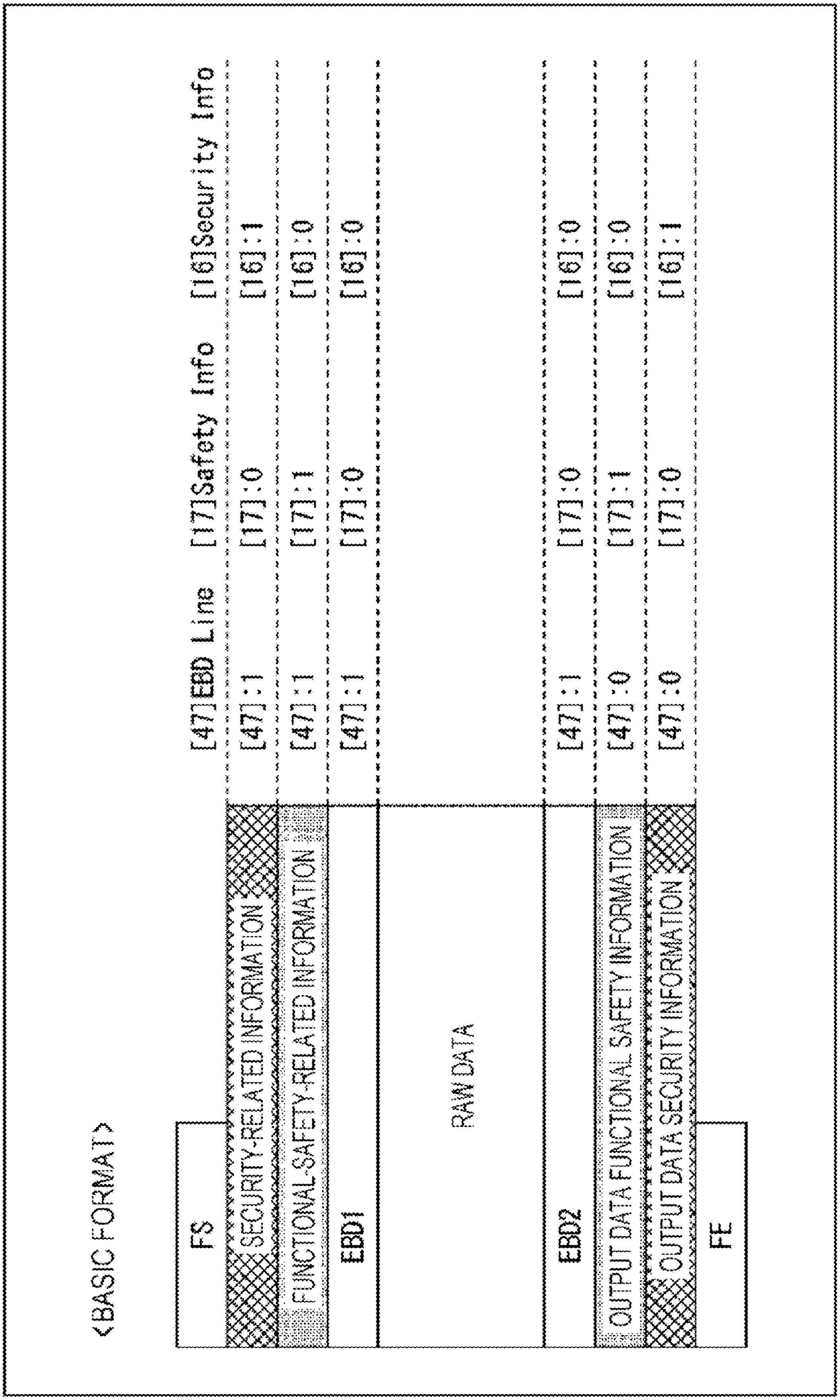
FIG. 15 is a diagram illustrating an example of a value of the header information.

FIG. 15 is a diagram illustrating an example of a value of the header information.

As illustrated on the right side of the line in which the security-related information is arranged, values of 1, 0, and 1 are respectively set for EBD Line (bit [47]), Safety Info (bit [17]), and Security Info (bit [16]) of the packet header added to the packet that stores the security-related information.

As illustrated on the right side of the line in which the functional safety-related information is arranged, values of 1, 1, and 0 are respectively set for EBD Line, Safety Info, and Security Info of the packet header added to the packet that stores the functional safety-related information.

As illustrated on the right side of the line in which the EBD 1 is disposed, values of 1, 0, and 0 are respectively set for EBD Line, Safety Info, and Security Info of the packet header added to the packet that stores the EBD 1.

As described above, similarly to the packet that stores the EBD 1, the packet header in which a value of 1 is set as the value of EBD Line is added to the packet that stores the security-related information and the packet that stores the functional-safety-related information. In the DSP 12 on the reception side, the security-related information and the functional-safety-related information are processed as information similar to the EBD.

As illustrated on the right side of the line in which the EBD 2 is disposed, values of 1, 0, and 0) are respectively set for EBD Line, Safety Info, and Security Info of the packet header added to the packet that stores the EBD 2.

As illustrated on the right side of the line in which the output data functional safety information is arranged, values of 0, 1, and 0 are respectively set for EBD Line, Safety Info, and Security Info of the packet header added to the packet that stores the output data functional safety related information.

As illustrated on the right side of the line in which the output data security information is arranged, values of 0, 0, and 1 are respectively set for EBD Line, Safety Info, and Security Info of the packet header added to the packet that stores the output data security information.

The packet header including the header information having the value as illustrated in FIG. 15 is generated by the link layer signal processing unit 42 under the control of the application layer processing unit 41. Hereinafter, the frame format illustrated in FIG. 15 will be appropriately described as a basic format.

Configuration of Application Layer Processing Unit on DSP Side

Returning to the description of FIG. 11, the application layer processing unit 53 of the DSP 12 includes an identification unit 111, a functional safety/security processing unit 112, a processing target data extraction unit 113, a comparison target data extraction unit. 114, and a computation unit 115. Data of each line included in the frame data obtained by performing the link layer processing in the link layer signal processing unit 52 is input to the identification unit 111. Information of the packet header added to each packet is also input to the identification unit 111.

Note that the physical layer processing is performed on the data transmitted from the image sensor 11 in the physical layer signal processing unit 51, and the link layer processing is performed on the data obtained by the physical layer processing in the link layer signal processing unit 52. The packet transmitted from the image sensor 11 is received by the physical layer signal processing unit 51 and the link layer signal processing unit 52.

The identification unit 111 identifies and outputs the data supplied from the link layer signal processing unit 52 by referring to the header information or the like.

For example, the identification unit 111 identifies and outputs, as the security-related information, the data stored in the packet to which the packet header in which the values of EBD Line, Safety Info, and Security Info are 1, 0, and 1, respectively, is added. Similarly, the identification unit 111 identifies and outputs, as the functional safety-related information, the data stored in the packet to which the packet header in which the values of EBD Line, Safety Info, and Security Info are 1, 1, and 0, respectively, is added. The related information output from the identification unit 111 is supplied to the functional safety/security processing unit 112 and the processing target data extraction unit 113.

The identification unit 111 identifies and outputs, as the EBD, the data stored in the packet to which the packet header in which the values of EBD Line, Safety Info, and Security Info are 1, 0, and 0, respectively, is added. The identification unit 111 outputs the image data identified on the basis of Line Valid, Line Number, and the like. The EBD and the image data output from the identification unit 111 are supplied to the computation unit 115.

The identification unit 111 identifies and outputs, as the output data security information, the data stored in the packet to which the packet header in which the values of EBD Line, Safety Info, and Security Info are 0, 0, and 1, respectively, is added. The identification unit 111 identifies and outputs, as the output data functional safety information, the data stored in the packet to which the packet header in which the values of EBD Line, Safety Info, and Security Info are 0, 1, and 0, respectively, is added. The output data additional information output from the identification unit 111 is supplied to the comparison target data extraction unit 114.

In a case where the security operation is turned on, the functional safety/security processing unit 112 performs processing for implementing security on the basis of the security-related information supplied from the identification unit 111.

For example, in a case where information indicating that a security error of register communication has occurred is included in the security-related information, the functional safety/security processing unit 112 analyzes whether or not the security error is caused by an external attack on the basis of the number of times of occurrence of the error. In a case where it is specified that the security error is caused by an external attack, the functional safety/security processing unit 112 performs processing such as invalidating the image data.

In addition, in a case where the functional safety operation is turned on, the functional safety/security processing unit 112 performs processing for implementing functional safety on the basis of the functional-safety-related information supplied from the identification unit 111.

For example, in a case where information indicating that an irregular operation of the sensor has occurred is included in the functional-safety-related information, the functional safety/security processing unit 112 analyzes whether or not a failure has occurred in the image sensor 11 on the basis of the number of times of occurrence of the irregular operation.

For example, the functional safety/security processing unit 112 also confirms whether or not a frame is missing on the basis of Frame Number included in the header information.

In a case where the related information includes information used for the computation in the computation unit 115, the processing target data extraction unit 113 extracts the information and outputs the information to the computation unit 115. In a case where the related information includes information of the MAC value or information indicating the computation mode of the CRC value, the information is output to the computation unit 115.

As described later, there is also a frame format in which the IV information is included in the security-related information. In a case where the IV information is included in the security-related information, the processing target data extraction unit 113 outputs the IV information extracted from the security-related information to the computation unit 115.

In a case where the security operation is turned on, the comparison target data extraction unit 114 extracts the information of the MAC value, which is comparison target data used for comparison with a computation result, from the output data security information supplied from the identification unit 111 and outputs the extracted information to the computation unit 115. In a case where the IV information is included in the output data security information, the comparison target data extraction unit 114 outputs the IV information extracted from the output data security information to the computation unit 115.

In addition, in a case where the functional safety operation is turned on, the comparison target data extraction unit 114 extracts the information of the CRC value, which is the comparison target data, from the output data functional safety information supplied from the identification unit 111 and outputs the extracted information to the computation unit 115.

In a case where the security operation is turned on, the computation unit 115 performs the MAC computation on the image data and the EBD supplied from the identification unit 111 as described with reference to FIG. 7. The computation unit 115 performs processing for implementing security of the output data by comparing the MAC value obtained by the computation with the MAC value supplied from the comparison target data extraction unit 114.

In addition, in a case where the functional safety operation is turned on, the computation unit 115 performs the CRC computation on the image data and the EBD supplied from the identification unit 111. The computation unit 115 performs processing for implementing functional safety of the output data by comparing the CRC value obtained by the computation with the CRC value supplied from the comparison target data extraction unit 114.

Information indicating a processing result of the computation unit 115 is appropriately supplied together with the image data to a signal processing unit provided downstream of the application layer processing unit 53. The functional safety/security processing unit 112 and the computation unit 115 function as an information processing unit that performs processing for implementing functional safety on the basis of the functional safety information and performs processing for implementing security on the basis of the security information.

<Operations of Image Sensor and DSP>

Here, processing in the image sensor 11 and the DSP 12 having the above configurations will be described.

Operation of Image Sensor 11

First, the processing in the image sensor 11 will be described with reference to the flowchart of FIG. 16. The processing illustrated in FIG. 16 is started, for example, in a case where the pixel data output from the imaging unit 21 is input to the application layer processing unit 41 of the transmission unit 22.

Figure 16:
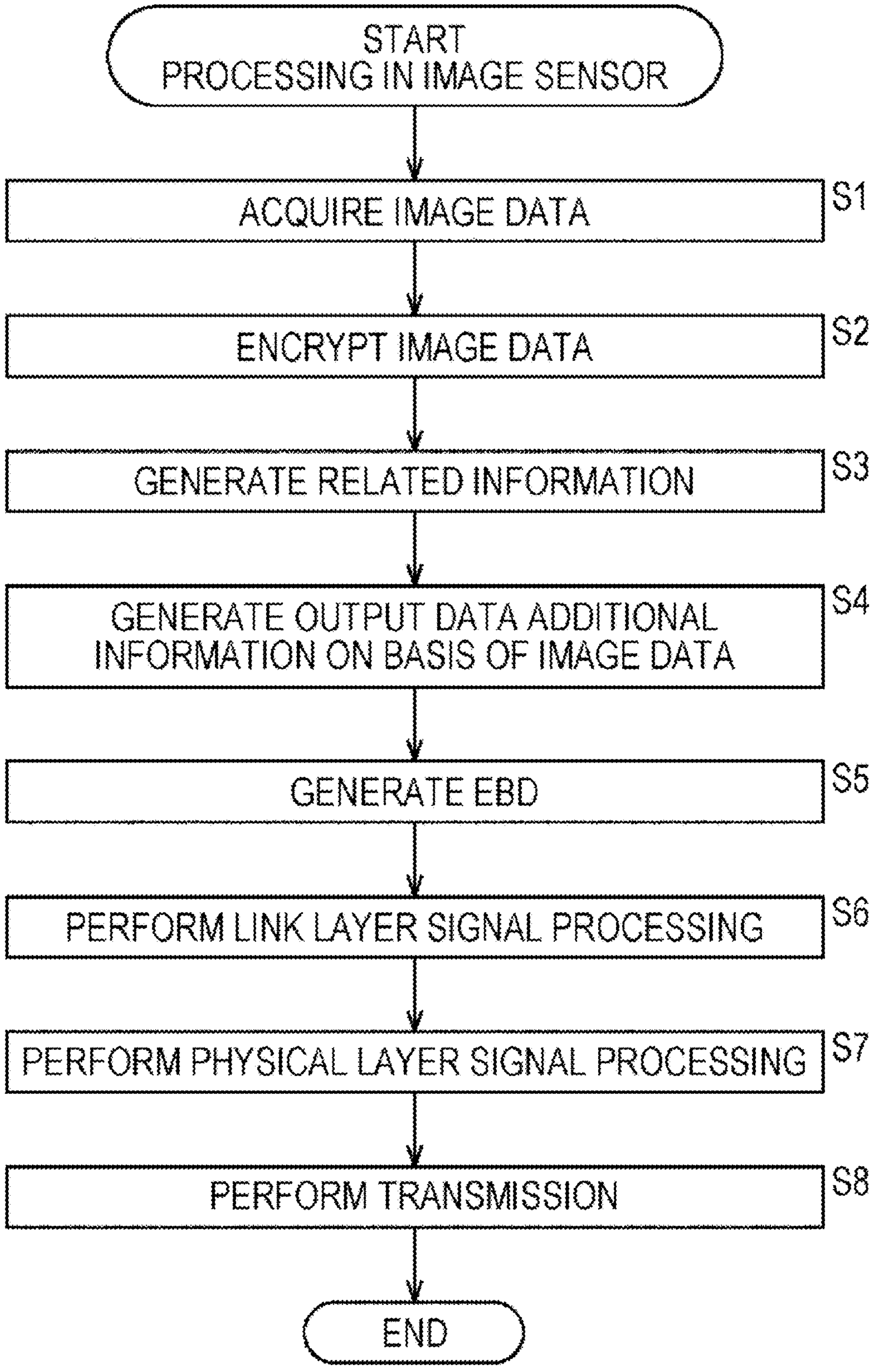
FIG. 16 is a flowchart for explaining processing in an image sensor.

Note that the processing of each step in FIG. 16 is not necessarily performed in the order illustrated in FIG. 16. The processing of each step is appropriately performed in parallel with the processing of other steps or in a different order. The same applies to other flowcharts.

In step S1, the image data processing unit 102 of the application layer processing unit 41 acquires the image data as the output data on the basis of the pixel data output from the imaging unit 21.

In step S2, the image data processing unit 102 encrypts the image data.

In step S3, the related information generation unit 101 generates the security-related information and the functional-safety-related information. Here, it is assumed that both the security operation and the functional safety operation are turned on.

In step S4, the functional safety/security additional information generation unit 104 generates the output data security information and the output data functional safety information on the basis of the image data.

In step S5, the EBD generation unit 103 acquires the information of the set value related to imaging and generates the EBD. The EBD may be generated before generation of the image data as the output data.

In step S6, the link layer signal processing unit 42 performs the link layer signal processing on the frame data including the data generated by each unit of the application layer processing unit 41.

In step S7, the physical layer signal processing unit 43 performs the physical layer signal processing on the data of each packet obtained by the link layer signal processing.

In step S8, the physical layer signal processing unit 43 transmits the data stream obtained by the physical layer processing. The above processing is repeated every time imaging is performed in the imaging unit 21.

Operation of DSP 12

Figure 17:
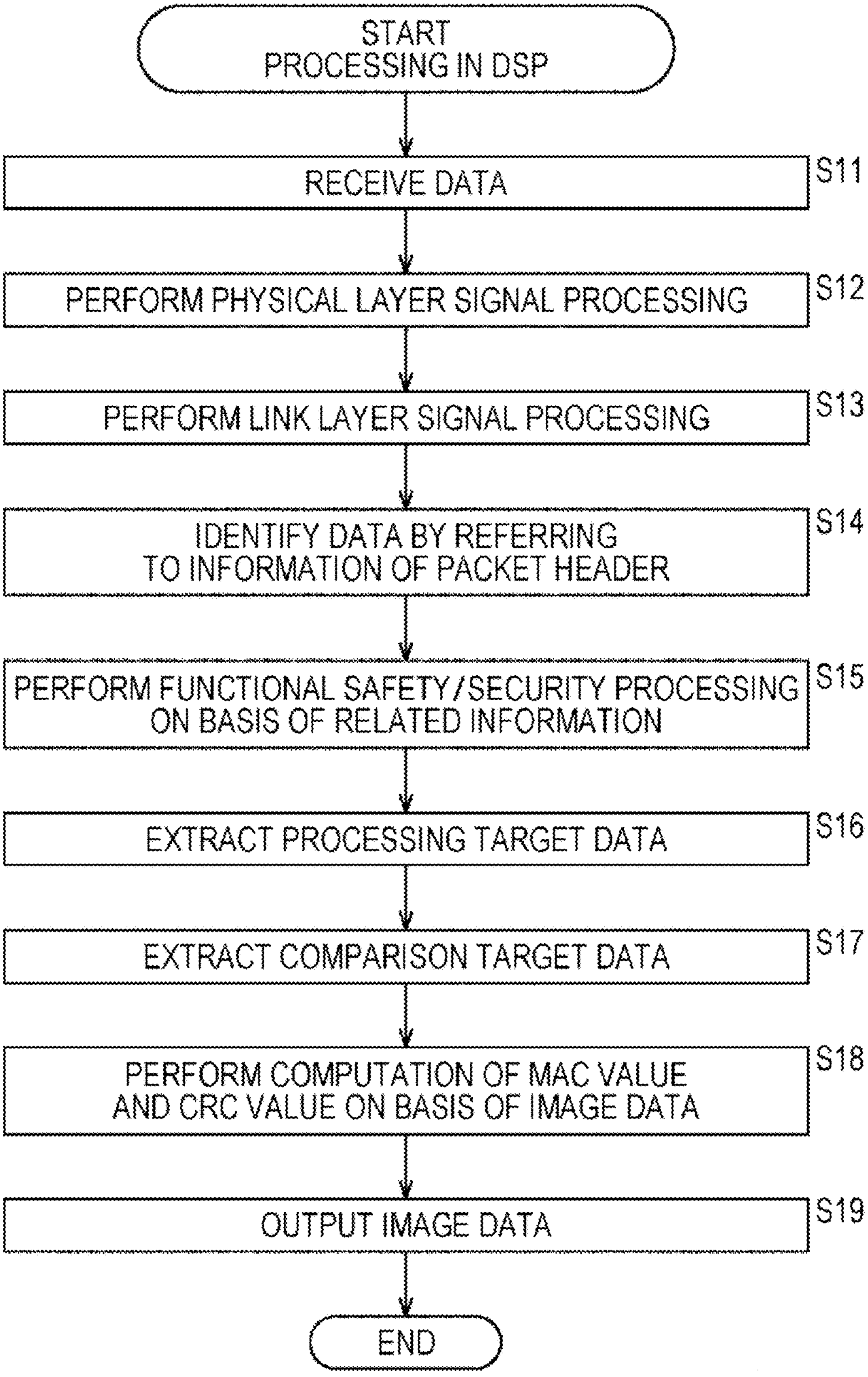
FIG. 17 is a flowchart for explaining processing in a digital signal processor (DSP).

Next, the processing in the DSP 12 will be described with reference to the flowchart of FIG. 17.

In step S11, the physical layer signal processing unit 51 receives the data stream transmitted from the physical layer signal processing unit 43 of the transmission unit 22.

In step S12, the physical layer signal processing unit 51 performs the physical layer signal processing on the received data stream.

In step S13, the link layer signal processing unit 52 performs the link layer signal processing on the data stream on which the physical layer signal processing has been performed. The data of each packet obtained by the link layer signal processing is input to the application layer processing unit 53.

In step S14, the identification unit 111 of the application layer processing unit 53 identifies, by referring to the information of the packet header, the data stored in each packet on the basis of the respective values of EBD Line, Safety Info, and Security Info.

In step S15, the functional safety/security processing unit 112 performs processing for implementing functional safety on the basis of the functional-safety-related information. Furthermore, the functional safety/security processing unit 112 performs processing for implementing security on the basis of the security-related information.

In step S16, the processing target data extraction unit 113 extracts the processing target data from functional safety-related information and the security-related information identified by the identification unit 111.

In step S17, the comparison target data extraction unit 114 extracts the comparison target data from the output data functional safety information and the output data security information identified by the identification unit 111.

In step S18, the computation unit 115 computes the MAC value and the CRC value on the basis of the image data identified by the identification unit 111. In the computation of the MAC value and the computation of the CRC value, the IV information extracted by the processing target data extraction unit 113 and the information such as the MAC value and the CRC value extracted by the comparison target data extraction unit 114 are appropriately used.

In step S19, the application layer processing unit 53 outputs the image data to be subjected to processing for implementing functional safety and processing for implementing security.

With the above series of processing, the application layer processing unit 41 of the image sensor 11 can add the functional safety information used for implementing functional safety and the security information used for implementing security for each piece of image data in units of frames and transmit the image data to the DSP 12. Furthermore, the DSP 12 that has received the frame data transmitted from the image sensor 11 can implement security and functional safety in units of frames.

<<Example of Variations of Frame Format>>

Here, variations of the frame format will be described. For example, which frame format is used for data transmission is determined in advance between the image sensor 11 and the DSP 12. A description overlapping with the description of the basic format will be appropriately omitted.

<Variation 1>

Figure 18:
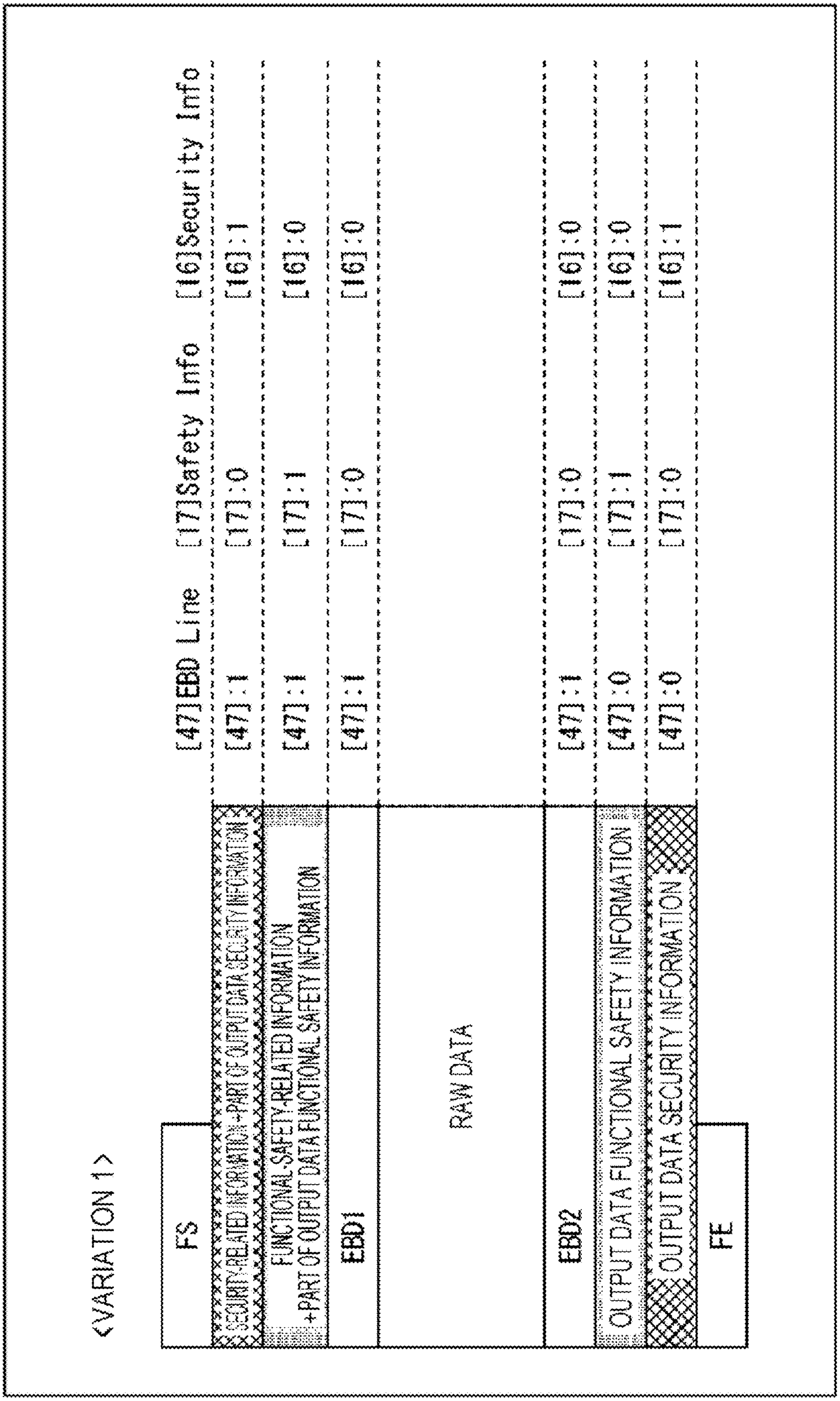
FIG. 18 is a diagram illustrating a first modification of the frame format.

FIG. 18 is a diagram illustrating a first modification of the frame format.

In the frame format illustrated in FIG. 18, a part of information included in the output data security information is arranged on the same line as that of the security-related information. The part of the information included in the output data security information is stored and transmitted in the same packet as that of the security-related information. For example, among the pieces of information included in the output data security information, the IV information and the like are transmitted prior to the image data by using the same packet as that of the security-related information.

The values of 1, 0, and 1 are respectively set for EBD Line, Safety Info, and Security Info of the packet header added to the packet that stores the security-related information and the part of the information included in the output data security information.

In addition, in the frame format illustrated in FIG. 18, a part of information included in the output data functional safety information is arranged in the same line as that of the functional safety-related information. The part of the information included in the output data functional safety information is stored and transmitted in the same packet as that of the functional-safety-related information. For example, among the pieces of information included in the output data functional safety information, information indicating the computation mode of the CRC value and the like are transmitted prior to the image data by using the same packet as that of the functional-safety-related information.

The values of 1, 1, and 0 are respectively set for EBD Line, Safety Info, and Security Info of the packet header added to the packet that stores the functional safety-related information and the part of the information included in the output data functional safety information.

In the frame format illustrated in FIG. 18, the values of EBD Line, Safety Info, and Security Info of the packet header added to the packet that stores data of another line are the same as the values in the basic format described with reference to FIG. 15.

As the IV information and the information indicating the computation mode of the CRC value are arranged prior to the image data, the application layer processing unit 53 of the DSP 12 can start the computation of the CRC value before acquiring the output data functional safety information. In addition, the application layer processing unit 53 can start the computation of the MAC value or start decryption of the image data before acquiring the output data security information.

<Variation 2>

Figure 19:
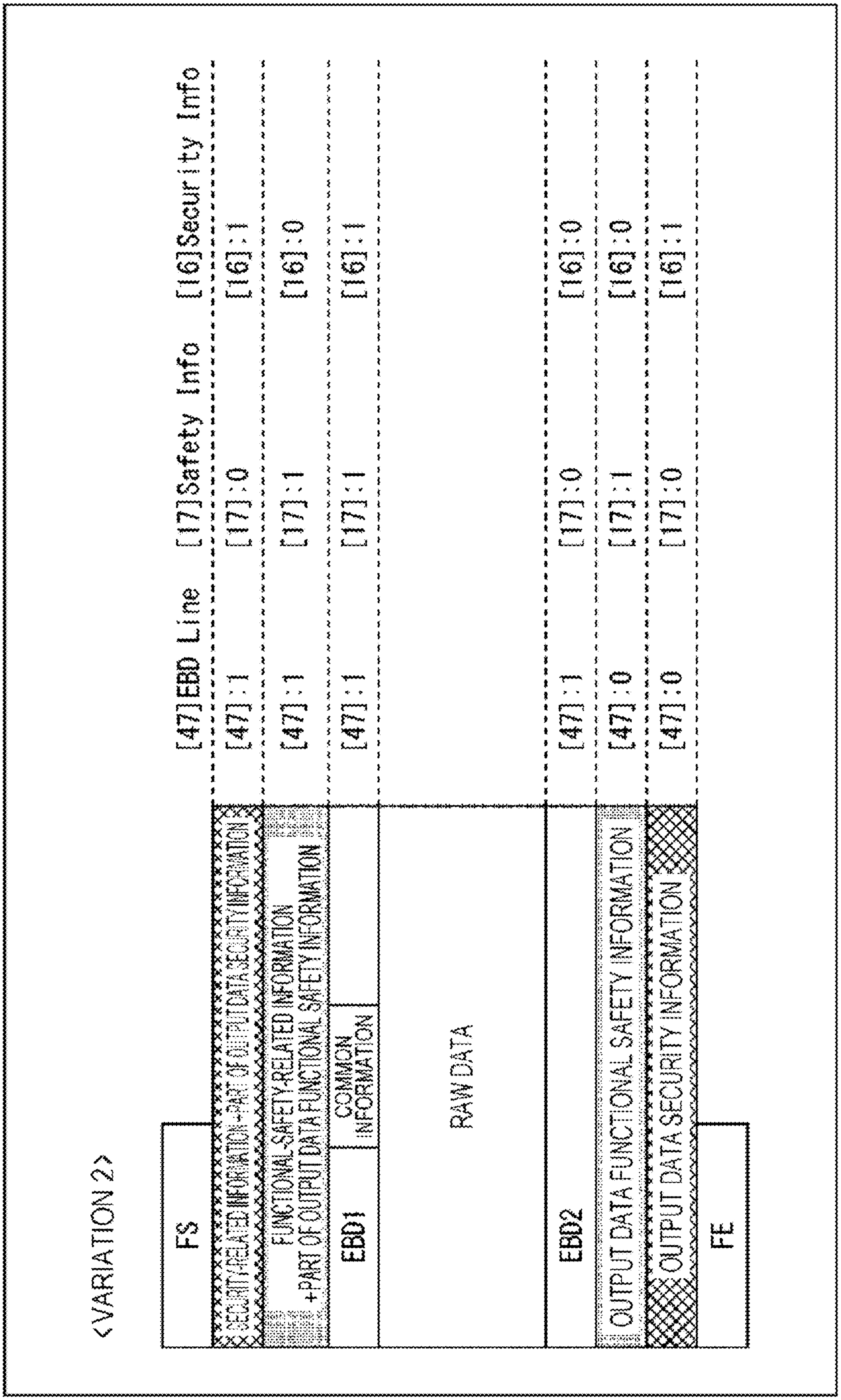
FIG. 19 is a diagram illustrating a second modification of the frame format.

FIG. 19 is a diagram illustrating a second modification of the frame format.

In the frame format illustrated in FIG. 19, information common to the security-related information and the functional-safety-related information is arranged as the EBD 1. A region for arrangement of the common information is secured in a predetermined region of the EBD 1.

The values of 1, 1, and 1 are respectively set for EBD Line, Safety Info, and Security Info of the packet header added to the packet that stores the EBD 1 including the common information.

As described above, the internal state information, the operation-mode-related information, the information for making a notification that the register communication has occurred, the frame counter, and the information of the data size of one frame as the common information are information included in both the security-related information and the functional-safety-related information. The common information is appropriately used for both implementation of functional safety and implementation of security.

Since the common information is transmitted as the EBD 1, it is not necessary to include the same information in the security-related information and the functional-safety-related information for transmission, and a data amount of the frame data can be suppressed.

In the example of FIG. 19, the part of the information included in the output data security information is included in the security-related information, but does not have to be included in the security-related information. In addition, the part of the information included in the output data functional safety information is included in the functional-safety-related information, but does not have to be included in the functional-safety-related information. The same applies to a frame format of FIG. 22 described later.

<Variation 3>

Figure 20:
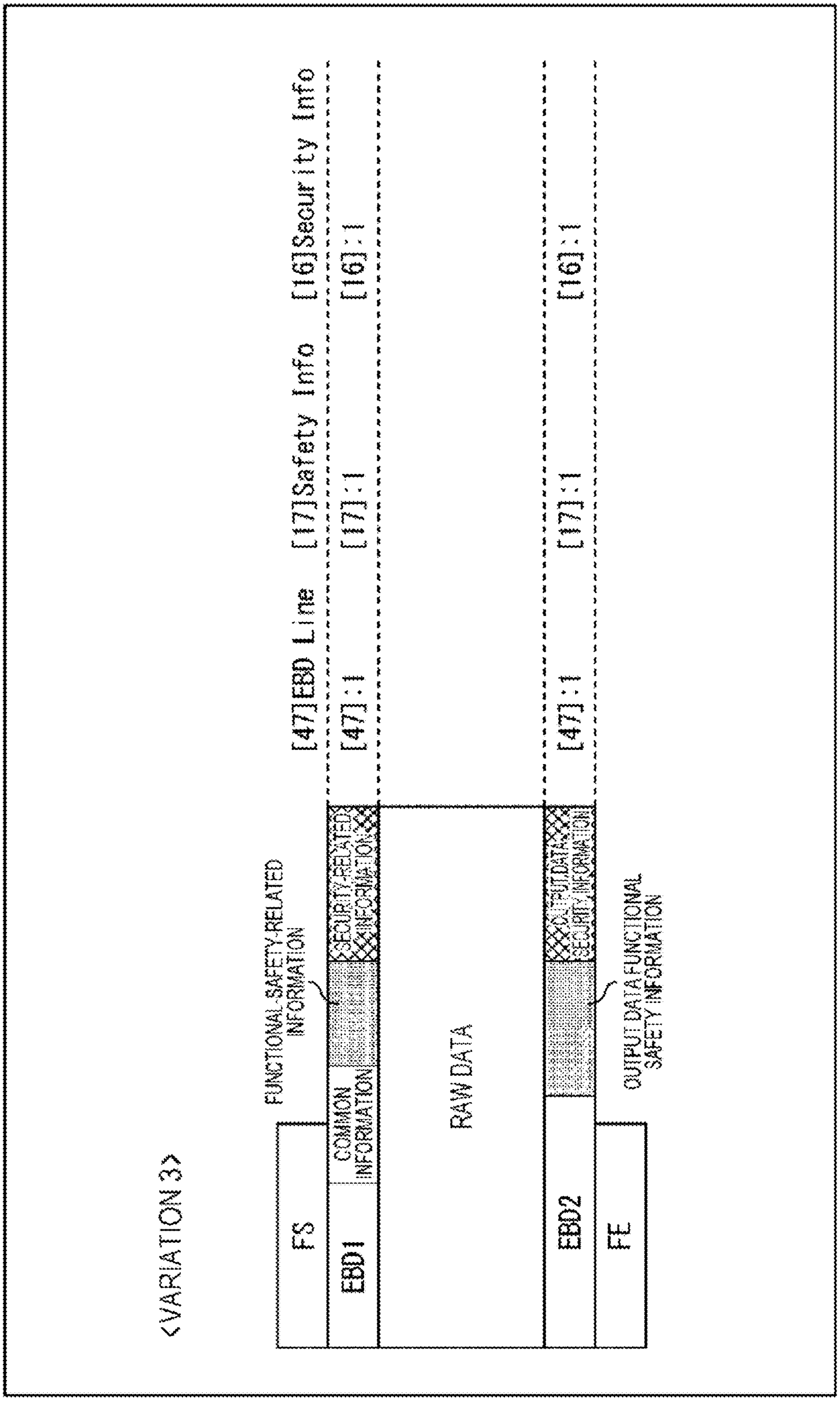
FIG. 20 is a diagram illustrating a third modification of the frame format.

FIG. 20 is a diagram illustrating a third modification of the frame format.

In the frame format illustrated in FIG. 20, the security-related information and the functional-safety-related information are arranged as the EBD 1. A region for arrangement of the security-related information and a region for arrangement of the functional-safety-related information are secured in the line in which the EBD 1 is arranged. In addition, a region for arrangement of the common information is secured separately from the region for arrangement of the security-related information and the functional-safety-related information other than the common information. Information indicating an arrangement position of each piece of information may be included in the EBD 1.

The values of 1, 1, and 1 are respectively set for EBD Line, Safety Info, and Security Info of the packet header added to the packet that stores the EBD 1 including the security-related information and the functional safety-related information.

In addition, in the frame format illustrated in FIG. 20, the output data security information and the output data functional safety information are arranged as the EBD 2. A region for arrangement of the output data security information and a region for arrangement of the output data functional safety information are secured in the line in which the EBD 2 is arranged.

The values of 1, 1, and 1 are respectively set for EBD Line, Safety Info, and Security Info of the packet header added to the packet that stores the EBD 2 including the output data security information and the output data functional safety information.

In this manner, the security information and the functional safety information can be transmitted in a state of being merged into the EBD.

It is assumed that the data amounts of the security information and the functional safety information are not very large with respect to the data amount of data for one line. By merging the security information and the functional safety information into the EBD for transmission, data transmission efficiency can be improved. Increasing the transmission efficiency is particularly effective in a case where a vertical blanking period between frames output by the image sensor 11 is short.

Figure 21:
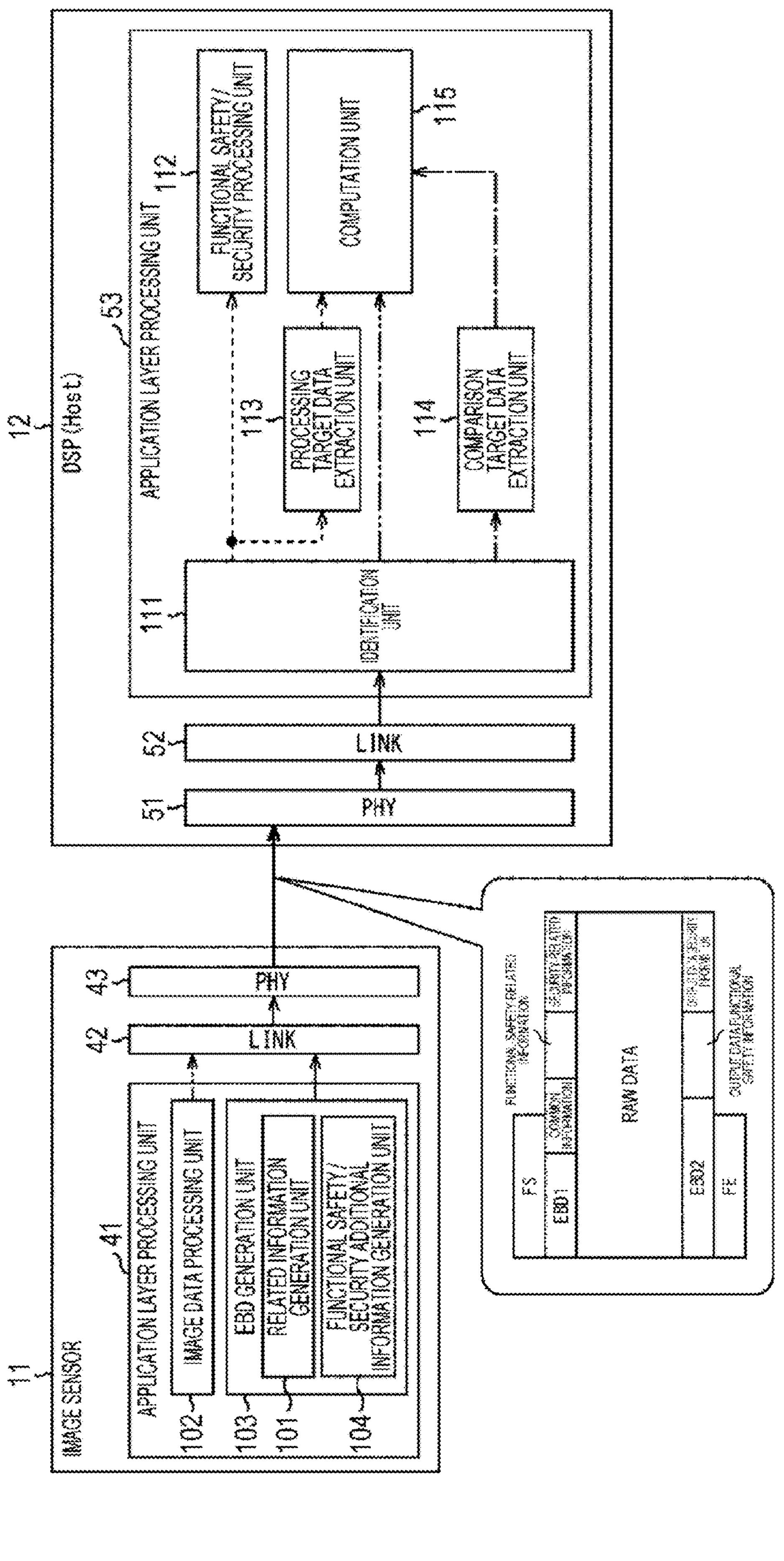
FIG. 21 is a block diagram illustrating an example of a functional configuration of an application layer processing unit.

FIG. 21 is a block diagram illustrating an example of a functional configuration of an application layer processing unit in a case where the frame data having the format of FIG. 20 is transmitted. In the configuration illustrated in FIG. 21, the same components as those described with reference to FIG. 11 are denoted by the same reference signs. An overlapping description will be omitted as appropriate.

As illustrated in FIG. 21, the related information generation unit 101 and the functional safety/security additional information generation unit 104 included in the application layer processing unit 41 of the image sensor 11 are implemented in the EBD generation unit 103. The EBD generation unit 103 generates the EBD including the related information generated by the related information generation unit 101 and the output data additional information generated by the functional safety/security additional information generation unit 104. Meanwhile, the processing target data extraction unit 113 of the application layer processing unit 53 extracts and outputs the processing target data from the EBD 1 identified by the identification unit 111. In addition, the comparison target data extraction unit 114 extracts and outputs the comparison target data from the EBD 1 identified by the identification unit 111.

<Variation 4>

Figure 22:
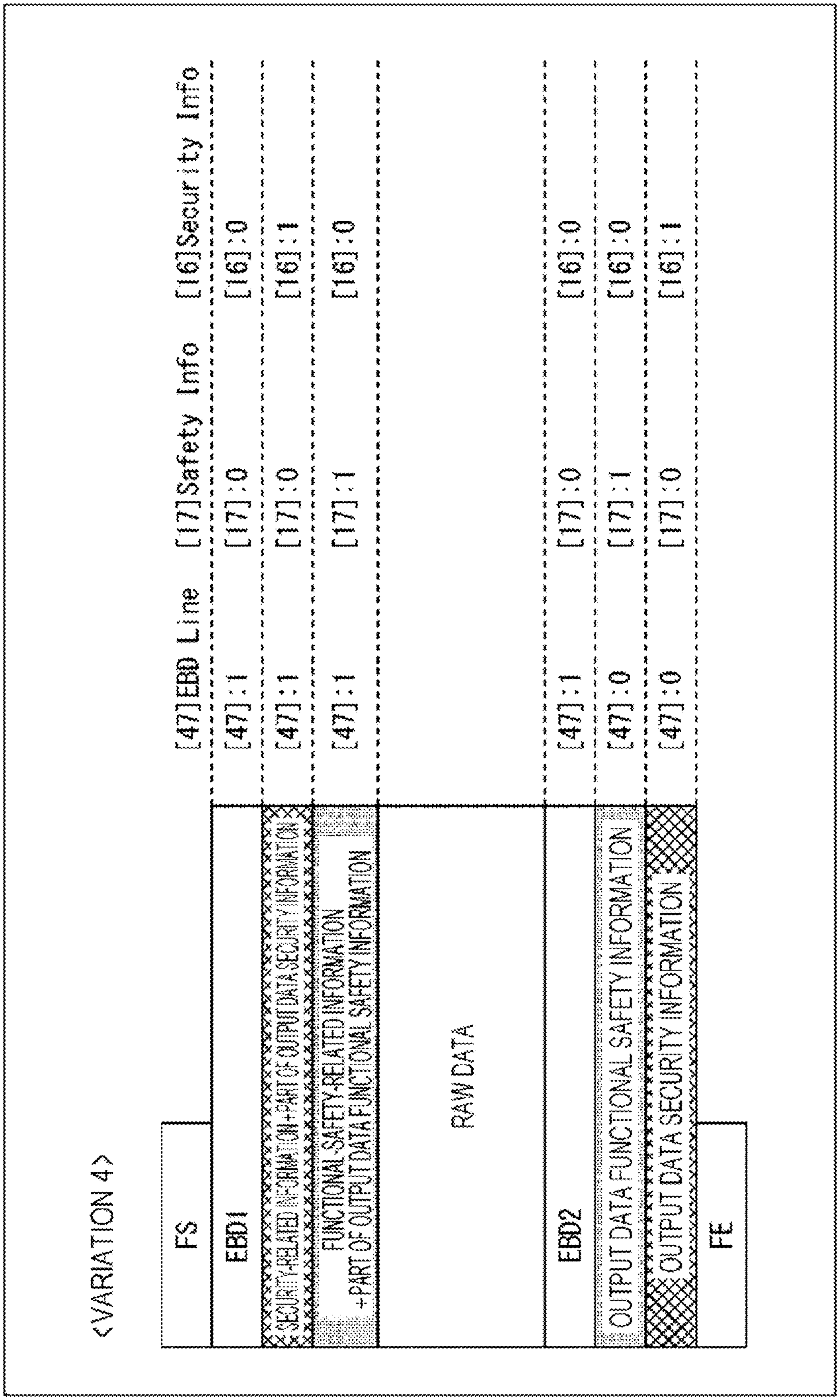
FIG. 22 is a diagram illustrating a fourth modification of the frame format.

FIG. 22 is a diagram illustrating a fourth modification of the frame format.

In the frame format illustrated in FIG. 22, the EBD 1 is arranged in a line ahead of the line in which the security-related information is arranged. The EBD1 includes, for example, format information indicating the type of the frame format.

The values of 1, 0, and 0 are respectively set for EBD Line, Safety Info, and Security Info of the packet header added to the packet that stores the EBD 1 including the format information, similarly to the values in the basic format.

Furthermore, in the frame format illustrated in FIG. 22, the EBD 2 is arranged on the next line of the image data.

In this way, it is possible that the EBD including the format information is transmitted first (after Frame Start).

Since the format information is included in the EBD to be transmitted first, the application layer processing unit 53 of the DSP 12 can specify the frame format on the basis of the EBD to be processed first. The fact that the format information is included in the EBD to be transmitted first is particularly effective in a case where the frame format used for data transmission is not determined in advance between the image sensor 11 and the DSP 12.

A format different from the above format may be used as the format of the frame data. For example, it is possible to use a format in which the related information is arranged behind the output data together with the output data additional information.

<<SLVS-EC>>

Here, the link layer processing and the physical layer processing of the SLVS-EC will be described.

Figure 23:
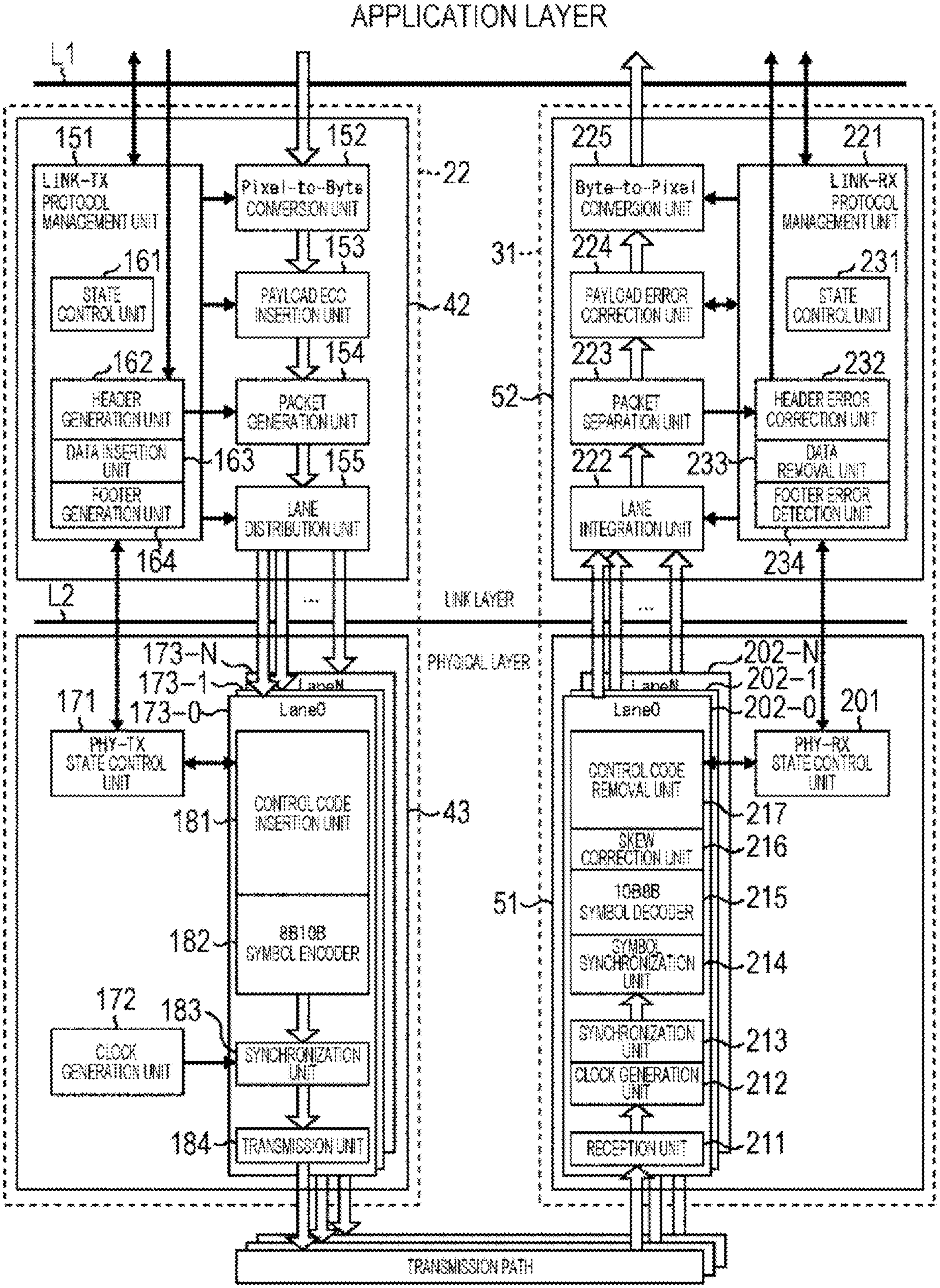
FIG. 23 is a diagram illustrating an example of configurations of the transmission unit and the reception unit.

FIG. 23 is a diagram illustrating an example of configurations of the transmission unit 22 and the reception unit 31.

The configuration surrounded by the broken line on the left side of FIG. 23 is the configuration of the transmission unit 22, and the configuration surrounded by the broken line on the right side is the configuration of the reception unit 31. Each of the transmission unit 22 and the reception unit 31 has a link layer configuration and a physical layer configuration.

The configuration illustrated above a solid line L2 is the link layer configuration, and the configuration illustrated below the solid line L2 is the physical layer configuration. In the transmission unit 22, the configuration illustrated above the solid line L2 corresponds to the configuration of the link layer signal processing unit 42, and the configuration illustrated below the solid line L2 corresponds to the configuration of the physical layer signal processing unit 43.

In addition, in the reception unit 31, the configuration illustrated below the solid line L2 corresponds to the configuration of the physical layer signal processing unit 51, and the configuration illustrated above the solid line L2 corresponds to the configuration of the link layer signal processing unit 52.

The configuration above the solid line L1 is an application layer configuration (the application layer processing unit 41 and the application layer processing unit 53).

<Link Layer Configuration of Transmission Unit 22>

First, the link layer configuration of the transmission unit 22 (the configuration of the link layer signal processing unit 42) will be described.

The link layer signal processing unit 42 includes a LINK-TX protocol management unit 151, a pixel-to-byte conversion unit 152, a payload ECC insertion unit 153, a packet generation unit 154, and a lane distribution unit 155 as the link layer configuration. The LINK-TX protocol management unit 151 includes a state control unit 161, a header generation unit 162, a data insertion unit 163, and a footer generation unit 164.

The state control unit 161 of the LINK-TX protocol management unit 151 manages the state of the link layer of the transmission unit 22.

The header generation unit 162 generates the packet header to be added to the payload in which data for one line is stored, and outputs the packet header to the packet generation unit 154. For example, the header generation unit 162 generates the above-described header information including Safety Info, Security Info, and the like under the control of the application layer processing unit 41. The header generation unit 162 also calculates the CRC value of the packet header by applying the header information to a generator polynomial.

The data insertion unit 163 generates data to be used for stuffing and outputs the data to the pixel-to-byte conversion unit 152 and the lane distribution unit 155. Payload stuffing data, which is stuffing data supplied to the pixel-to-byte conversion unit 152, is added to the data after pixel-to-byte conversion and is used to adjust the data amount of the data stored in the payload. In addition, lane stuffing data, which is stuffing data supplied to the lane distribution unit 155, is added to the data after lane allocation and is used for adjustment of the data amount between the lanes.

The footer generation unit 164 calculates a 32-bit CRC value by applying the payload data to the generator polynomial, and outputs the CRC value obtained by the calculation to the packet generation unit 154 as the footer.

The pixel-to-byte conversion unit 152 acquires the data supplied from the application layer processing unit 41 and performs pixel-to-byte conversion for converting the acquired data into data in units of one byte. For example, the pixel value (RGB) of each pixel of the image captured by the imaging unit 21 is represented by a bit depth of any one of 8 bits, 10 bits, 12 bits, 14 bits, and 16 bits. Various types of data including the pixel data of each pixel are converted into data in units of one byte.

The pixel-to-byte conversion unit 152 performs pixel-to-byte conversion for each pixel in order from a pixel at the left end of the line, for example. Furthermore, the pixel-to-byte conversion unit 152 generates the payload data by adding the payload stuffing data supplied from the data insertion unit 163 to data in byte unit obtained by pixel-to-byte conversion, and outputs the payload data to the payload ECC insertion unit 153.

Figure 24:
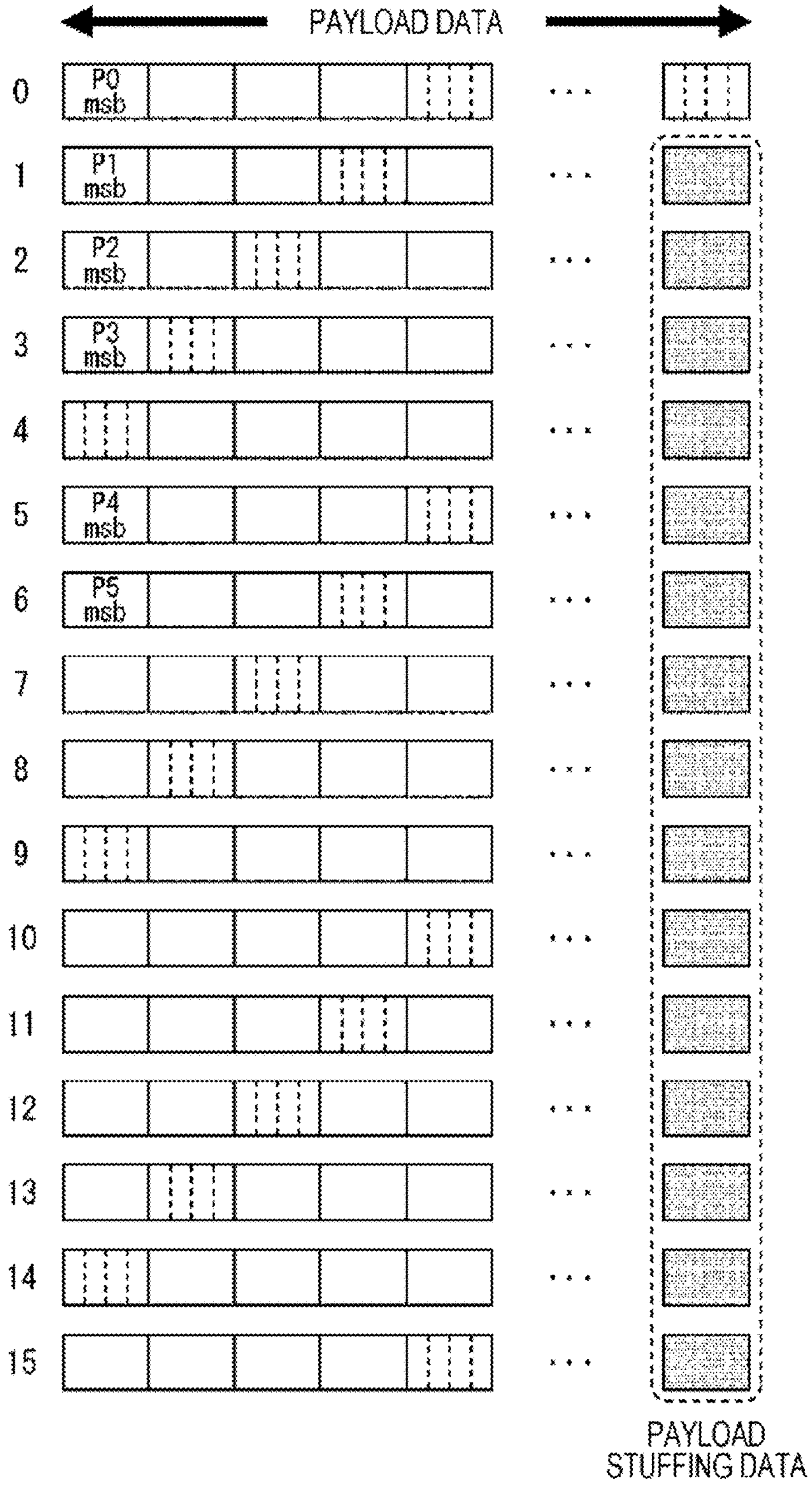
FIG. 24 is a diagram illustrating an example of payload data.

FIG. 24 is a diagram illustrating an example of the payload data.

FIG. 24 illustrates the payload data including the pixel data obtained by pixel-to-byte conversion in a case where the pixel value of each pixel is represented by 10 bits. One block without color represents the pixel data in byte unit after pixel-to-byte conversion. Furthermore, one colored block represents the payload stuffing data generated by the data insertion unit 163.

The pieces of pixel data after pixel-to-byte conversion are sequentially grouped into a predetermined number of groups. In the example of FIG. 24, the respective pieces of pixel data are grouped into 16 groups, groups 0 to 15, the pixel data including the most significant bit (MSB) of a pixel P0 is allocated to the group 0, and the pixel data including the MSB of a pixel P1 is allocated to the group 1. Furthermore, the pixel data including the MSB of a pixel P2 is allocated to the group 2, the pixel data including the MSB of a pixel P3 is allocated to the group 3, and the pixel data including the LSBs of the pixels P0 to P3 is allocated to the group 4.

The pieces of pixel data after the pixel data including the MSB of a pixel P4 are also sequentially allocated to the groups after the group 5. Note that, among the blocks representing the pixel data, a block having three broken lines therein represents pixel data in byte unit generated in such a way as to include the LSBs of pixels N to +3 at the time of pixel-to-byte conversion.

In the link layer of the transmission unit 22, after grouping is performed in this way, processing is performed in parallel for the pieces of pixel data at the same position in each group for each period defined by a clock signal. That is, as illustrated in FIG. 24, in a case where the pieces of pixel data are allocated to 16 groups, the processing of the pixel data is performed in such a way that 16 pieces of pixel data arranged in each column are processed within the same period.

As described above, the pixel data for one line is included in the payload of one packet. The entire pixel data illustrated in FIG. 24 is the pixel data constituting one line. Here, the processing of the pixel data of the valid pixel region A1 in FIG. 24 has been described. However, processing similar to the processing of the pixel data of the valid pixel region A1 is performed for data for other lines such as the security information and the functional safety information.

After the pieces of pixel data for one line are grouped, the payload stuffing data is added in such a way that data lengths of the groups become the same. The payload stuffing data is 1-byte data.

In the example of FIG. 24, the payload stuffing data is not added to the pixel data of the group 0, and as indicated by a broken line, one piece of payload stuffing data is added to each pixel data of the groups 1 to 15 at an end.

Figure 25:
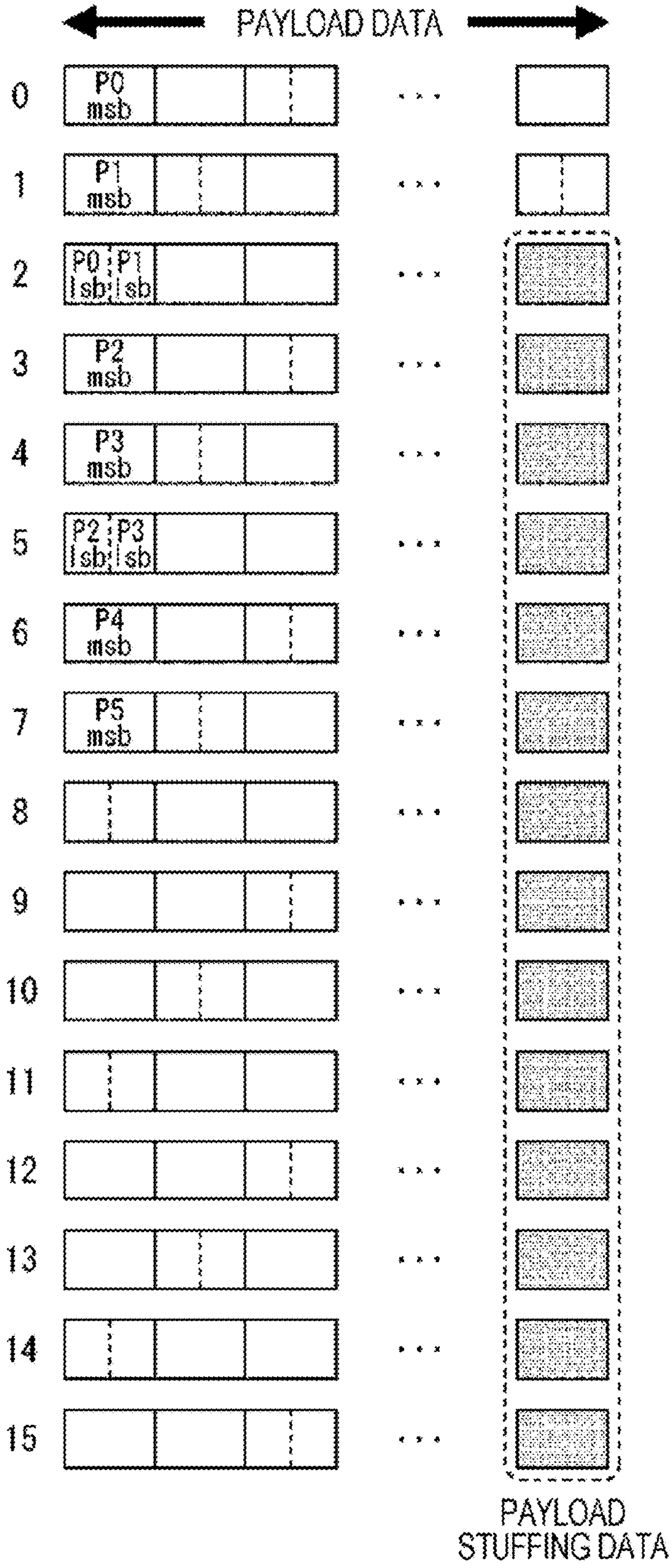
FIG. 25 is a diagram illustrating another example of the payload data.

FIG. 25 is a diagram illustrating another example of the payload data. FIG. 25 illustrates the payload data including the pixel data obtained by pixel-to-byte conversion in a case where the pixel value of each pixel is represented by 12 bits.

The payload data having such a configuration is supplied from the pixel-to-byte conversion unit 152 to the payload ECC insertion unit 153.

The payload ECC insertion unit 153 calculates an error correction code used for error correction of the payload data on the basis of the payload data supplied from the pixelto-byte conversion unit 152, and inserts a parity which is the error correction code into the payload data.

Figure 26:
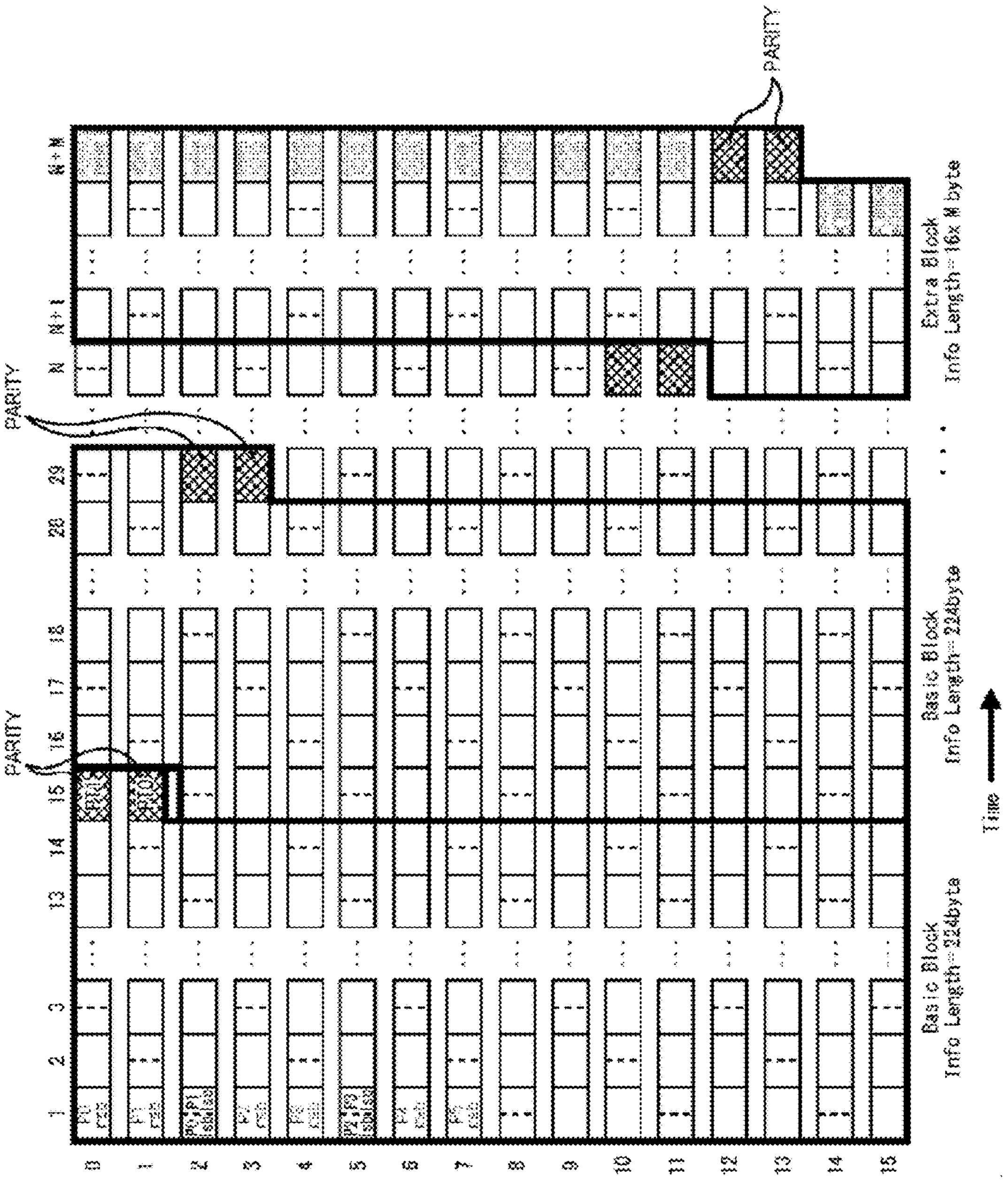
FIG. 26 is a diagram illustrating an example of the payload data to which a parity is inserted.

FIG. 26 is a diagram illustrating an example of the payload data to which the parity is inserted.

The payload data illustrated in FIG. 26 is the payload data including the pixel data obtained by pixel-to-byte conversion in a case where the pixel value of each pixel is represented by 12 bits described with reference to FIG. 25. A block indicated by batching represents the parity.

In the example of FIG. 26, 14 pieces of pixel data are selected in order from the head pixel data of each of the groups 0 to 15, and a 2-byte parity is obtained on the basis of the selected 224 pieces of pixel data (224 bytes). The 2-byte parity is inserted as the fifteenth data of the groups 0 and 1 following the 224 pieces of pixel data used for the calculation, and the first basic block includes the 224 pieces of pixel data and the 2-byte parity.

The payload ECC insertion unit 153 outputs the payload data to which the parity is inserted to the packet generation unit 154. In a case where the parity is not inserted, the payload data supplied from the pixel-to-byte conversion unit 152 to the payload BCC insertion unit 153 is output to the packet generation unit 154 as it is.

The packet generation unit 154 generates the packet by adding the header generated by the header generation unit 162 to the payload data supplied from the payload ECC insertion unit 153. In a case where the footer generation unit 164 generates the footer, the packet generation unit 154 also adds the footer to the payload data.

Figure 27:
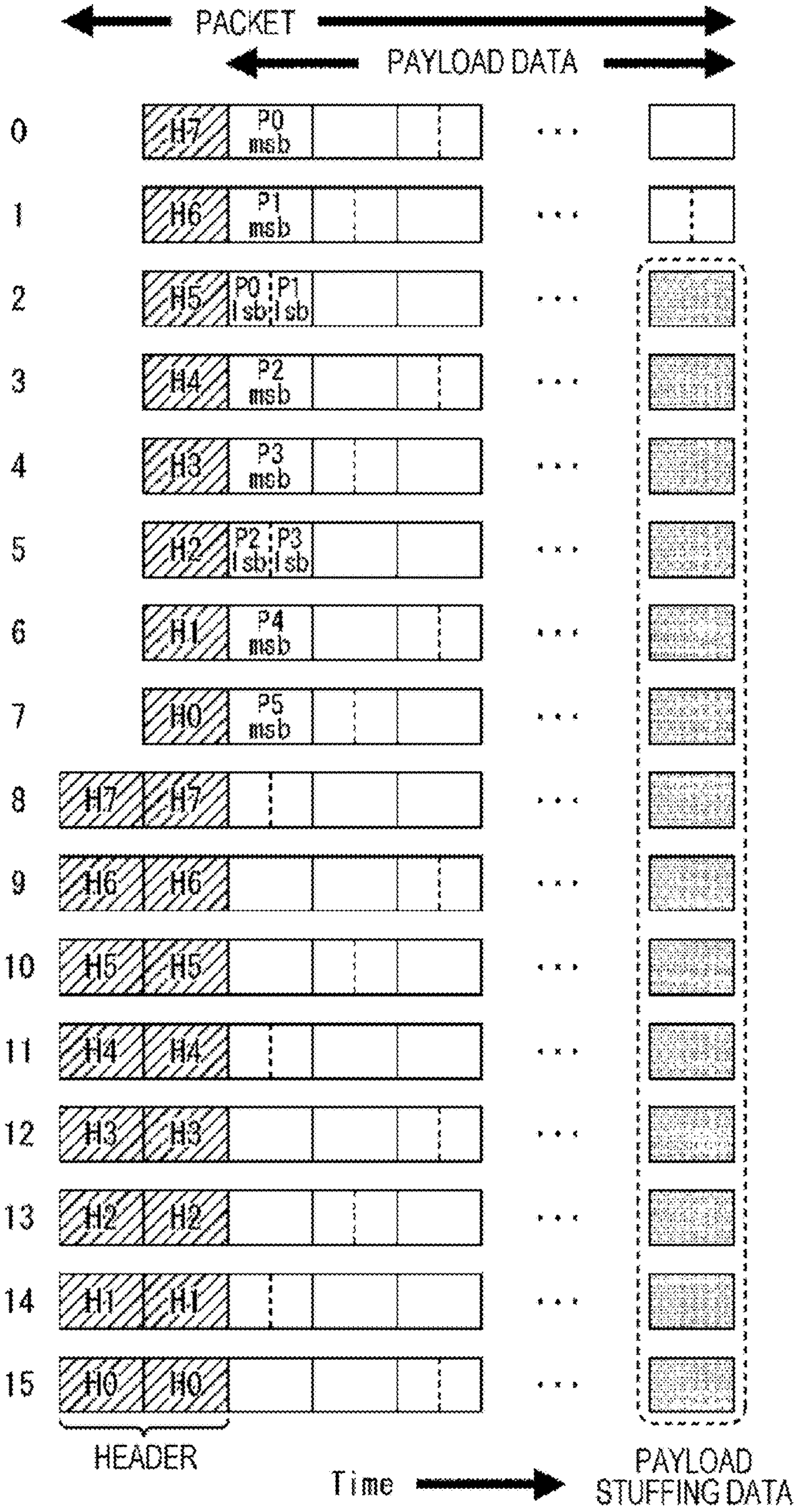
FIG. 27 is a diagram illustrating a state in which a header is added to the payload data.

FIG. 27 is a diagram illustrating a state in which the header is added to the payload data.

24 blocks denoted with characters H7 to H0 each represent the header information or the header data in byte unit which is the CRC code of the header information. As described with reference to FIG. 4, the header of one packet includes three sets of the pieces of header information and the CRC codes. For example, the pieces of header data H7 to H2 are the header information (six bytes), and the pieces of header data H1 and H0 are the CRC codes (two bytes).

Figure 28:
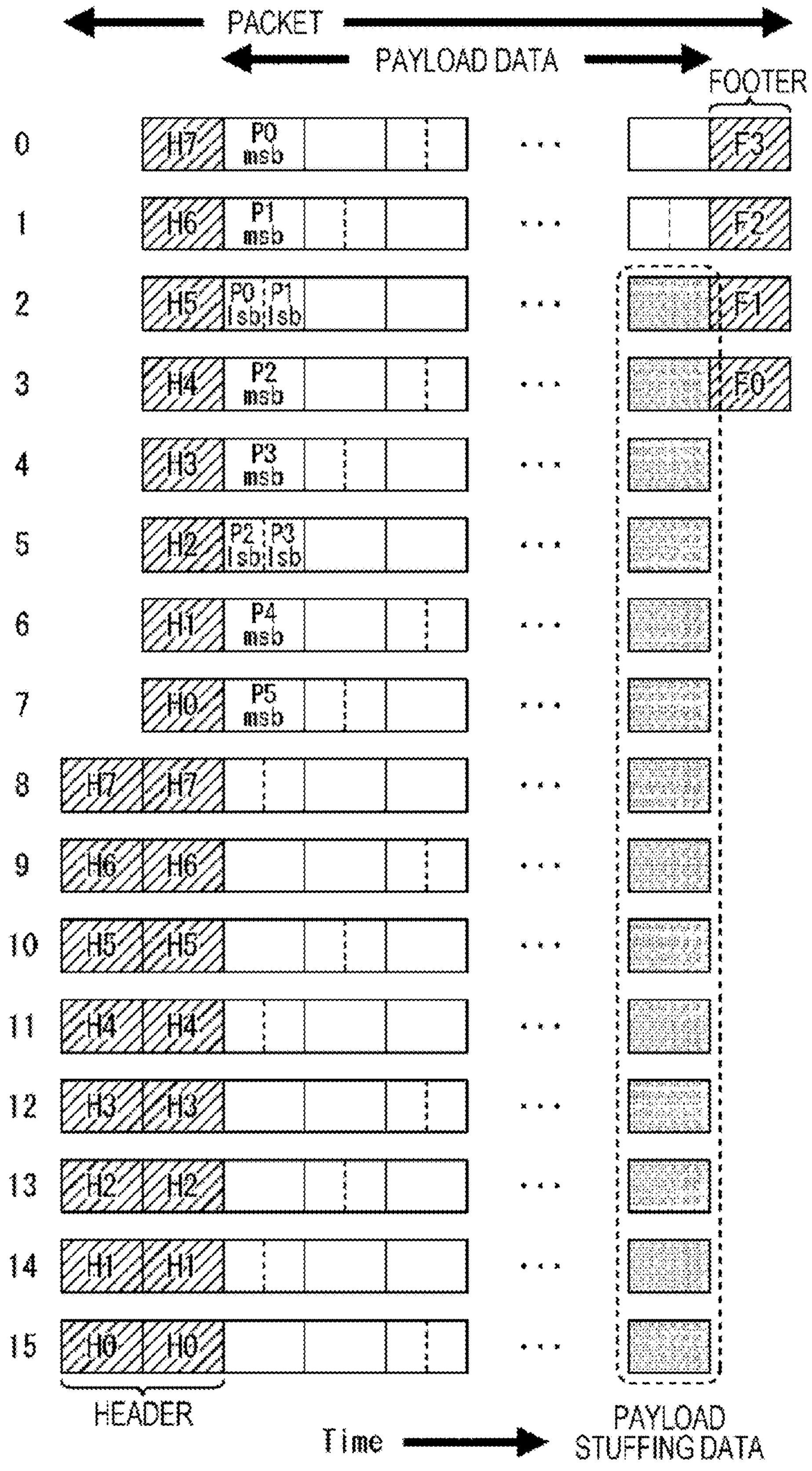
FIG. 28 is a diagram illustrating a state in which the header and a footer are added to the payload data.

FIG. 28 is a diagram illustrating a state in which the header and the footer are added to the payload data.

Four blocks denoted with characters F3 to F0 each represent footer data which is a 4-byte CRC code generated as the footer. In the example of FIG. 28, the pieces of footer data F3 to F0 are added to the respective pieces of payload data of the groups 0 to 3.

Figure 29:
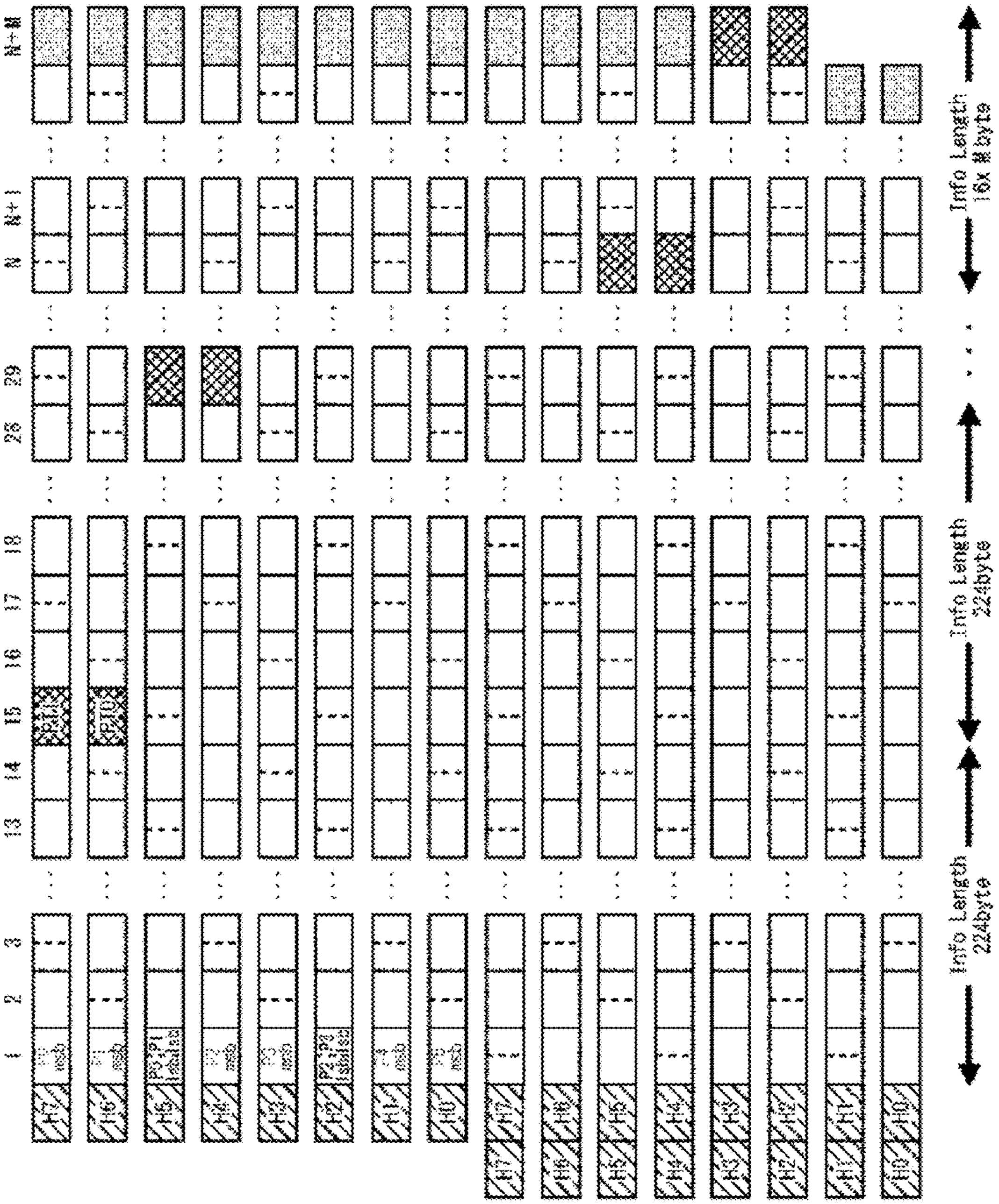
FIG. 29 is a diagram illustrating a state in which the header is added to the payload data to which the parity is inserted.

FIG. 29 is a diagram illustrating a state in which the header is added to the payload data to which the parity is inserted.

In the example of FIG. 29, pieces of header data H7 to H0 are added to the payload data of FIG. 26 to which the parity is inserted, similarly to the cases of FIGS. 27 and 28.

The packet generation unit 154 outputs the packet data, which is the data included in one packet generated in this manner, to the lane distribution unit 155. The packet data including the header data and the payload data, the packet data including the header data, the payload data, and the footer data, or the packet data including the header data and the payload data to which the parity is inserted are supplied to the lane distribution unit 155.

The lane distribution unit 155 allocates the packet data supplied from the packet generation unit 154 to each of lanes 0 to 7 used for data transmission in order from the head data.

Figure 30:
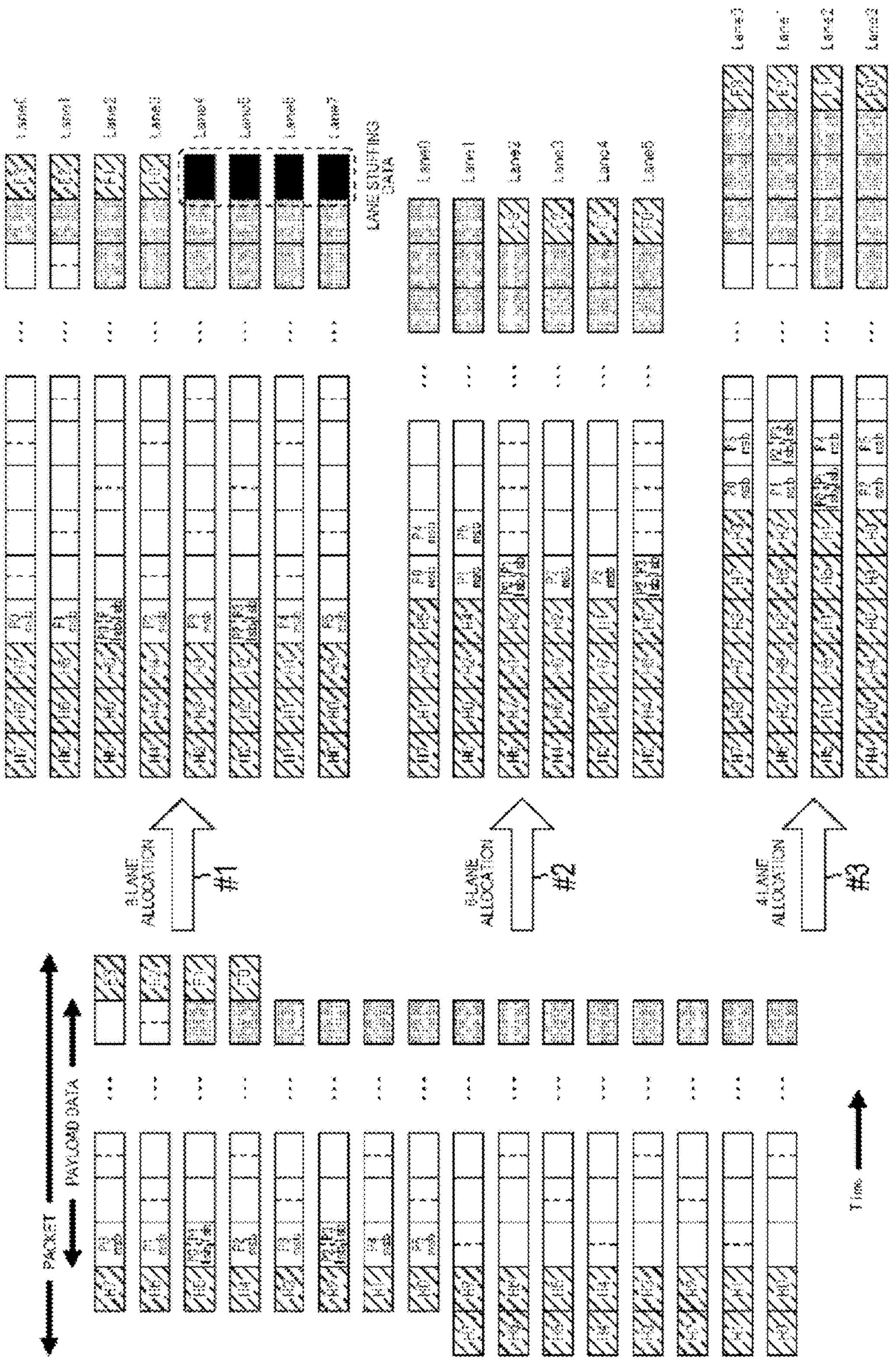
FIG. 30 is a diagram illustrating an example of allocation of packet data.

FIG. 30 is a diagram illustrating an example of allocation of the packet data.

Here, the allocation of the packet data (FIG. 28) including the header data, the payload data, and the footer data will be described. An example of the allocation of the packet data in a case where data transmission is performed using eight lanes, lanes 0 to 7, is indicated by a tip of an outlined arrow #1.

In this case, each piece of header data configuring three times of repetitions of the pieces of header data H7 to H0 is allocated to the lanes 0 to 7 in order from the head piece of header data. Once certain header data is allocated to the lane 7, subsequent pieces of header data are sequentially allocated to each lane subsequent to the lane 0. Three pieces of the same header data are allocated to each of the lanes 0 to 7.

Furthermore, the payload data is allocated to the lanes 0 to 7 in order from the head piece of payload data. Once certain payload data is allocated to the lane 7, subsequent pieces of payload data are sequentially allocated to each lane subsequent to the lane 0.

Pieces of footer data F3 to P0 are allocated to the respective lanes in order from the head piece of footer data. In the example of FIG. 30, the last piece of payload stuffing data included in the payload data is allocated to the lane 7, and the pieces of footer data F3 to F0 are allocated to the lanes 0 to 3 one by one.

A black block represents the lane stuffing data generated by the data insertion unit 163. In the example of FIG. 30, the pieces of lane stuffing data are allocated one by one to the lane 4 and subsequent lanes which are lanes with a small number of data allocations.

An example of the allocation of the packet data in a case where data transmission is performed using six lanes from a lane 0 is indicated by a tip of an outlined arrow #2. Furthermore, an example of allocation of the packet data in a case where data transmission is performed using four lanes from a lane 0 is indicated by a tip of an outlined arrow #3.

The lane distribution unit 155 outputs, to the physical layer, the packet data allocated to each lane in this manner. Hereinafter, a case where data is transmitted using eight lanes from a lane 0 will be mainly described, but similar processing is performed even in a case where the number of lanes used for data transmission is another number.

<Physical Layer Configuration of Transmission Unit 22>

Next, a physical layer configuration of the transmission unit 22 (the configuration of the physical layer signal processing unit 43) will be described.

The physical layer signal processing unit 43 includes a PHY-TX state control unit 171, a clock generation unit 172, and signal processing units 173-0 to 173-N as the physical layer configuration. The signal processing unit 173-0 includes a control code insertion unit 181, an 8B10B symbol encoder 182, a synchronization unit 183, and a transmission unit 184. The packet data allocated to the lane 0 output from the lane distribution unit 155 is input to the signal processing unit 173-0, and the packet data allocated to the lane 1 is input to the signal processing unit 173-1. Furthermore, the packet data allocated to a lane N is input to the signal processing unit 173-N.

As described above, in the physical layer of the transmission unit 22, the signal processing units 173-0 to 173-N are provided as many as the number of lanes, and the processing of the packet data transmitted using each lane is performed in each of the signal processing units 173-0 to 173-N in parallel. The configuration of the signal processing unit 173-0 will be described, and the signal processing units 173-1 to 173-N also have a similar configuration.

The PHY-TX state control unit 171 controls each unit of the signal processing units 173-0 to 173-N. For example, a timing of each processing performed by the signal processing units 173-0 to 173-N is controlled by the PHY-TX state control unit 171.

The clock generation unit 172 generates a clock signal and outputs the clock signal to the synchronization unit 183 of each of the signal processing units 173-0 to 173-N.

The control code insertion unit 181 of the signal processing unit 173-0 adds a control code to the packet data supplied from the lane distribution unit 155. The control code is a code represented by one symbol selected from a plurality of types of symbols prepared in advance or a combination of a plurality of types of symbols. Each symbol inserted by the control code insertion unit 181 is 8-bit data.

FIG. 31 is a diagram illustrating an example of the control code added by the control code insertion unit 181.

The control code includes Idle Code, Start Code, End Code, Pad Code, Sync Code, Deskew Code, and Standby Code.

Idle Code is a symbol group repeatedly transmitted in a period other than the time of transmission of the packet data.

Start Code is a symbol group indicating the start of the packet. As described above, Start Code is added ahead of the packet.

End Code is a symbol group indicating the end of the packet. End Code is added behind the packet.

Pad Code is a symbol group inserted into the payload data to fill a gap between a pixel data band and a PHY transmission band. The pixel data band is a transmission rate of the pixel data output from the imaging unit 21 and input to the transmission unit 22, and the PHY transmission band is a transmission rate of the pixel data transmitted from the transmission unit 22 and input to the reception unit 31.

Pad Code is inserted to adjust the gap between both bands in a case where the pixel data band is narrow and the PHY transmission band is wide. For example, as Pad Code is inserted, the gap between the pixel data band and the PHY transmission band is adjusted to fall within a certain range.

Sync Code is a symbol group used to ensure bit synchronization and symbol synchronization between the transmission unit 22 and the reception unit 31. Sync Code is repeatedly transmitted, for example, in a training mode before transmission of the packet data is started between the transmission unit 22 and the reception unit 31.

Deskew Code is a symbol group used to correct data skew between the lanes, that is, a difference in reception timing of data received in each lane of the reception unit 31.

Standby Code is a symbol group used for notifying the reception unit 31 that the output of the transmission unit 22 is in a state such as High-Z (high impedance) and data transmission is not performed.

The control code insertion unit 181 outputs the packet data to which such a control code is added to the 8B10B symbol encoder 182.

Figure 32:
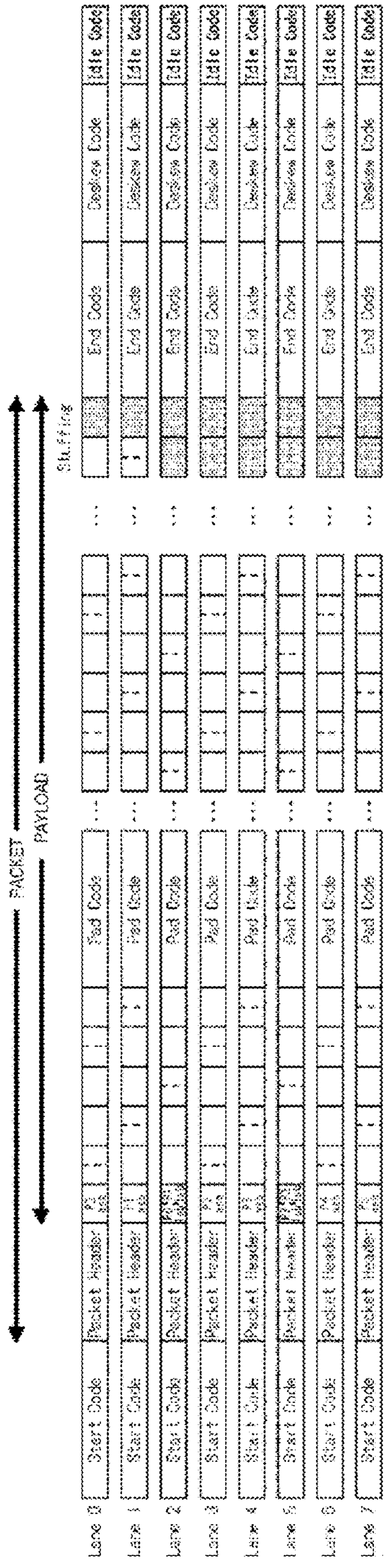
FIG. 32 is a diagram illustrating an example of the packet data after inserting the control code.

FIG. 32 is a diagram illustrating an example of the packet data after inserting the control code.

As illustrated in FIG. 32, in each of the signal processing units 173-0 to 173-N, Start Code is added ahead of the packet data, and Pad Code is inserted to the payload data. End Code is added behind the packet data, and Deskew Code is added behind End Code. In the example of FIG. 32, Idle Code is added behind Deskew Code.

The 8B10B symbol encoder 182 performs 8B10B conversion on the packet data (the packet data to which the control code is added) supplied from the control code insertion unit 181, and outputs the packet data converted into data in units of 10 bits to the synchronization unit 183.

The synchronization unit 183 outputs each bit of the packet data supplied from the 8B10B symbol encoder 182 to the transmission unit 184 according to the clock signal generated by the clock generation unit 172. Note that the synchronization unit 183 does not have to be provided in the transmission unit 22.

The transmission unit 184 transmits the packet data supplied from the synchronization unit 183 to the reception unit 31 via a transmission path constituting the lane 0. In a case where the data transmission is performed using the eight lanes, the packet data is transmitted to the reception unit 31 also using the transmission paths constituting the lanes 1 to 7.

<Physical Layer Configuration of Reception Unit 31>

Next, a physical layer configuration of the reception unit 31 (the configuration of the physical layer signal processing unit 51) will be described.

The physical layer signal processing unit 51 includes a PHY-RX state control unit 201 and signal processing units 202-0 to 202-N as the physical layer configuration. The signal processing unit 202-0 includes a reception unit 211, a clock generation unit 212, a synchronization unit 213, a symbol synchronization unit 214, a 10B8B symbol decoder 215, a skew correction unit 216, and a control code removal unit 217. The packet data transmitted via the transmission path constituting the lane 0 is input to the signal processing unit 202-0, and the packet data transmitted via the transmission path constituting the lane 1 is input to the signal processing unit 202-1. Furthermore, the packet data transmitted via the transmission path constituting the lane N is input to the signal processing unit 202-N.

As described above, in the physical layer of the reception unit 31, the signal processing units 202-0 to 202-N are provided as many as the number of lanes, and the processing of the packet data transmitted using each lane is performed in each of the signal processing units 202-0 to 202-N in parallel. The configuration of the signal processing unit 202-0 will be described, and the signal processing units 202-1 to 202-N also have a similar configuration.

The reception unit 211 receives a signal representing the packet data transmitted from the transmission unit 22 via the transmission path constituting the lane 0, and outputs the signal to the clock generation unit 212.

The clock generation unit 212 performs bit synchronization by detecting an edge of the signal supplied from the reception unit 211, and generates the clock signal on the basis of an edge detection cycle. The clock generation unit 212 outputs the signal supplied from the reception unit 211 to the synchronization unit 213 together with the clock signal.

The synchronization unit 213 samples the signal received by the reception unit 211 according to the clock signal generated by the clock generation unit 212, and outputs the packet data obtained by the sampling to the symbol synchronization unit 214. The clock generation unit 212 and the synchronization unit 213 implement a clock data recovery (CDR) function.

The symbol synchronization unit 214 performs symbol synchronization by detecting the control code included in the packet data or by detecting some symbols included in the control code. For example, the symbol synchronization unit 214 detects specific symbols included in Start Code, End Code, and Deskew Code, and performs symbol synchronization. The symbol synchronization unit 214 outputs the packet data in units of 10 bits representing each symbol to the 10B8B symbol decoder 215.

In addition, the symbol synchronization unit 214 performs symbol synchronization by detecting a boundary of the symbol included in Sync Code repeatedly transmitted from the transmission unit 22 in the training mode before transmission of the packet data is started.

The 10B8B symbol decoder 215 performs 10B8B conversion on the packet data in units of 10 bits supplied from the symbol synchronization unit 214, and outputs the packet data converted into data in units of eight bits to the skew correction unit 216.

The skew correction unit 216 detects Deskew Code from the packet data supplied from the 10B8B symbol decoder 215. Information of a timing of detection of Deskew Code by the skew correction unit 216 is supplied to the PHY-RX state control unit 201.

Furthermore, the skew correction unit 216 corrects data skew between the lanes in such a way that the timing of Deskew Code matches a timing indicated by the information supplied from the PHY-RX state control unit 201.

Figure 33:
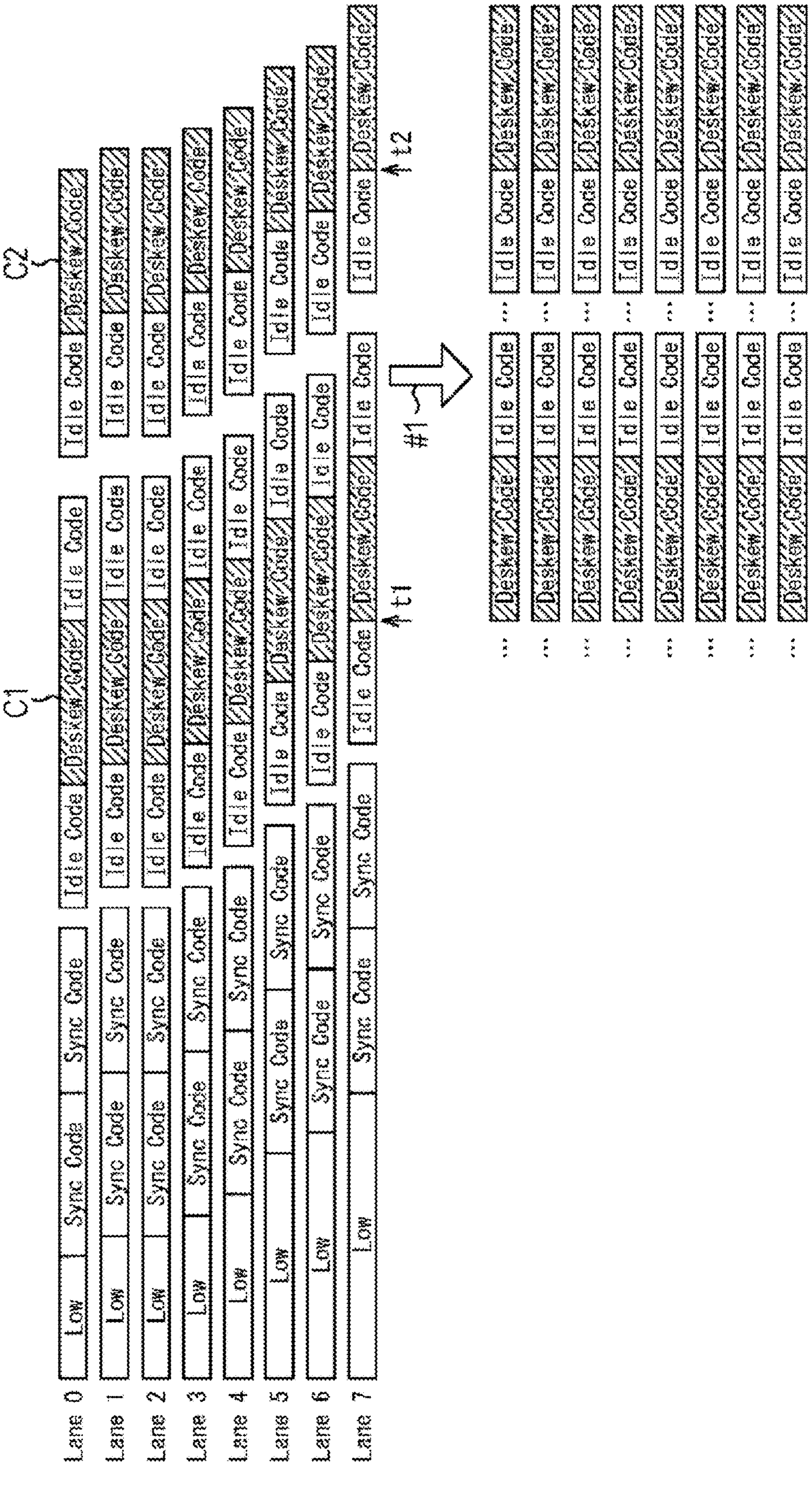
FIG. 33 is a diagram illustrating an example of correction of data skew.

FIG. 33 is a diagram illustrating an example of correcting data skew between the lanes using Deskew Code.

In the example of FIG. 33, transmission of Sync Code, Sync Code, . . . , Idle Code, Deskew Code, Idle Code, . . . , Idle Code, or Deskew Code is transmitted in each of the lanes 0 to 7, and each control code are received by the reception unit 31. A timing of reception of the same control code is different for each lane, and data skew between the lanes occurs.

In this case, the skew correction unit 216 detects Deskew Code C1, which is the first Deskew Code, and corrects a timing of the head of Deskew Code C1 to match a time t1 indicated by the information supplied from the PHY-RX state control unit 201. The information of the time t1 at which Deskew Code C1 is detected in the lane 7, which is the latest timing among timings at which Deskew Code C1 is detected in the respective lanes 0 to 7, is supplied from the PHY-RX state control unit 201.

Furthermore, the skew correction unit 216 detects Deskew Code C2, which is the second Deskew Code, and corrects a timing of the head of Deskew Code C2 to match a time t2 indicated by the information supplied from the PHY-RX state control unit 201. The information of the time t2 at which Deskew Code C2 is detected in the lane 7, which is the latest timing among timings at which Deskew Code C2 is detected in the respective lanes from the lane 0, is supplied from the PHY-RX state control unit 201.

By performing similar processing in each of the signal processing units 202-1 to 202-N, data skew between the lanes is corrected as indicated by a tip of an arrow #1 in FIG. 33.

The skew correction unit 216 outputs the packet data of which data skew is corrected to the control code removal unit 217.

The control code removal unit 217 removes the control code added to the packet data, and outputs, as the packet data, data between Start Code and End Code to the link layer.

The PHY-RX state control unit 201 controls each unit of the signal processing units 202-0 to 202-N to correct data skew between the lanes.

<Link Layer Configuration of Reception Unit 31>

Next, a link layer configuration of the reception unit 31 (the configuration of the link layer signal processing unit 52) will be described.

The link layer signal processing unit 52 includes a LINK-RX protocol management unit 221, a lane integration unit 222, a packet separation unit 223, a payload error correction unit 224, and a byte-to-pixel conversion unit 225 as the link layer configuration. The LINK-RX protocol management unit 221 includes a state control unit 231, a header error correction unit 232, a data removal unit 233, and a footer error detection unit 234.

The lane integration unit 222 integrates the packet data supplied from the signal processing units 202-0 to 202-N of the physical layer by rearranging the packet data in an order reverse to that of distribution to each lane by the lane distribution unit 155 of the transmission unit 22.

For example, in a case where the distribution of the packet data by the lane distribution unit 155 is performed as indicated by a tip of an arrow #1 in FIG. 30, the packet data on the left side of FIG. 30 is acquired by integrating the pieces of packet data of the respective lanes. At the time of integrating the pieces of packet data of the respective lanes, the lane integration unit 222 removes the lane stuffing data under the control of the data removal unit 233. The lane integration unit 222 outputs the integrated packet data to the packet separation unit 223.

The packet separation unit 223 separates the packet data for one packet integrated by the lane integration unit 222 into the packet data constituting the header data and the packet data constituting the payload data. The packet separation unit 223 outputs the header data to the header error correction unit 232 and outputs the payload data to the payload error correction unit 224.

Furthermore, in a case where the footer is included in the packet, the packet separation unit 223 separates data for one packet into the packet data constituting the header data, the packet data constituting the payload data, and the packet data constituting the footer data. The packet separation unit 223 outputs the header data to the header error correction unit 232 and outputs the payload data to the payload error correction unit 224. Furthermore, the packet separation unit 223 outputs the footer data to the footer error detection unit 234.

In a case where the parity is inserted to the payload data supplied from the packet separation unit 223, the payload error correction unit 224 detects an error in the payload data by performing error correction computation on the basis of the parity, and corrects the detected error. For example, in a case where the parity is inserted as illustrated in FIG. 26, the payload error correction unit 224 uses two parities inserted at the end of the first basic block to perform error correction on 224 pieces of pixel data in front of the parity.

The payload error correction unit 224 outputs the pixel data after error correction obtained by performing the error correction on each basic block and each extra block to the byte-to-pixel conversion unit 225. In a case where the parity is not inserted to the payload data supplied from the packet separation unit 223, the payload data supplied from the packet separation unit 223 is output to the byte-to-pixel conversion unit 225 as it is.

The byte-to-pixel conversion unit 225 removes the payload stuffing data included in the payload data supplied from the payload error correction unit 224 under the control of the data removal unit 233.

Furthermore, the byte-to-pixel conversion unit 225 performs byte-to-pixel conversion for converting each pixel data in byte unit obtained by removing the payload stuffing data into the pixel data in units of eight bits, 10 bits, 12 bits, 14 bits, or 16 bits. In the byte-to-pixel conversion unit 225, conversion reverse to the pixel-to-byte conversion by the pixel-to-byte conversion unit 152 of the transmission unit 22 is performed.

The byte-to-pixel conversion unit 225 outputs the pixel data in units of eight bits, 10 bits, 12 bits, 14 bits, or 16 bits obtained by the byte-to-pixel conversion to the application layer processing unit 53. In the application layer processing unit 53, for example, each line of valid pixels specified by Line Valid of the header information is generated on the basis of the pixel data obtained by the byte-to-pixel conversion unit 225, and each line is arranged according to Line Number of the header information, thereby generating the frame data including an image of one frame.

The state control unit 231 of the LINK-RX protocol management unit 221 manages the state of the link layer of the reception unit 31.

The header error correction unit 232 acquires a set of the header information and the CRC code on the basis of the header data supplied from the packet separation unit 223. The header error correction unit 232 performs error detection computation which is computation for detecting an error in the header information for each set of the header information and the CRC code, and outputs the header information after the error detection.

The data removal unit 233 controls the lane integration unit 222 to remove the lane stuffing data, and controls the byte-to-pixel conversion unit 225 to remove the payload stuffing data.

The footer error detection unit 234 acquires the CRC code stored in the footer on the basis of the footer data supplied from the packet separation unit 223. The footer error detection unit 234 performs error detection computation by using the acquired CRC code and detects an error in the payload data. The footer error detection unit 234 outputs an error detection result.

The above processing is performed in each of the link layer signal processing unit 42 and the physical layer signal processing unit 43 of the transmission unit 22 included in the image sensor 11 and the physical layer signal processing unit 51 and the link layer signal processing unit 52 of the reception unit 31 included in the DSP 12.

Application Example

<Application to General-Purpose Image Sensor>

In a case where the image sensor 11 is a general-purpose image sensor, necessity/unnecessity of each of the functional safety operation and the security operation varies depending on a product on which the image sensor 11 is mounted. As the frame format, a format in which on/off of the functional safety operation and the security operation can be easily set is demanded.

Format 1 for On/Off of Functional Safety Operation and Security Operation

Figure 34:
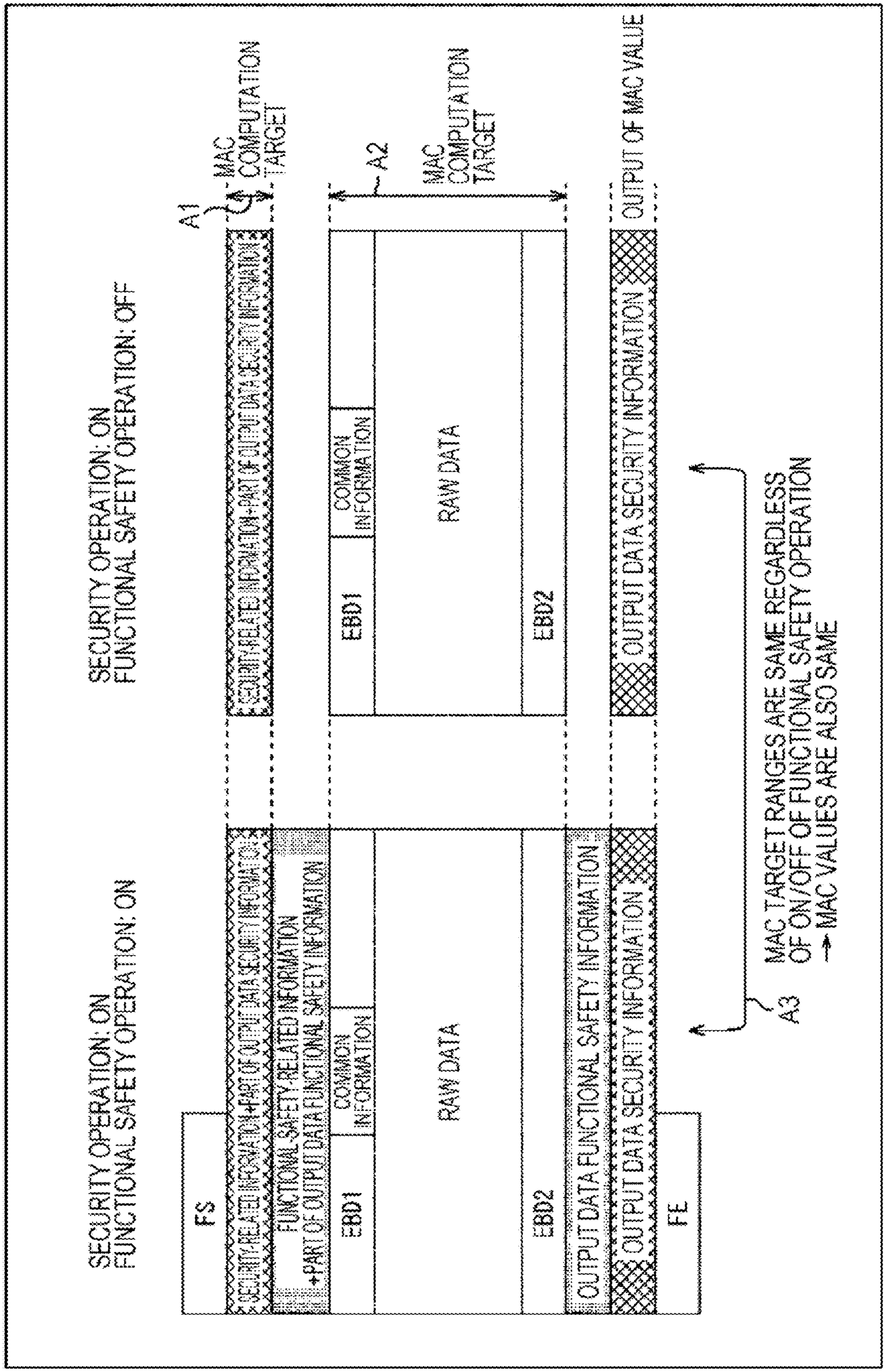
FIG. 34 is a diagram illustrating an example of target ranges of message authentication code (MAC) computation.

FIG. 34 is a diagram illustrating an example of target ranges of the MAC computation.

FIG. 34 illustrates the target range of the MAC computation in a case where the frame format described with reference to FIG. 19 is used. The same applies to a case where another frame format is used.

As illustrated on the right side of FIG. 34, the target ranges of the MAC computation are set as a range indicated by an arrow A1 including a line in which the security-related information is arranged and a range indicated by an arrow A2 from a line in which the EBD 1 is arranged to a line in which the EBD 2 is arranged. In this case, the functional safety information is information that is not subject to authentication using the MAC value.

Since the target ranges of the MAC computation are the same, the same value is obtained by the MAC computation regardless of whether the functional safety operation is turned on or off as indicated by an arrow A3. Since the same MAC value can be used for authentication regardless of whether the functional safety operation is turned on or off, it is possible to cope with on/off of the functional safety operation by setting the target of the MAC computation as illustrated in FIG. 34.

Figure 35:
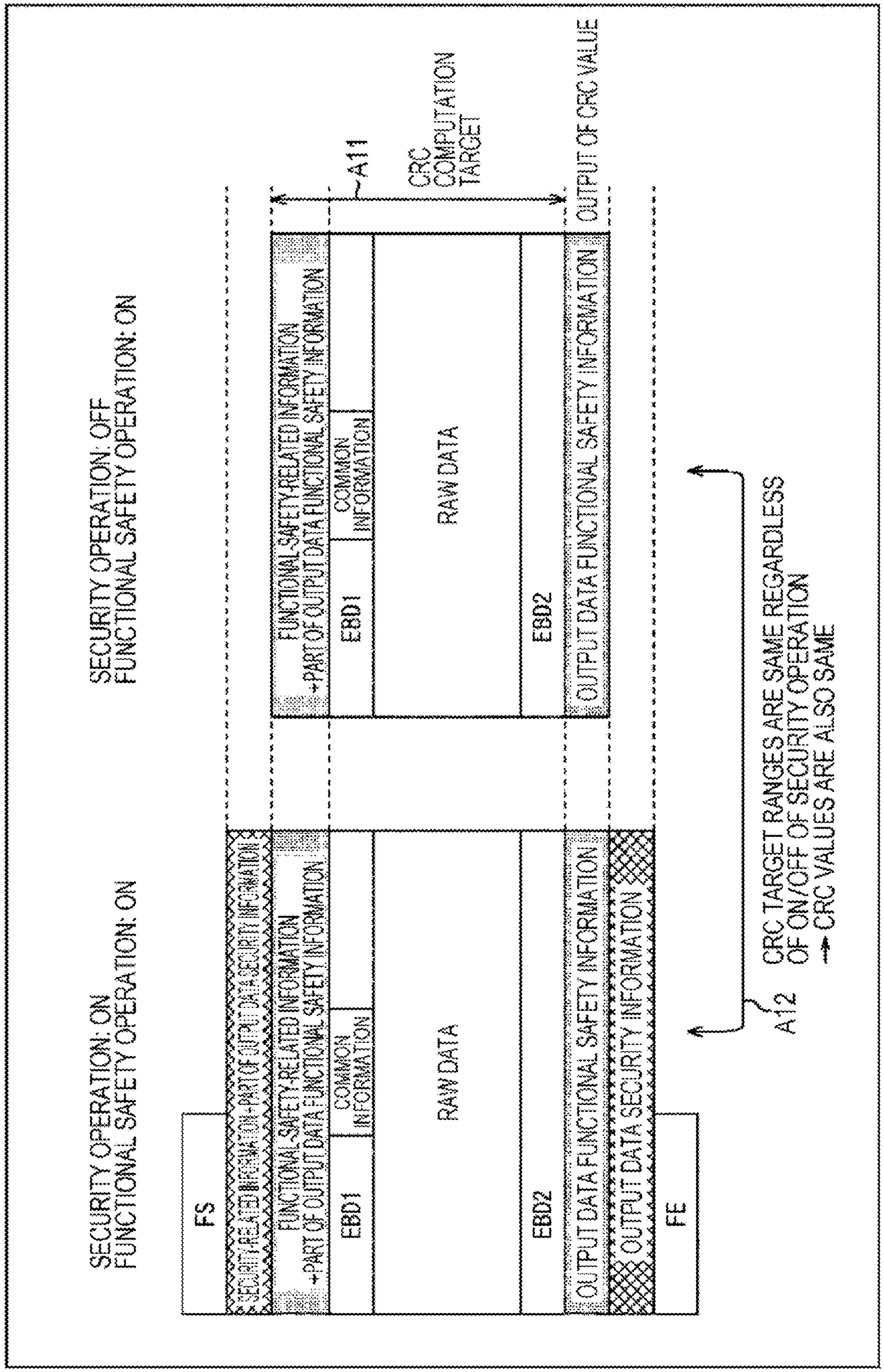
FIG. 35 is a diagram illustrating an example of target ranges of cyclic redundancy check (CRC) computation.

FIG. 35 is a diagram illustrating an example of target ranges of the CRC computation.

As illustrated on the right side of FIG. 35, the target ranges of the CRC computation are set as a range indicated by an arrow A11 from a line in which the functional-safety-related information is arranged to a line in which the EBD 2 is arranged. In this case, the security information is information that is not subject to error detection using the CRC value.

Since the target ranges of the CRC computation are the same, the same value is obtained by the CRC computation regardless of whether the security operation is turned on or off as indicated by an arrow A12. Since the same CRC value can be used for error detection regardless of whether the security operation is turned on or off, it is possible to cope with on/off of the security operation by setting the target of the CRC computation as illustrated in FIG. 35.

Format 2 for On/Off of Functional Safety Operation and Security Operation

Figure 36:
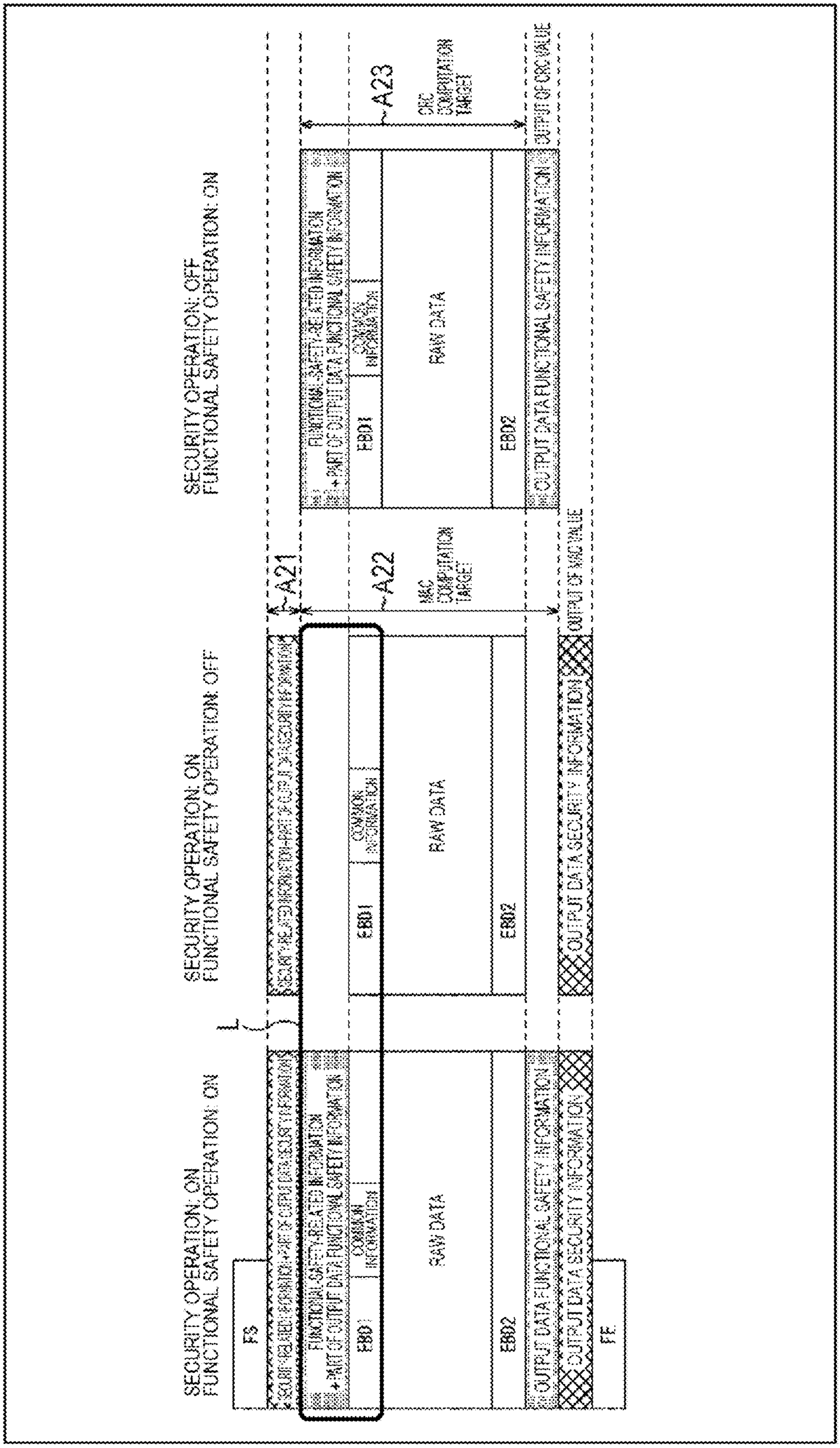
FIG. 36 is a diagram illustrating an example of the target ranges of the MAC computation and the CRC computation.

FIG. 36 is a diagram illustrating an example of the target ranges of the MAC computation and the CRC computation.

As illustrated in the center of FIG. 36, the target ranges of the MAC computation are set as a range indicated by an arrow A21 including a line in which the security-related information is arranged and a range indicated by an arrow A22 from a line in which the functional-safety-related information is arranged to a line in which the output data functional safety information is arranged. In this case, the functional safety information is information that is not subjected to authentication using the MAC value.

In the application layer processing unit 53 of the DSP 12, as indicated by a solid line L, the line in which the functional-safety-related information is arranged is regarded as the line of the EBD 1, and processing similar to the processing for the EBD 1 is performed. In accordance with on/off of the functional safety operation, the application layer processing unit 53 copes with an increase/decrease of the line of the EBD.

For example, in a case where the functional safety operation is turned on, the application layer processing unit 53 regards the line in which the functional-safety-related information is arranged as the line of the EBD 1, and performs the MAC computation by including the line in which the functional-safety-related information is arranged in the computation target. Furthermore, in a case where the functional safety operation is turned off, the application layer processing unit 53 performs the MAC computation processing by including the line of the EBD 1 and subsequent lines as the computation targets.

The image sensor 11 may be able to select a target range of the MAC computation.

In the example of FIG. 36, the functional safety information is a target of authentication using the MAC value, but conversely, the security information may be a target of error detection using the CRC value.

On/Off Setting Example

On/off of each of the functional safety operation and the security operation is set, for example, at the time of manufacturing a product on which the image sensor 11 is mounted.

Figure 37:
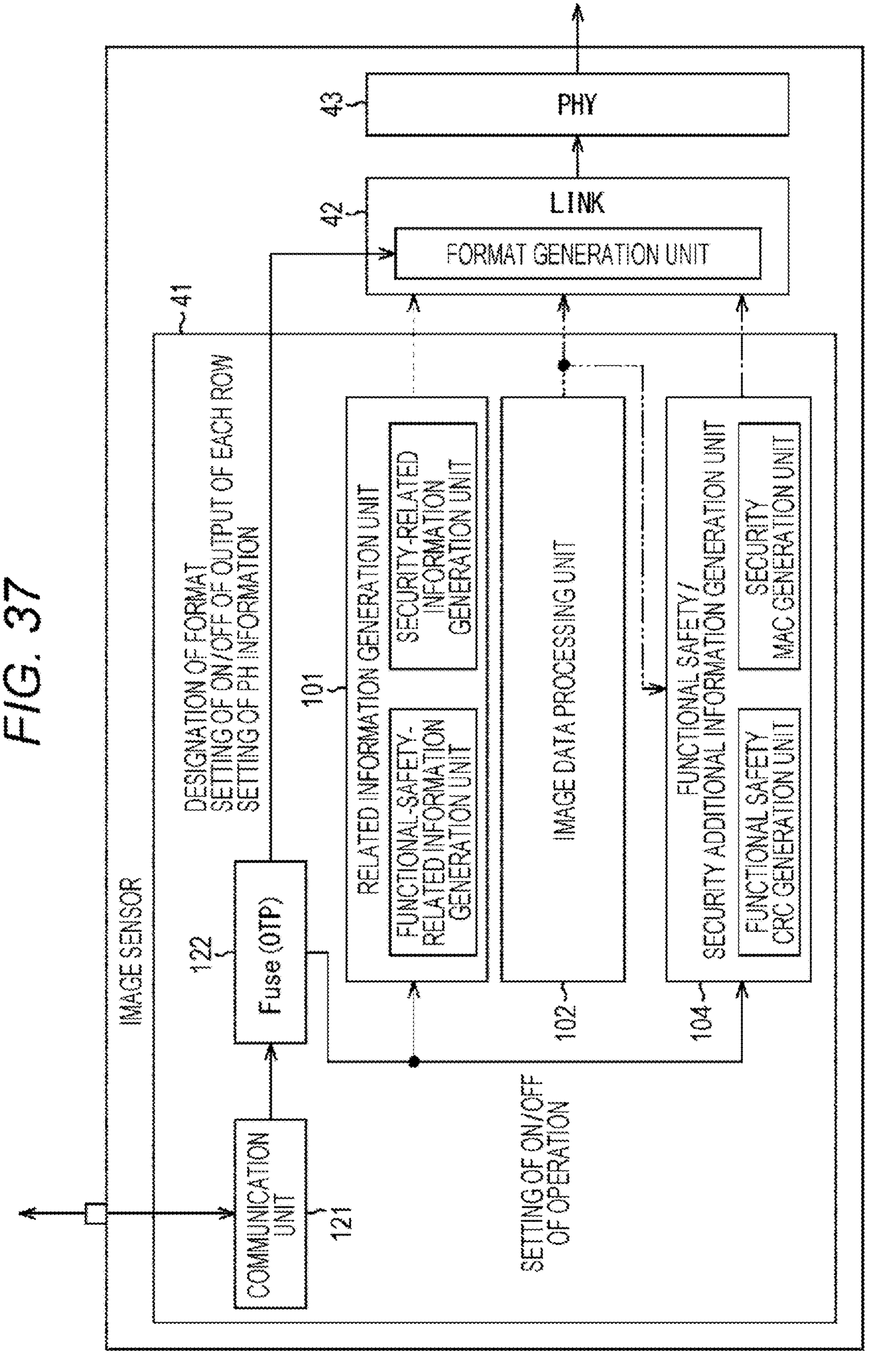
FIG. 37 is a block diagram illustrating an example of a configuration of an application layer processing unit.

FIG. 37 is a block diagram illustrating an example of a configuration of the application layer processing unit 41 having a function of switching on/off of the functional safety operation and the security operation. In the configuration illustrated in FIG. 37, the same components as those described above are denoted by the same reference signs. An overlapping description will be omitted as appropriate. Note that illustration of the EBD generation unit 103 is omitted.

The application layer processing unit 41 illustrated in FIG. 37 includes a communication unit 121 and a fuse 122 in addition to the above-described configuration.

The communication unit 121 communicates with an external apparatus via a communication IF such as 12C or SPI. The communication unit 121 receives setting information transmitted from the external apparatus, and outputs the setting information to the fuse 122. The setting information is information indicating a setting content of the fuse 122.

The fuse 122 is a circuit having a one time programmable (OTP) function. The fuse 122 outputs information regarding various settings including on/off of the functional safety operation and the security operation on the basis of the setting information supplied from the communication unit 121.

Information indicating the setting content of on/off of the functional safety operation and the security operation is supplied from the fuse 122 to the related information generation unit 101 and the functional safety/security additional information generation unit 104. In addition, information designating the type of the frame format, information designating on/off of the line of the functional safety information and the line of the security information, and information designating the value of the header information are supplied from the fuse 122 to the link layer signal processing unit 42 (format generation unit).

In this manner, on/off of the functional safety operation and the security operation is set using, for example, the fuse 122.

As described above, the necessity/unnecessity of each of the functional safety operation and the security operation varies depending on a product on which the image sensor 11 is mounted, and it is costly to manufacture a product corresponding to each of the functional safety operation and the security operation. By making it possible to set on/off of the functional safety operation and the security operation using the fuse 122, it is possible to suppress the cost as compared with a case of manufacturing different products corresponding to the respective operations.

In addition, in a case where on/off of the functional safety operation and the security operation can be set at an arbitrary timing using a register or the like, there is a problem in functional safety and security. By making it possible to set on/off of the functional safety operation and the security operation only at the time of manufacturing, for example, by using the fuse 122, such a problem can be solved.

In a case where the functional safety operation is turned on and the security operation is turned off, the frame data in which the functional safety information is added to image data of one frame as the output data is generated. On the other hand, in a case where the functional safety operation is turned off and the security operation is turned on, the frame data in which the security information is added to image data of one frame as the output data is generated. The application layer processing unit 41 functions as a generation unit that generates the frame data in which at least one of the security information or the functional safety information is added to image data of one frame.

<Application to Other Communication Standards>

Although the frame format in the SLVS-EC data transmission has been described, the above-described technology is also applicable to other communication IFs that perform data transmission in units of frames.

Example of Application to Mobile Industry Processor Interface (MIPI)

In a region of 0x30 to 0x37 of the packet header of the MIPI, a data type (DT) region that can determine a use for each product, called user define, is prepared. The lower three bits of 0x30 to 0x37 are used as EBD Line, Safety Info, and Security Info.

For example, the fact that the data stored in the packet is the data of the line in which the EBD is arranged is indicated by using the lower three bits of 0x12 (MIPI specification).

The fact that the data stored in the packet is the data of the line in which the security-related information is arranged is expressed by using the lower three bits of 0x35. The fact that the data stored in the packet is the data of the line in which the functional-safety-related information is arranged is expressed by using the lower three bits of 0x36.

Similarly, the fact that the data stored in the packet is the data of the line in which the output data security information is arranged is expressed by using the lower three bits of 0x31. The fact that the data stored in the packet is the data of the line in which the output data functional safety information is arranged is expressed by using the lower three bits of 0x32.

Figure 38:
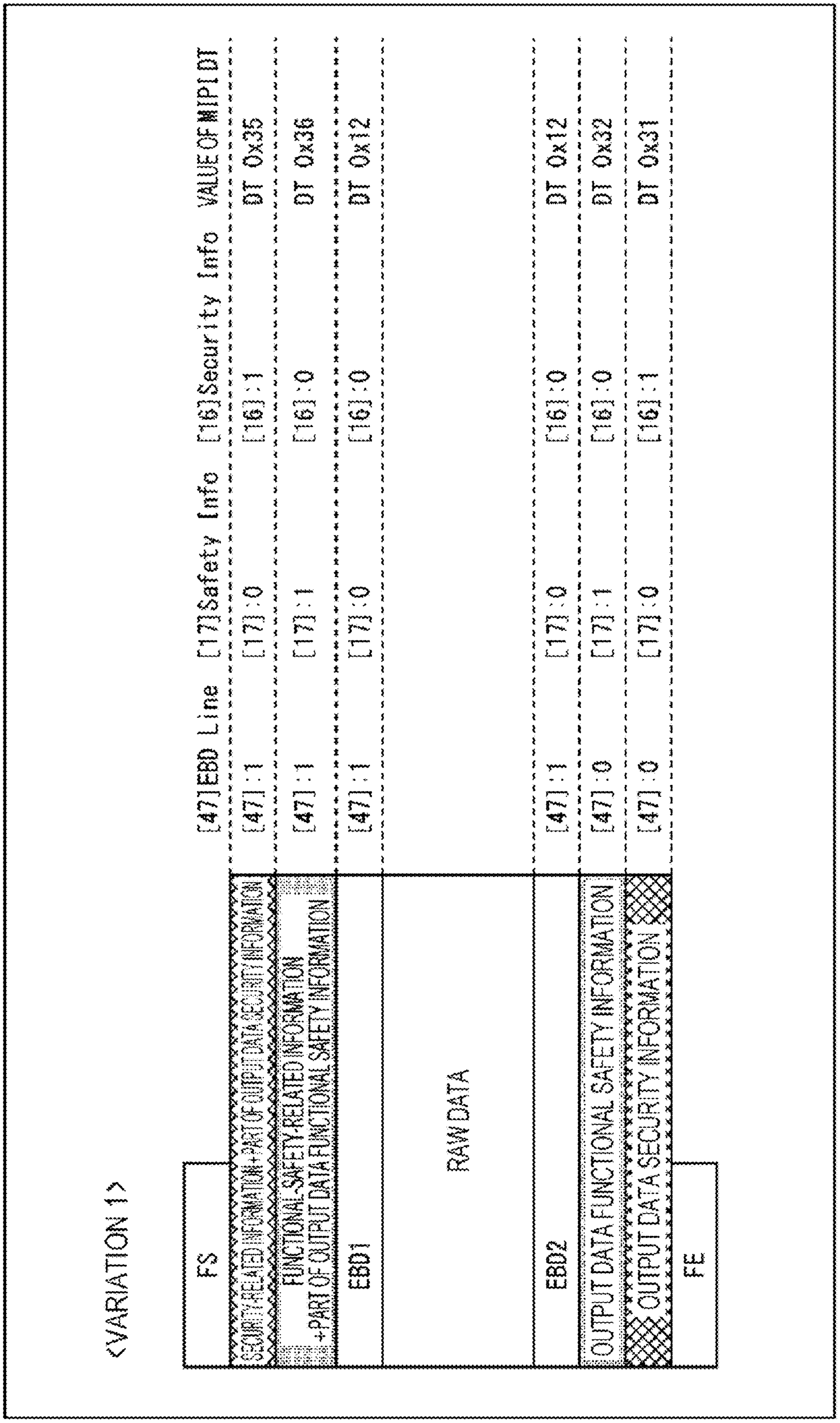
FIG. 38 is a diagram illustrating an example of a value of a data type (DT) region.

FIG. 38 is a diagram illustrating an example of a value of the DT region. FIG. 38 illustrates the frame format described with reference to FIG. 18.

[EBD Line, Safety Info, Security Info]=[1, 0, 1] indicating that the data is data of a line in which the security-related information and the part of the information included in the output data security information are arranged is expressed by using 0x35. [EBD Line, Safety Info, Security Info]=[1, 1, 0] indicating that the data is data of a line in which the functional-safety-related information and the part of the information included in the functional safety information are arranged is expressed by using 0x36.

[EBD Line, Safety Info, Security Info]=[1, 0, 0] indicating that the data is data of a line in which the EBD 1 is arranged is expressed by using 0x12. The fact that the data is data of a line in which the EBD 2 is arranged is similarly expressed using 0x12.

[EBD Line, Safety Info, Security Info]=[0, 1, 0] indicating that the data is data of a line in which the output data functional safety information is arranged is expressed by using 0x32. [EBD Line, Safety Info, Security Info]=[0, 0, 1] indicating that the data is data of a line in which the output data security information is arranged is expressed by using 0x31.

Figure 39:
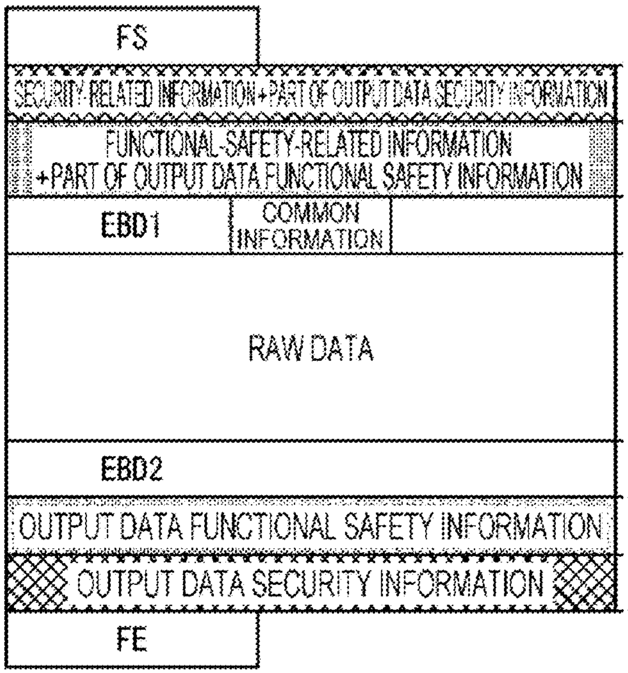
FIG. 39 is a diagram illustrating another example of the value of the DT region.

FIG. 39 is a diagram illustrating another example of the value of the DT region. FIG. 39 illustrates the frame format described with reference to FIG. 19. A description overlapping with the description of FIG. 38 will be omitted.

[EBD Line, Safety Info, Security Info]=[1,1,1] indicating that the EBD including the common information for the functional-safety-related information and the security-related information is data of a line in which the EBD is arranged is expressed by using 0x37.

In a case where user define is also used for other types of processing, it is assumed that the information of the DT region becomes insufficient. As a countermeasure, other bits such as bits of Reserve may be used, or the DT region to be used may be limited. In a case where the DT region to be used is limited, for example, the same DT region is used to indicate that data of the line in which the security-related information is arranged and data of the line in which the output data security information is arranged are data of the line in which the security-related information is arranged.

In a case where the functional safety information/security information is included in the EBD and an arrangement position of the information is determined as a specification, the inclusion of the functional safety information/security information may be expressed by using 0x12 allocated to the EBD.

Example of Application to Scalable Low Voltage Signaling (SLVS)/Sub Low-Voltage Differential Signaling (SubLVDS)

In SLVS and SubLVDS, a format such as the packet header including information indicating the type of data of each line is not defined. By adding 3-bit line information indicating the type of data of each line to the head of data arranged in each line, information similar to EBD Line, Safety Info, and Security Info may be transmitted.

Figure 40:
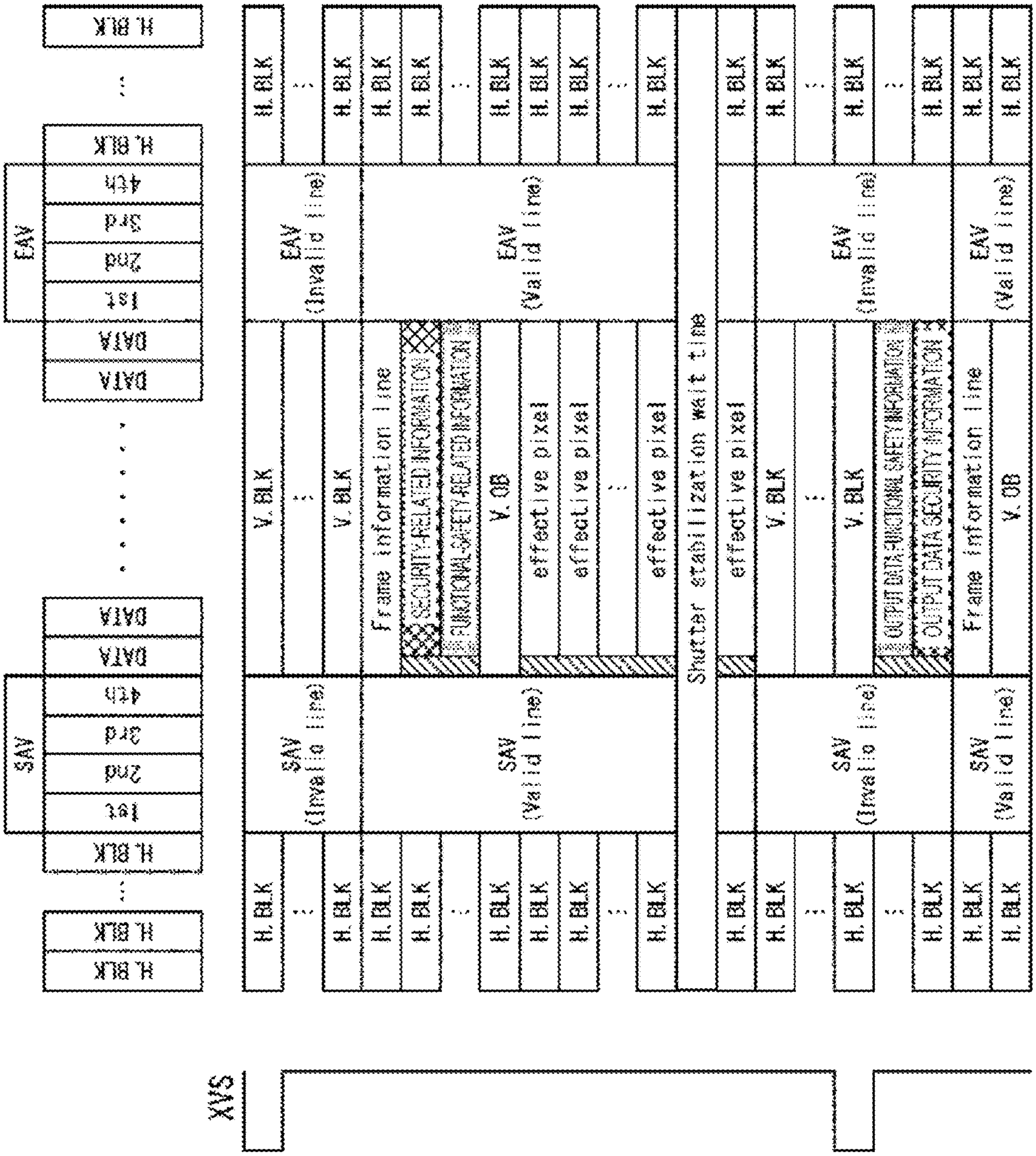
FIG. 40 is a diagram illustrating an example of a transmission timing of data of scalable low voltage signaling (SLVS)/sub low-voltage differential signaling (SubLVDS).

FIG. 40 is a diagram illustrating an example of a transmission timing of data of the SLVS/SubLVDS.

As illustrated in FIG. 40, lines in which the security-related information, the functional-safety-related information, the output data functional safety information, and the output data security information are arranged are prepared. As indicated by hatching, the line information indicating the type of data of each line is added to the head of each line.

In this manner, the above-described technology can be applied not only to the SLVSEC but also to other standards of the communication IF such as the MIPI, the SLVS, and the SubLVDS.

Figure 41:
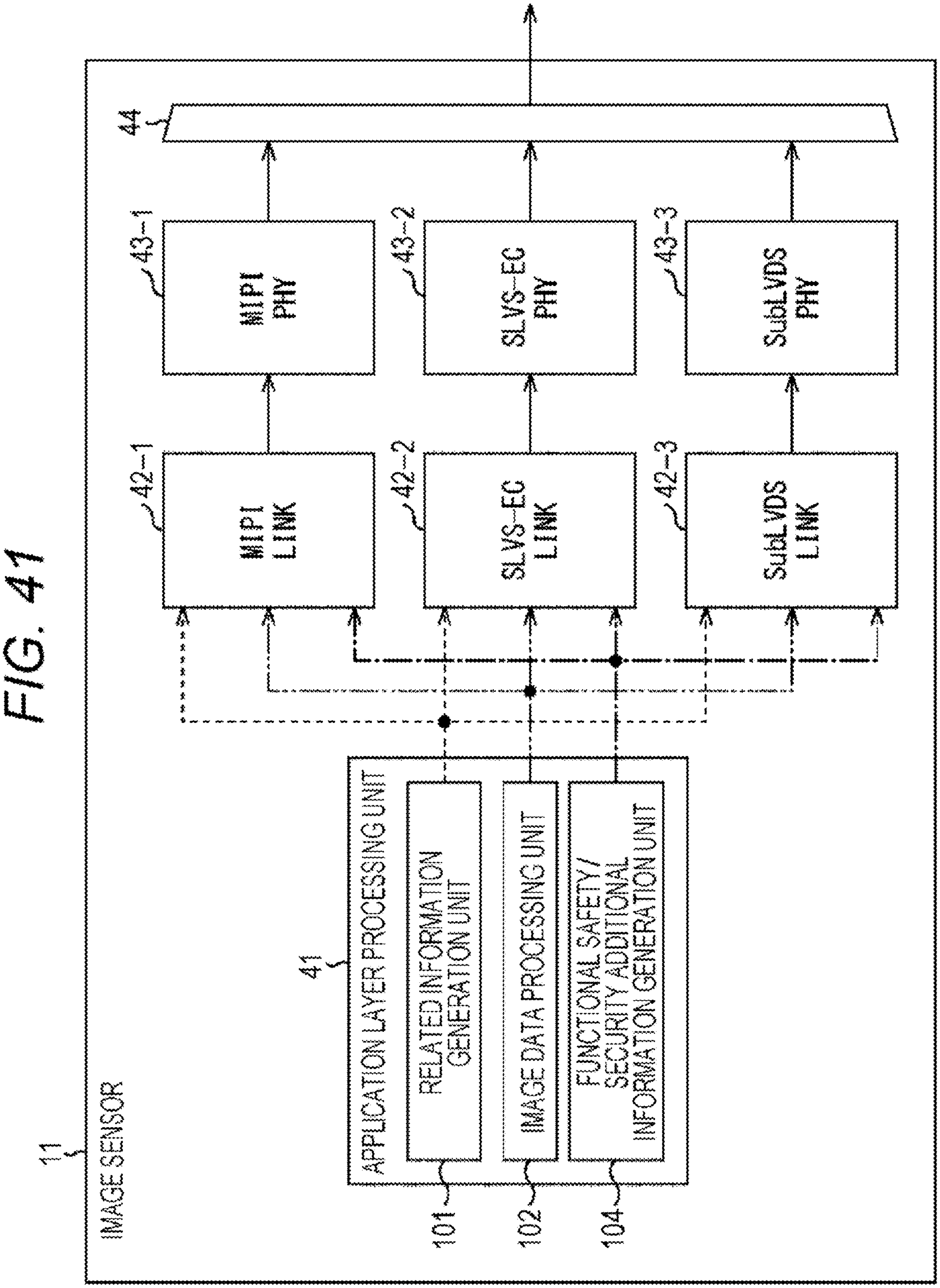
FIG. 41 is a block diagram illustrating an example of a configuration of the image sensor.

FIG. 41 is a block diagram illustrating an example of a configuration of the image sensor 11.

The image sensor 11 illustrated in FIG. 41 is an image sensor capable of selecting a communication IF to be used for data transmission from among the MIPI, the SLVSEC, and the SubLVDS. In this case, a signal processing unit corresponding to the MIPI, a signal processing unit corresponding to the SLVS-EC, and a signal processing unit corresponding to the SubLVDS are provided.

Each of an MIPI link layer signal processing unit 42-1, an SLVS-EC link layer signal processing unit 42-2, and a SubLVDS link layer signal processing unit 42-3 performs link layer signal processing of the MIPI, the SLVS-BC, and the SubLVDS on the data supplied from the application layer processing unit 41. Note that a line information generation unit is also provided in the SubLVDS link layer signal processing unit. 42-3.

Each of the MIPI physical-layer signal processing unit 43-1, the SLVS-EC physical-layer signal processing unit 43-2, and the SubLVDS physical-layer signal processing unit 43-3 performs physical layer signal processing of the MIPI, the SLVS-EC, and the SubLVDS on data of the link layer signal processing result in the previous stage.

The selection unit 44 selects data of a predetermined standard from among the pieces of data supplied from the MIPI physical-layer signal processing unit 43-1 to the SubLVDS physical-layer signal processing unit 43-3, and transmits the data to the DSP 12.

By allowing the type of data arranged in each line to be designated in the application layer as described above, the image sensor 11 and the DSP 12 can perform the link layer signal processing and the physical layer signal processing without being conscious of a difference in standard of the communication IF.

Although FIG. 41 illustrates only the configuration on an image sensor 11 side, the same configuration as the configuration described with reference to FIG. 11 and the like is provided on a DSP 12 side. Even in a case where the host side is implemented by using a field programmable gate array (FPGA), it is easy to design processing regardless of which standard of the communication IF the FPGA corresponds to.

<Others>

Example of Output of Long-Accumulated Image and Short-Accumulated Image

As an imaging mode of the image sensor 11, there is a mode in which a long-accumulated image and a short-accumulated image are captured. The long-accumulated image is an image obtained by imaging with a long exposure time. The short-accumulated image is an image obtained by imaging with an exposure time shorter than the exposure time of the long-accumulated image. Transmission of the long-accumulated image and the short-accumulated image by the SLVS-EC is performed in such a way that, for example, data of one line of the long-accumulated image and data of one line of the short-accumulated image are alternately transmitted from the upper line.

Figure 42:
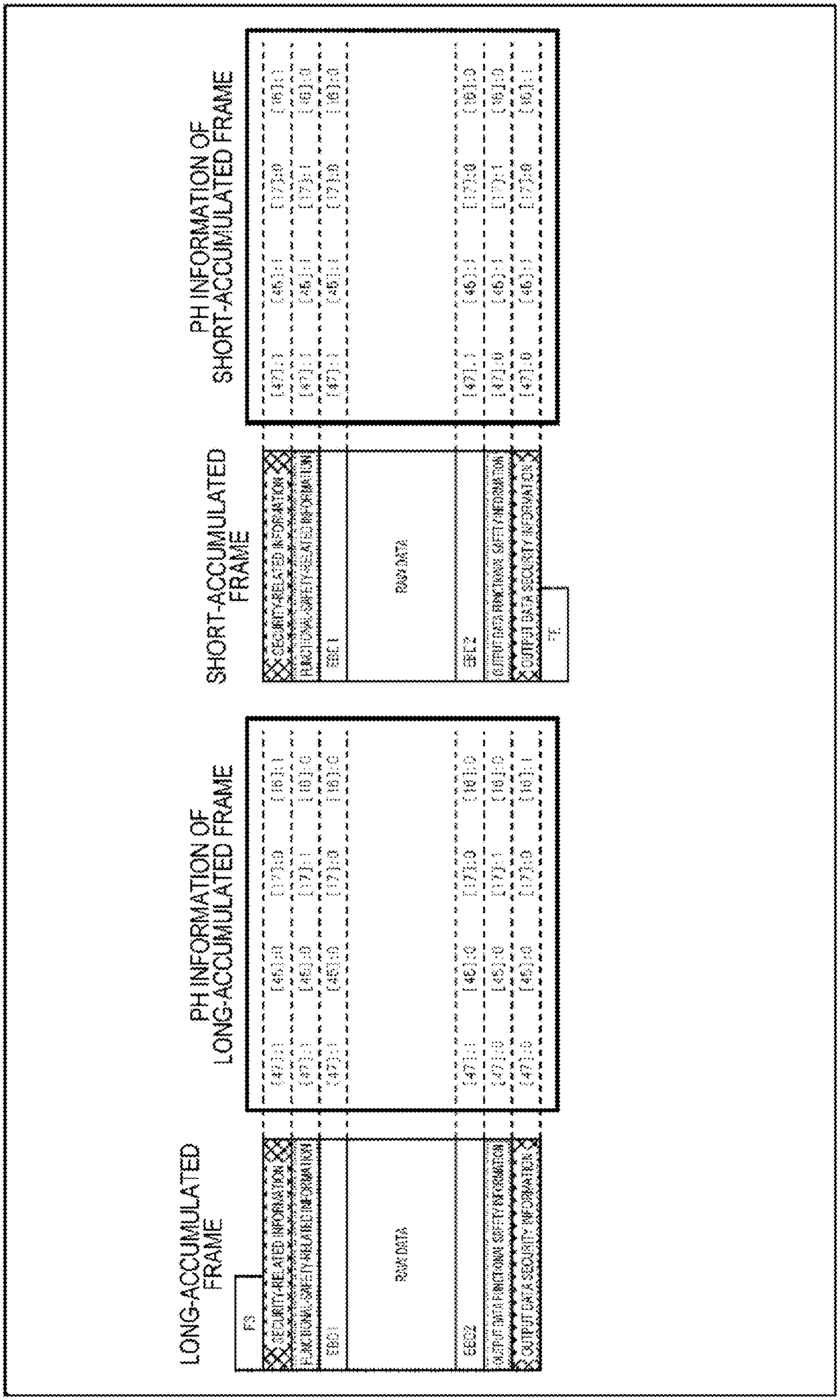
FIG. 42 is a diagram illustrating an example of the header information used for transmission of a long-accumulated image and a short-accumulated image.

FIG. 42 is a diagram illustrating an example of the header information used for transmission of the long-accumulated image and the short-accumulated image.

The left side of FIG. 42 illustrates the header information of the packet header added to the packet that stores data of each line of the long accumulation image. The right side illustrates the header information of the packet header added to the packet that stores data of each line of the short-accumulated image.

As illustrated in FIG. 42, Data ID (FIG. 12) of bit is used to identify the long-accumulated image and the short-accumulated image. The value of bit of 1 indicates that the data stored in the packet is the data of the short-accumulated image, and the value of 0 indicates that the data stored in the packet is the data of the long-accumulated image. In a case where the line of the long-accumulated image and the line of the short-accumulated image are alternately transmitted, the content of each line is distinguished by the header information. Even in a case of performing alternate transmission in units of lines, the frame is treated as another frame.

The values set for EBD Line of bit [47], Safety Info of bit [17], and Security Info of bit [16] are the same as the above-described values.

As described above, even in a case where the long-accumulated image and the short-accumulated image are transmitted, the functional safety information and the security information can be transmitted in a form conforming to the SLVS-EC standard.

Although the frame data is generated using the image data obtained by imaging by the image sensor 11 as the output data and transmitted to the DSP 12, other types of data in units of frames may be used as the output data. For example, a distance image in which a distance to each position of a subject is the pixel value of each pixel can be used as the output data.

Example of Configuration of Computer

The series of processing described above can be executed by hardware or can be executed by software. In a case where the series of processing is executed by software, a program constituting the software in a program recording medium is installed in a computer incorporated in dedicated hardware, a general-purpose personal computer, or the like.

Figure 43:
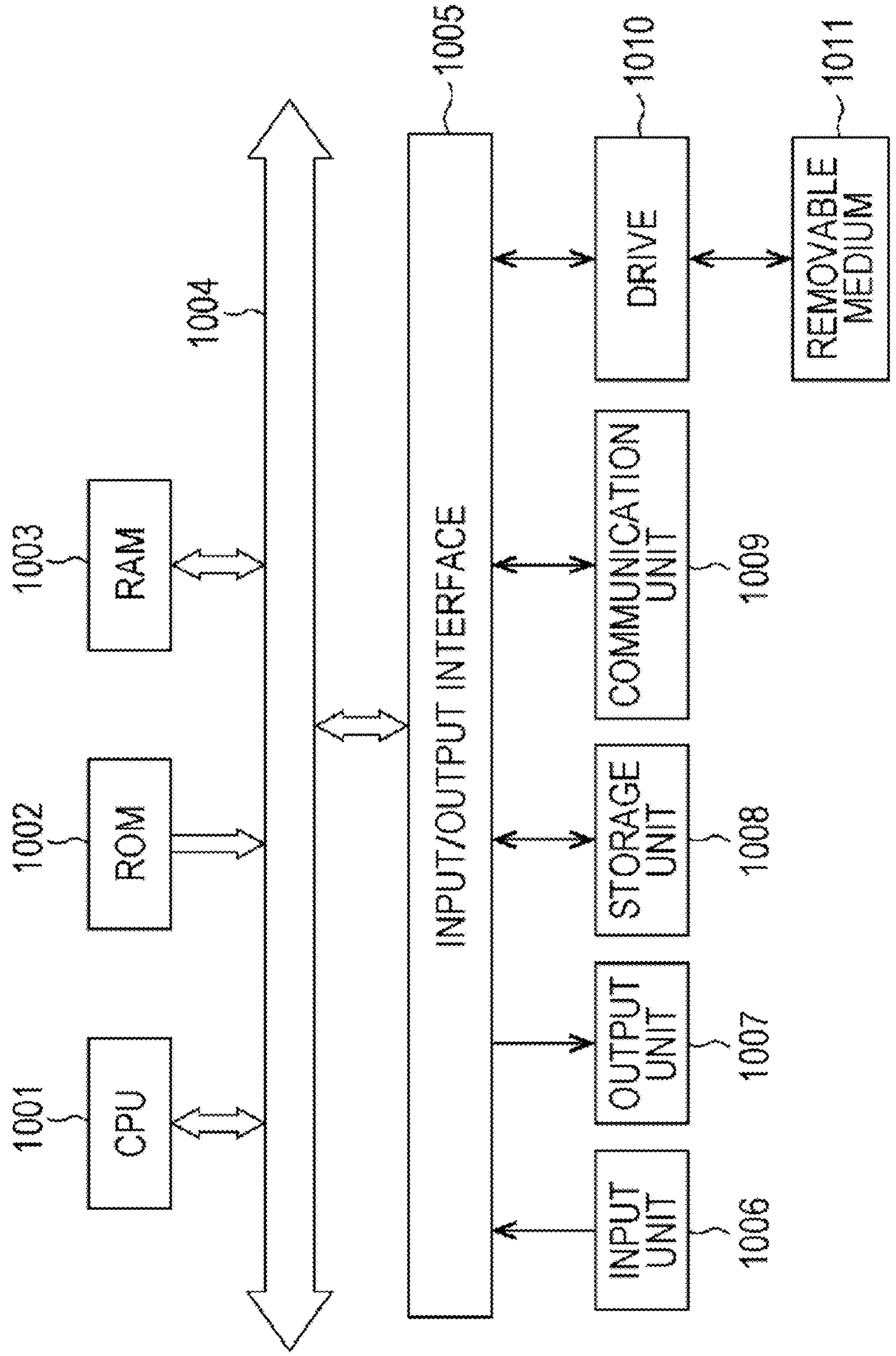
FIG. 43 is a block diagram illustrating an example of a configuration of a computer.

FIG. 43 is a block diagram illustrating an example of a configuration of hardware of a computer executing the series of processing described above by using a program.

A central processing unit (CPU) 1001, a read only memory (ROM) 1002, and a random access memory (RAM) 1003 are connected to one another by a bus 1004.

Moreover, an input/output interface 1005 is connected to the bus 1004. An input unit 1006 implemented by a keyboard, a mouse, or the like, and an output unit 1007 implemented by a display, a speaker, or the like are connected to the input/output interface 1005. Furthermore, a storage unit 1008 implemented by a hard disk, a nonvolatile memory, or the like, a communication unit 1009 implemented by a network interface or the like, and a drive 1010 driving removable media 1011 are connected to the input/output interface 1005.

In the computer configured as described above, the CPU 1001 loads, for example, a program stored in the storage unit 1008 to the RAM 1003 through the input/output interface 1005 and the bus 1004, and executes the program, such that the series of processing described above is performed.

The program executed by the CPU 1001 is recorded in, for example, the removable media 1011, or is provided through a wired or wireless transmission medium such as a local area network, Internet, and digital broadcasting, and installed in the storage unit 1008.

Note that the program executed by the computer may be a program by which the pieces of processing are performed in time series in the order described in the present specification, or may be a program by which the pieces of processing are performed in parallel or at a necessary timing such as when a call is performed or the like.

In the present specification, a system means a set of a plurality of components (apparatuses, modules (parts), or the like), and it does not matter whether or not all the components are in the same housing. Therefore, a plurality of apparatuses housed in separate housings and connected via a network and one apparatus in which a plurality of modules is housed in one housing are both systems.

The effects described in the present specification are merely illustrative and not limitative, and the present technology may have other effects.

The embodiment of the present technology is not limited to that described above, and may be variously changed without departing from the gist of the present technology.

Furthermore, each step described in the above-described flowchart can be performed by one apparatus or can be performed in a distributed manner by a plurality of apparatuses.

Moreover, in a case where a plurality of pieces of processing is included in one step, the plurality of pieces of processing included in the one step can be performed by one apparatus or can be performed in a distributed manner by a plurality of apparatuses.

Example of Combination of Configurations

Note that the present technology can also have the following configuration.

(1)

A transmission apparatus including:

a generation unit that generates frame data by adding at least one of security information or functional safety information to output data in units of frames output by a sensor, the security information being information used for implementing security, and the functional safety information being information used for implementing functional safety; and a signal processing unit that stores data of each line included in the frame data in each packet and transmits the packet.

(2)

The transmission apparatus according to (1), in which the generation unit generates the security information including security-related information and output data security information and generates the functional safety information including functional-safety-related information and output data functional safety information, the security-related information being information used for implementing security of the sensor, the output data security information being information used for implementing security of the output data, the functional-safety-related information being information used for implementing functional safety of the sensor, and the output data functional safety information being information used for implementing functional safety of the output data.

(3)

The transmission apparatus according to (2), in which the generation unit generates the frame data having a format in which the security-related information and the functional-safety-related information are arranged ahead of the output data and the output data security information and the output data functional safety information are arranged behind the output data.

(4)

The transmission apparatus according to (3), in which the generation unit generates the frame data in which the functional-safety-related information is arranged in a line next to a line in which the security-related information is arranged and the output data security information is arranged in a line next to a line in which the output data functional safety information is arranged.

(5)

The transmission apparatus according to any one of (2) to (4), in which the generation unit generates the frame data in which partial information of the output data security information is arranged in the same line ahead of the output data together with the security-related information, and partial information of the output data functional safety information is arranged in the same line ahead of the output data together with the functional-safety-related information.

(6)

The transmission apparatus according to any one of (2) to (5), in which the generation unit generates the frame data in which partial information common to the security-related information and the functional-safety-related information is arranged as embedded data in a line ahead of the output data.

(7)

The transmission apparatus according to (2) or (3), in which the generation unit generates the frame data in which the security-related information and the functional-safety-related information are arranged as embedded data in a line ahead of the output data.

(8)

The transmission apparatus according to any one of (2) to (5), in which the generation unit generates the frame data in which a line of embedded data including information indicating a format type of the frame data is arranged ahead of a line in which the security-related information is arranged.

(9)

The transmission apparatus according to any one of (2) to (8), in which the signal processing unit generates the packet to which a packet header including a first flag indicating whether or not data stored in the packet is data of a line in which the security information is arranged and a second flag indicating whether or not data stored in the packet is data of a line in which the functional safety information is arranged is added.

(10)

The transmission apparatus according to (9), in which the signal processing unit adds the packet header including a third flag in which a value indicating that data is data of a line in which the embedded data is arranged is set for the packet that stores data of a line in which the security-related information or the functional-safety-related information is arranged.

(11)

The transmission apparatus according to any one of (2) to (10), further including an additional information generation unit that generates, on the basis of the output data, authentication information as the output data security information and error detection information as the output data functional safety information.

(12)

The transmission apparatus according to any one of (1) to (11), in which the output data is image data of one frame obtained by imaging by the sensor.

(13)

A transmission method executed by a transmission apparatus, the transmission method including:

generating frame data by adding at least one of security information or functional safety information to output data in units of frames output by a sensor, the security information being information used for implementing security, and the functional safety information being information used for implementing functional safety; and storing data of each line included in the frame data in each packet and transmitting the packet.

(14)

A program for causing a computer to perform processing of:

generating frame data by adding at least one of security information or functional safety information to output data in units of frames output by a sensor, the security information being information used for implementing security, and the functional safety information being information used for implementing functional safety; and storing data of each line included in the frame data in each packet and transmitting the packet.

(15)

A reception apparatus including:

a signal processing unit that receives a packet that stores data of each line included in frame data in which at least one of security information or functional safety information is added to output data in units of frames output by a sensor, the security information being information used for implementing security, and the functional safety information being information used for implementing functional safety; and an information processing unit that performs processing of implementing security on the basis of the security information and performs processing of implementing functional safety on the basis of the functional safety information.

(16)

The reception apparatus according to (15), in which the signal processing unit receives the packet including, as the security information, security-related information and output data security information, and receives the packet including, as the functional safety information, functional-safety-related information and output data functional safety information, the security-related information being information used for implementing security of the sensor, the output data security information being information used for implementing security of the output data, the functional-safety-related information being information used for implementing functional safety of the sensor, and the output data functional safety information being information used for implementing functional safety of the output data.

(17)

The reception apparatus according to (15) or (16), further including an identification unit that identifies the data stored in the packet on the basis of a first flag indicating whether or not the data stored in the packet is data of a line in which the security information is arranged and a second flag indicating whether or not the data stored in the packet is data of a line in which the functional safety information is arranged, the first flag and the second flag being included in a packet header.

(18)

A reception method executed by a reception apparatus, the reception method including:

receiving a packet that stores data of each line included in frame data in which at least one of security information or functional safety information is added to output data in units of frames output by a sensor, the security information being information used for implementing security, and the functional safety information being information used for implementing functional safety; and performing processing of implementing security on the basis of the security information and performs processing of implementing functional safety on the basis of the functional safety information.

(19)

A program for causing a computer to execute processing of:

receiving a packet that stores data of each line included in frame data in which at least one of security information or functional safety information is added to output data in units of frames output by a sensor, the security information being information used for implementing security, and the functional safety information being information used for implementing functional safety; and performing processing of implementing security on the basis of the security information and performs processing of implementing functional safety on the basis of the functional safety information.

(20)

A transmission system including:

a transmission apparatus including a generation unit that generates frame data by adding at least one of security information or functional safety information to output data in units of frames output by a sensor, the security information being information used for implementing security, and the functional safety information being information used for implementing functional safety, and a signal processing unit that stores data of each line included in the frame data in each packet and transmits the packet; and a reception apparatus including a signal processing unit that receives the packet, and an information processing unit that performs processing of implementing security on the basis of the security information, and performs processing of implementing functional safety on the basis of the functional safety information.

(A1)

A transmission apparatus comprising:

a controller configured to perform operations comprising:

generating frame data corresponding to output data generated by a sensor, the frame data being generated according to a frame format that includes at least one of first security information or first functional safety information;

generating a plurality of packets based on the frame data, each of the packets including one of a plurality of lines of image data in the frame data; and transmitting the packets.

(A2)

The transmission apparatus according to (A1), wherein the frame format includes the first security information, the first functional safety information, a second security information and a second functional safety information.

(A3)

The transmission apparatus according to (A2), wherein the first security information includes at least one of security error information of register communication, detection information of an attack on the sensor, or information for analysis of a security error, and the second security information includes at least one of Initialization Vector information or Message Authentication Code.

(A4)

The transmission apparatus according to (A2) or (A3), wherein the first functional safety information includes at least one of functional safety error information of register communication, failure information inside the sensor, detection information of irregular operation of the sensor or information for analysis of functional safety error, and the second functional safety information includes Cyclic Redundancy Check value.

(A5)

The transmission apparatus according to any one of (A2) to (A4), wherein the frame format includes the first security information and the first functional safety information in a header, and the second security information and the second functional safety information in a footer.

(A6)

The transmission apparatus according to any one of (A2) to (A5), wherein the frame format includes the first functional safety information in a first header line and the first security information in a second header line next to the first header line.

(A7)

The transmission apparatus according to any one of (A2) to (A6), wherein the frame format includes the second security information in a first footer line and the second functional safety information in a second footer line next to the first footer line.

(A8)

The transmission apparatus according to any one of (A2) to (A7), wherein the frame format includes a part of the second security information in a first header line together with the first security information, and a part of the second functional safety information in a second header line together with the first functional safety information.

(A9)

The transmission apparatus according to (A6), wherein the frame format includes a part of information common to the first security information and the first functional safety information in a third header line next to the second header line.

(A10)

The transmission apparatus according to (A6) or (A9), wherein the frame format includes format type information of the frame data in a fourth header line next to the first header line.

(A11)

The transmission apparatus according to any one of (A2) to (A10), wherein each of the packets has a packet header including a first flag indicating that the first and second security information is present and a second flag indicating that the first and second functional safety information is present.

(A12)

The transmission apparatus according to (A11), wherein the packet header includes a third flag indicating that embedded data is present, the embedded data being different from the first and second security information and the first and second functional safety information.

(A13)

The transmission apparatus according to any one of (A2) to (A12), wherein the second security information is authentication information, and the second functional safety information is error detection information.

(A14)

The transmission apparatus according to (A13), wherein the authentication information and the error detection information are generated on a basis of the output data generated by the sensor.

(A15)

The transmission apparatus according to any one of (A1) to (A14), wherein the output data generated by the sensor is for one frame of image data generated by the sensor.

(A16)

The transmission apparatus according to any one of (A1) to (A15), wherein the frame data is generated by embedding the first and second security information and the first and second functional safety information to the output data generated by the sensor.

(A17)

A method comprising:

generating frame data corresponding to output data generated by a sensor, the frame data being generated according to a frame format that includes at least one of first security information or first functional safety information;

generating a plurality of packets based on the frame data, each of the packets including one of a plurality of lines of image data in the frame data; and transmitting the packets.

(A18)

The method according to (A17), wherein the frame format includes the first security information, the first functional safety information, a second security information and a second functional safety information.

(A19)

A non-transitory computer redable medium storing program code, the program code being executable by a processor to perform operations comprising:

generating frame data corresponding to output data generated by a sensor, the frame data being generated according to a frame format that includes at least one of first security information or first functional safety information:

generating a plurality of packets based on the frame data, each of the packets including one of a plurality of lines of image data in the frame data; and transmitting the packets.

(A20)

The non-transitory computer readable medium according to (A19), wherein the frame format includes the first security information, the first functional safety information, a second security information and a second functional safety information.

It should be understood by those skilled in the art that various modifications, combinations, sub-combinations and alterations may occur depending on design requirements and other factors insofar as they are within the scope of the appended claims or the equivalents thereof.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The claims shall have open-ended construction unless otherwise indicated. For example, the claim phrasing "at least one of A or B" shall be construed as reading upon embodiments that include either A or B, as well as embodiments that include both A and B.

The description and drawings merely illustrate the principles of the disclosure. It will thus be appreciated that those of ordinary skill in the art will be able to devise various arrangements that, although not explicitly described or shown herein, embody the principles of the disclosure and are included within its scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), logic circuitry, and nonvolatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

REFERENCE SIGNS LIST

1 Transmission system
11 Image sensor
12 DSP
21 Imaging unit
22 Transmission unit
31 Reception unit
32 Image processing unit
41 Application layer processing unit
42 Link layer signal processing unit
43 Physical layer signal processing unit
51 Physical layer signal processing unit
52 Link layer signal processing unit
53 Application layer processing unit

The invention claimed is:

1. A transmission apparatus comprising:
a controller configured to perform operations comprising:
generating frame data corresponding to output data generated by a sensor, the frame data being generated according to a frame format that includes at least one of first security information or first functional safety information;
generating a plurality of packets based on the frame data, each of the packets including one of a plurality of lines of image data in the frame data; and
transmitting the packets, wherein
the frame format includes the first security information, the first functional safety information, a second security information and a second functional safety information, and
the frame format includes a part of the second security information in a first header line together with the first security information, and a part of the second functional safety information in a second header line together with the first functional safety information.

2. The transmission apparatus according to claim 1, wherein
the first security information includes at least one of security error information of register communication, detection information of an attack on the sensor, or information for analysis of a security error, and
the second security information includes at least one of Initialization Vector information or Message Authentication Code.

3. The transmission apparatus according to claim 1, wherein
the first functional safety information includes at least one of functional safety error information of register communication, failure information inside the sensor, detection information of irregular operation of the sensor or information for analysis of functional safety error, and
the second functional safety information includes Cyclic Redundancy Check value.

4. The transmission apparatus according to claim 1, wherein
the frame format includes the first security information and the first functional safety information in a header, and the second security information and the second functional safety information in a footer.

5. The transmission apparatus according to claim 4, wherein
the frame format includes the first functional safety information in a first header line and the first security information in a second header line next to the first header line.

6. The transmission apparatus according to claim 5, wherein
the frame format includes the second security information in a first footer line and the second functional safety information in a second footer line next to the first footer line.

7. The transmission apparatus according to claim 5, wherein
the frame format includes a part of information common to the first security information and the first functional safety information in a third header line next to the second header line.

8. The transmission apparatus according to claim 5, wherein
the frame format includes format type information of the frame data in a fourth header line next to the first header line.

9. The transmission apparatus according to claim 1, wherein
each of the packets has a packet header including a first flag indicating that the first and second security information is present and a second flag indicating that the first and second functional safety information is present.

10. The transmission apparatus according to claim 9, wherein
the packet header includes a third flag indicating that embedded data is present, the embedded data being different from the first and second security information and the first and second functional safety information.

11. The transmission apparatus according to claim 1, wherein
the second security information is authentication information, and
the second functional safety information is error detection information.

12. The transmission apparatus according to claim 11, wherein
the authentication information and the error detection information are generated on a basis of the output data generated by the sensor.

13. The transmission apparatus according to claim 1, wherein the output data generated by the sensor is for one frame of image data generated by the sensor.

14. The transmission apparatus according to claim 1, wherein the frame data is generated by embedding the first and second security information and the first and second functional safety information to the output data generated by the sensor.

15. A method comprising:

generating frame data corresponding to output data generated by a sensor, the frame data being generated according to a frame format that includes at least one of first security information or first functional safety information;

generating a plurality of packets based on the frame data, each of the packets including one of a plurality of lines of image data in the frame data; and transmitting the packets, wherein the frame format includes the first security information, the first functional safety information, a second security information and a second functional safety information, and the frame format includes a part of the second security information in a first header line together with the first security information, and a part of the second functional safety information in a second header line together with the first functional safety information.

16. The method according to claim 15, wherein the first security information includes at least one of security error information of register communication, detection information of an attack on the sensor, or information for analysis of a security error, and the second security information includes at least one of Initialization Vector information or Message Authentication Code.

17. The method according to claim 15, wherein the frame format includes the first security information and the first functional safety information in a header, and the second security information and the second functional safety information in a footer.

18. A non-transitory computer readable medium storing program code, the program code being executable by a processor to perform operations comprising:

generating frame data corresponding to output data generated by a sensor, the frame data being generated according to a frame format that includes at least one of first security information or first functional safety information;

generating a plurality of packets based on the frame data, each of the packets including one of a plurality of lines of image data in the frame data; and transmitting the packets, wherein the frame format includes the first security information, the first functional safety information, a second security information and a second functional safety information, and the frame format includes a part of the second security information in a first header line together with the first security information, and a part of the second functional safety information in a second header line together with the first functional safety information.

19. The non-transitory computer readable medium according to claim 18, wherein the first security information includes at least one of security error information of register communication, detection information of an attack on the sensor, or information for analysis of a security error, and the second security information includes at least one of Initialization Vector information or Message Authentication Code.

20. The non-transitory computer readable medium according to claim 18, wherein the frame format includes the first security information and the first functional safety information in a header, and the second security information and the second functional safety information in a footer.

* * * * *